# (12) United States Patent
Shibuya et al.

(10) Patent No.: US 10,813,047 B2
(45) Date of Patent: Oct. 20, 2020

(54) FIRST WIRELESS COMMUNICATION TERMINAL, SECOND WIRELESS COMMUNICATION TERMINAL, WIRELESS COMMUNICATION SYSTEM, WIRELESS COMMUNICATION METHOD, AND RECORDING MEDIUM

(71) Applicant: OLYMPUS CORPORATION, Hachioji-shi, Tokyo (JP)

(72) Inventors: Kazuyuki Shibuya, Sagamihara (JP); Manabu Tajima, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 24 days.

(21) Appl. No.: 16/196,274

(22) Filed: Nov. 20, 2018

(65) Prior Publication Data
US 2019/0110252 A1    Apr. 11, 2019

Related U.S. Application Data

(63) Continuation of application No. PCT/JP2016/068085, filed on Jun. 17, 2016.

(51) Int. Cl.
*H04W 52/02* (2009.01)
*H04W 48/20* (2009.01)
(Continued)

(52) U.S. Cl.
CPC ....... *H04W 52/0209* (2013.01); *H04W 8/005* (2013.01); *H04W 48/14* (2013.01);
(Continued)

(58) Field of Classification Search
None
See application file for complete search history.

(56) References Cited

U.S. PATENT DOCUMENTS

| | | | |
|---|---|---|---|
| 8,060,133 B1* | 11/2011 | Khanka | H04W 52/0225 455/552.1 |
| 2007/0275746 A1* | 11/2007 | Bitran | H04W 16/14 455/509 |

(Continued)

FOREIGN PATENT DOCUMENTS

| | | |
|---|---|---|
| JP | 2004-112225 A | 4/2004 |
| JP | 2010-187147 A | 8/2010 |

(Continued)

OTHER PUBLICATIONS

International Search Report dated Aug. 2, 2016, issued in counterpart International Application No. PCT/JP2016/068085, with English Translation. (4 pages).

(Continued)

*Primary Examiner* — Faruk Hamza
*Assistant Examiner* — Cassandra L Decker
(74) *Attorney, Agent, or Firm* — Westerman, Hattori, Daniels & Adrian, LLP

(57) ABSTRACT

A first wireless communication terminal includes a first communicator, a second communicator, a first memory, and a processor. When first time information is received by the second communicator, the processor switches a state of the first communicator from first state to a second state at a first switching time calculated on the basis of the first time information. The processor switches the state of the first communicator from the second state to the first state at a second switching time calculated on the basis of the first time information. The first time information is information regarding a next scanning time indicating a time at which scanning is to be next performed by a second wireless communication terminal.

15 Claims, 34 Drawing Sheets

(51) Int. Cl.
*H04W 48/14* (2009.01)
*H04W 8/00* (2009.01)
*H04W 48/16* (2009.01)
*H04W 84/12* (2009.01)
*H04W 88/06* (2009.01)

(52) U.S. Cl.
CPC ........... *H04W 48/16* (2013.01); *H04W 48/20* (2013.01); *H04W 52/028* (2013.01); *H04W 52/0251* (2013.01); *H04W 84/12* (2013.01); *H04W 88/06* (2013.01); *Y02D 70/00* (2018.01)

(56) References Cited

U.S. PATENT DOCUMENTS

2011/0158212 A1    6/2011  Sakai et al.
2012/0163312 A1*   6/2012  Xhafa .................. H04W 28/06
                                                    370/329
2015/0200692 A1*   7/2015  Chiou .................. H04L 5/1469
                                                    370/297
2015/0305069 A1   10/2015  Ryu et al.

FOREIGN PATENT DOCUMENTS

JP    2011-193051 A    9/2011
JP    2011-193162 A    9/2011
JP       5002669 B2    8/2012
JP    2015-149579 A    8/2015

OTHER PUBLICATIONS

Notice of Allowance dated Apr. 14, 2020, issued in counterpart to JP Application No. 2018-523141, with English Translation. (6 pages).

* cited by examiner

FIG. 32
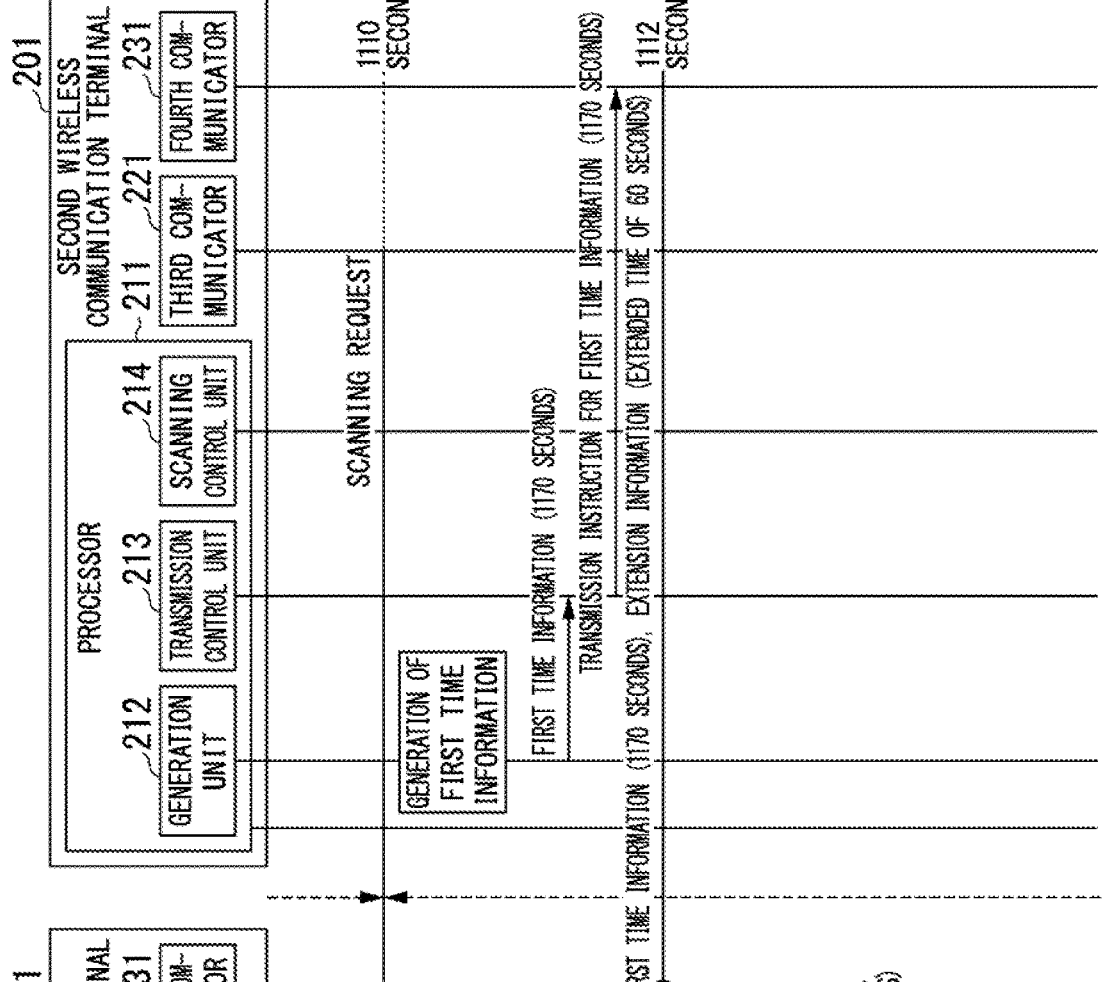
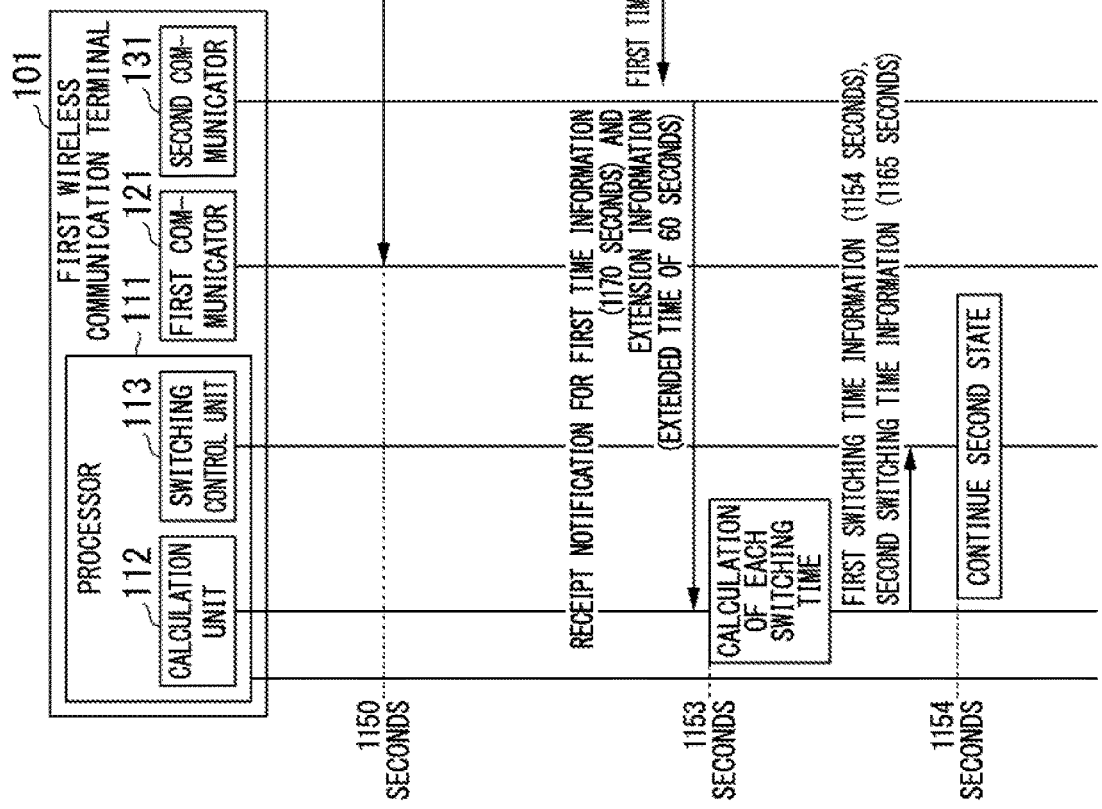

US 10,813,047 B2

FIRST WIRELESS COMMUNICATION TERMINAL, SECOND WIRELESS COMMUNICATION TERMINAL, WIRELESS COMMUNICATION SYSTEM, WIRELESS COMMUNICATION METHOD, AND RECORDING MEDIUM

BACKGROUND OF THE INVENTION

Field of the Invention

The present invention relates to a first wireless communication terminal, a second wireless communication terminal, a wireless communication system, a wireless communication method, and a recording medium.

This application is a continuation application based on International Patent Application PCT/JP2016/068085, filed on Jun. 17, 2016, the content of which is incorporated herein by reference.

Description of Related Art

In recent years, cooperation through wireless connection between various devices and a smartphone has increased with an increase in the performance of smartphones and an increase in functions of smartphones. For example, a camera and a smartphone may be connected to each other in a wireless manner, and images captured and stored in the camera may be transmitted to the smartphone. Various kinds of wireless techniques are used in wireless connection between each device and a smartphone. As representative wireless techniques, IEEE802.11 and its series of wireless local area networks (LAN) are widely used. Besides, Bluetooth (registered trademark) is also widely used. A combination of the plurality of wireless techniques may be used in some cases.

In IEEE802.11, a station (STA) which is a slave unit performs scanning, and finds an access point (AP) which is a master unit, whereby the STA can connect to the AP. There are two kinds of scanning: passive scanning and active scanning. Many STAs connect to an AP on the basis of the result of active scanning. In active scanning, an STA transmits a Probe Request, and the STA subsequently receives a Probe Response transmitted from an AP, whereby the AP is found. The Probe Request is a scanning request. The Probe Response is a scanning response. This active scanning is often repeatedly executed by an STA. However, an application may not be able to control active scanning in detail in some cases depending on the STA. For example, in some STAs, an application may not be able to set each timing of the active scanning which is repeatedly executed, the cycle of each active scanning, or the like.

Incidentally, in mobile terminals such as a smartphone and a camera that operate using a battery, it is critically important to reduce power consumption in order for a user to be able to use the terminal for a long time with no charging. Therefore, for the purpose of a reduction in power consumption, there is a mobile terminal that terminates an operation as an AP in a case where effective communication has not been performed for a certain time period during the operation as an AP.

FIG. 34 shows an operation of an AP and an STA. A first terminal AP1 which is an AP terminates an operation as an AP in a case where effective communication has not been performed for a certain time period as stated above. A second terminal STA1 is an STA. A first state in which the first terminal AP1 operates as an AP continues for 1 minute. A cycle in which the second terminal STA1 executes active scanning is two minutes. In a case where the first terminal AP1 is in the first state when the second terminal STA1 transmits a scanning request, the first terminal AP1 can transmit a scanning response. Therefore, the second terminal STA1 can find the first terminal AP1. In a case where the first terminal AP1 is not in the first state when the second terminal STA1 transmits a scanning request, the first terminal AP1 cannot transmit a scanning response. Therefore, the second terminal STA1 cannot find the first terminal AP1. In a period from time T1 to time T2 and a period from time T3 to time T4, the first terminal AP1 is in the first state. In these periods, the first terminal AP1 does not receive a scanning request. In a period from time T5 to time T6, the first terminal AP1 is in the first state. In this period, the first terminal AP1 receives a scanning request, and transmits a scanning response.

A user cannot control each timing of active scanning, an active scanning cycle, and the like using an application of the second terminal STA1 as stated above. There is the possibility of active scanning not being performed by an STA after an AP starts its operation and before the operation as an AP is terminated. In this case, as long as the timing of active scanning of an STA and the timing of an operation as an AP are not accidentally coincident with each other, the second terminal STA1 cannot find the first terminal AP1. For this reason, there is a problem that it takes time for the second terminal STA1 to find the first terminal AP1. After the first terminal AP1 is found, the second terminal STA1 connects to the first terminal AP1, and data communication is started between these terminals. Since it takes time to find the first terminal AP1, the start of data communication is delayed.

The above example relates to IEEE802.11. The same problem also occurs in other communication protocols through which a slave unit performs active scanning.

For example, in a technique disclosed in Japanese Patent No. 5002669, a communicator starts an operation as an AP in a case where a signal transmitted from another terminal is received during communication using Bluetooth (registered trademark). Thereby, the power consumption of a communicator serving as an AP is reduced, and an AP and an STA can thus perform communication connection.

SUMMARY OF THE INVENTION

According to a first aspect of the present invention, a first wireless communication terminal includes a first communicator, a second communicator, a first memory, and a processor. The first communicator and the second communicator perform wireless communication. The first memory stores zeroth time information. The processor calculates a first switching time and a second switching time. The processor switches a state of the first communicator which is a first state to a second state at the first switching time, and switches a state of the first communicator which is the second state to the first state at the second switching time. In a case where the state of the first communicator is the first state, the first communicator is able to respond to a scanning request of a data link level. In a case where the state of the first communicator is the second state, the first communicator is not able to respond to the scanning request. In a case where a communication utilization rate of the first communicator and a communication utilization rate of the second communicator are the same as each other in a first unit period, and a ratio between a transmission period and a reception period of the first communicator and a ratio between the transmission period and the reception period of the second communicator are the same as each other in the first unit period, the first communicator and the second communicator are configured such that a first power consumption of the first communicator in the first unit period is higher than a second power consumption of the second communicator in the first unit period. A length of a first period in a second unit period is the same as a length of a second period in the second unit period, or is less than the length of the second period. In the first period, the first communicator is able to establish first communication connection for communication of a higher level than the data link level with a third communicator. In the second period, the second communicator is able to establish second communication connection for communication of the data link level with a fourth communicator. A second wireless communication terminal includes the third communicator that performs wireless communication and the fourth communicator that performs wireless communication. The second wireless communication terminal confirms whether a wireless communication terminal having the first communicator in an operation in the first state is present by executing scanning. The second wireless communication terminal executes the scanning by transmitting the scanning request using the third communicator. In a case where first time information transmitted by the fourth communicator is not received by the second communicator, the processor calculates the first switching time and the second switching time on the basis of the zeroth time information. The zeroth time information is information regarding a timing of switching between the first state and the second state of the first communicator. In a case where the first time information is received by the second communicator, the processor calculates the first switching time and the second switching time on the basis of the first time information. The first time information is information regarding a next scanning time indicating a time at which the scanning is to be next performed by the second wireless communication terminal. The second switching time is a time after the first switching time. In a case where the first time information is not received by the second communicator, the processor switches the state of the first communicator which is the first state to the second state at the first switching time calculated on the basis of the zeroth time information. In a case where the first time information is not received by the second communicator, the processor switches the state of the first communicator which is the second state to the first state at the second switching time calculated on the basis of the zeroth time information. In a case where the state of the first communicator is the first state when the first time information is received by the second communicator, the processor switches the state of the first communicator to the second state at the first switching time calculated on the basis of the first time information. In a case where the state of the first communicator is the second state when the first time information is received by the second communicator, the first communicator continues to be in the second state, and the processor switches the state of the first communicator to the first state at the second switching time calculated on the basis of the first time information.

According to a second aspect of the present invention, in the first aspect, in a case where a connection request is not received by the first communicator until the first switching time calculated on the basis of the first time information comes, the processor may transmit second time information to the fourth communicator using the second communicator. The connection request indicates a request for communication connection for the communication of a higher level than the data link level. The second time information indicates a time at which the state of the first communicator is switched from the second state to the first state in accordance with a first instruction given to the first communicator by the processor at the second switching time calculated on the basis of the first time information. The first instruction is an instruction for switching the state of the first communicator from the second state to the first state.

According to a third aspect of the present invention, in the second aspect, the processor may further transmit third time information to the fourth communicator using the second communicator. The third time information indicates a time at which the state of the first communicator is switched from the first state to the second state in accordance with a second instruction given to the first communicator by the processor at the first switching time calculated on the basis of the first time information. The second instruction is an instruction for switching the state of the first communicator from the first state to the second state. In a case where the connection request is not received by the first communicator until the first switching time calculated on the basis of the first time information comes, the processor may further transmit the third time information to the fourth communicator using the second communicator.

According to a fourth aspect of the present invention, in the first aspect, the processor may further calculate a first switching time after next which is the first switching time subsequent to a next first switching time. The next first switching time is the first switching time subsequent to the first switching time calculated on the basis of the first time information. A time period from a next second switching time to the first switching time after next is longer than a time period from the second switching time to the next first switching time. The next second switching time is the second switching time subsequent to the second switching time calculated on the basis of the first time information.

According to a fifth aspect of the present invention, in the first aspect, in a case where extension information transmitted by the fourth communicator is received by the second communicator, the processor may calculate a first switching time after next which is the first switching time subsequent to a next first switching time on the basis of the extension information. The extension information indicates causing the first communicator to extend a duration of the first state. The next first switching time is the first switching time subsequent to the first switching time calculated on the basis of the first time information.

According to a sixth aspect of the present invention, in the first aspect, in a case where extension information transmitted by the fourth communicator is received by the second communicator, the processor may calculate the first switching time on the basis of the extension information. The extension information indicates causing the first communicator to extend a duration of the first state.

According to a seventh aspect of the present invention, a second wireless communication terminal includes a third communicator, a fourth communicator, a second memory, and a processor. The third communicator and the fourth communicator perform wireless communication. In a case where a communication utilization rate of the third communicator and a communication utilization rate of the fourth communicator are the same as each other in a third unit period, and a ratio between a transmission period and a reception period of the third communicator and a ratio between the transmission period and the reception period of the fourth communicator are the same as each other in the third unit period, the third communicator and the fourth communicator are configured such that a third power consumption of the third communicator in the third unit period is higher than a fourth power consumption of the fourth communicator in the third unit period. In a fourth unit period, a length of a third period is the same as a length of a fourth period, or is less than the length of the fourth period. In the third period, the third communicator is able to establish first communication connection for communication of a higher level than a data link level with a first communicator. In the fourth period, the fourth communicator is able to establish second communication connection for communication of the data link level with a second communicator. The second memory stores unchangeable scanning cycle information. The scanning cycle information indicates a cycle of scanning. A first wireless communication terminal includes the first communicator that performs wireless communication and the second communicator that performs wireless communication. A state of the first communicator is switched from a first state to a second state, or is switched from the second state to the first state. In a case where the state of the first communicator is the first state, the first communicator is able to respond to a scanning request of the data link level. In a case where the state of the first communicator is the second state, the first communicator is not able to respond to the scanning request. The processor confirms whether a wireless communication terminal having the first communicator in an operation in the first state is present by executing the scanning. The processor executes the scanning by transmitting the scanning request using the third communicator in a cycle indicated by the scanning cycle information. The processor generates first time information using a next scanning time calculated on the basis of the scanning cycle information as a reference. The next scanning time is a time at which the scanning using the third communicator is to be next performed. The first time information is information regarding the next scanning time. The processor transmits the first time information to the second communicator using the fourth communicator.

According to an eighth aspect of the present invention, in the seventh aspect, in a case where second time information transmitted by the second communicator is received by the fourth communicator, the processor may generate the first time information by correcting the next scanning time on the basis of the second time information. The second time information indicates a time at which the state of the first communicator which is the second state is switched to the first state.

According to a ninth aspect of the present invention, in the eighth aspect, in a case where third time information transmitted by the second communicator is received by the fourth communicator, the processor may generate the first time information by correcting the next scanning time on the basis of the second time information and the third time information. The third time information indicates a time at which the state of the first communicator which is the first state is switched to the second state.

According to a tenth aspect of the present invention, in the seventh aspect, in a case where the processor confirms that the wireless communication terminal having the first communicator in an operation in the first state is not present in the scanning executed by using the third communicator after the first time information is transmitted, the processor may transmit extension information to the second communicator using the fourth communicator. The extension information indicates causing the first communicator to extend a duration of the first state.

According to an eleventh aspect of the present invention, a wireless communication system includes a first wireless communication terminal and a second wireless communication terminal. The first wireless communication terminal includes a first communicator, a second communicator, a first memory, and a first processor. The first communicator and the second communicator perform wireless communication. The first memory stores zeroth time information. The first processor calculates a first switching time and a second switching time. The first processor switches a state of the first communicator which is a first state to a second state at the first switching time, and switches a state of the first communicator which is the second state to the first state at the second switching time. In a case where the state of the first communicator is the first state, the first communicator is able to respond to a scanning request of a data link level. In a case where the state of the first communicator is the second state, the first communicator is not able to respond to the scanning request. In a case where a communication utilization rate of the first communicator and a communication utilization rate of the second communicator are the same as each other in a first unit period, and a ratio between a transmission period and a reception period of the first communicator and a ratio between the transmission period and the reception period of the second communicator are the same as each other in the first unit period, the first communicator and the second communicator are configured such that a first power consumption of the first communicator in the first unit period is higher than a second power consumption of the second communicator in the first unit period. A length of a first period in a second unit period is the same as a length of a second period in the second unit period, or is less than the length of the second period. In the first period, the first communicator is able to establish first communication connection for communication of a higher level than the data link level with a third communicator. In the second period, the second communicator is able to establish second communication connection for communication of the data link level with a fourth communicator. The second wireless communication terminal includes the third communicator, the fourth communicator, a second memory, and a second processor. The third communicator and the fourth communicator perform wireless communication. The second processor confirms whether a wireless communication terminal having the first communicator in an operation in the first state is present by executing scanning. The second processor executes the scanning by transmitting the scanning request using the third communicator. In a case where first time information transmitted by the fourth communicator is not received by the second communicator, the first processor calculates the first switching time and the second switching time on the basis of the zeroth time information. The zeroth time information is information regarding a timing of switching between the first state and the second state of the first communicator. In a case where the first time information is received by the second communicator, the first processor calculates the first switching time and the second switching time on the basis of the first time information. The first time information is information regarding a next scanning time indicating a time at which the scanning is to be next performed by the second wireless communication terminal. The second switching time is a time after the first switching time. In a case where the first time information is not received by the second communicator, the first processor switches the state of the first communicator which is the first state to the second state at the first switching time calculated on the basis of the zeroth time information. In a case where the first time information is not received by the second communicator, the first processor switches the state of the first communicator which is the second state to the first state at the second switching time calculated on the basis of the zeroth time information. In a case where the state of the first communicator is the first state when the first time information is received by the second communicator, the first processor switches the state of the first communicator to the second state at the first switching time calculated on the basis of the first time information. In a case where the state of the first communicator is the second state when the first time information is received by the second communicator, the first communicator continues to be in the second state, and the first processor switches the state of the first communicator to the first state at the second switching time calculated on the basis of the first time information. In a case where a communication utilization rate of the third communicator and a communication utilization rate of the fourth communicator are the same as each other in a third unit period, and a ratio between the transmission period and the reception period of the third communicator and a ratio between the transmission period and the reception period of the fourth communicator are the same as each other in the third unit period, the third communicator and the fourth communicator are configured such that a third power consumption of the third communicator in the third unit period is higher than a fourth power consumption of the fourth communicator in the third unit period. In a fourth unit period, a length of a third period is the same as a length of a fourth period, or is less than the length of the fourth period. In the third period, the third communicator is able to establish the first communication connection with a first communicator. In the fourth period, the fourth communicator is able to establish the second communication connection with a second communicator. The second memory stores unchangeable scanning cycle information. The scanning cycle information indicates a cycle of the scanning. The second processor executes the scanning using the third communicator in a cycle indicated by the scanning cycle information. The second processor generates first time information using a next scanning time calculated on the basis of the scanning cycle information as a reference. The next scanning time is a time at which the scanning using the third communicator is to be next performed. The second processor transmits the first time information to the second communicator using the fourth communicator.

According to a twelfth aspect of the present invention, a wireless communication method includes a first step, a second step, a third step, a fourth step, a fifth step, and a sixth step which are executed by a first wireless communication terminal. The first wireless communication terminal includes a first communicator, a second communicator, and a first memory. The first communicator and the second communicator perform wireless communication. The first memory stores zeroth time information. A state of the first communicator which is a first state is switched to a second state at a first switching time, and a state of the first communicator which is the second state is switched to the first state at a second switching time. In a case where the state of the first communicator is the first state, the first communicator is able to respond to a scanning request of a data link level. In a case where the state of the first communicator is the second state, the first communicator is not able to respond to the scanning request. In a case where a communication utilization rate of the first communicator and a communication utilization rate of the second communicator are the same as each other in a first unit period, and a ratio between a transmission period and a reception period of the first communicator and a ratio between the transmission period and the reception period of the second communicator are the same as each other in the first unit period, the first communicator and the second communicator are configured such that a first power consumption of the first communicator in the first unit period is higher than a second power consumption of the second communicator in the first unit period. A length of a first period in a second unit period is the same as a length of a second period in the second unit period, or is less than the length of the second period. In the first period, the first communicator is able to establish first communication connection for communication of a higher level than the data link level with a third communicator. In the second period, the second communicator is able to establish second communication connection for communication of the data link level with a fourth communicator. A second wireless communication terminal includes the third communicator that performs wireless communication and the fourth communicator that performs wireless communication. The second wireless communication terminal confirms whether a wireless communication terminal having the first communicator in an operation in the first state is present by executing scanning. The second wireless communication terminal executes the scanning by transmitting the scanning request using the third communicator. In a case where first time information transmitted by the fourth communicator is not received by the second communicator, the first wireless communication terminal calculates the first switching time and the second switching time on the basis of the zeroth time information in the first step. The zeroth time information is information regarding a timing of switching between the first state and the second state of the first communicator. In a case where the first time information is received by the second communicator, the first wireless communication terminal calculates the first switching time and the second switching time on the basis of the first time information in the second step. The first time information is information regarding a next scanning time indicating a time at which the scanning is to be next performed by the second wireless communication terminal. The second switching time is a time after the first switching time. In a case where the first time information is not received by the second communicator, the first wireless communication terminal switches the state of the first communicator which is the first state to the second state at the first switching time calculated on the basis of the zeroth time information in the third step. In a case where the first time information is not received by the second communicator, the first wireless communication terminal switches the state of the first communicator which is the second state to the first state at the second switching time calculated on the basis of the zeroth time information in the fourth step. In a case where the state of the first communicator is the first state when the first time information is received by the second communicator, the first wireless communication terminal switches the state of the first communicator to the second state at the first switching time calculated on the basis of the first time information in the fifth step. In a case where the state of the first communicator is the second state when the first time information is received by the second communicator, the first communicator continues to be in the second state, and the first wireless communication terminal switches the state of the first communicator to the first state at the second switching time calculated on the basis of the first time information in the sixth step.

According to a thirteenth aspect of the present invention, a wireless communication method includes a first step, a second step, and a third step which are executed by a second wireless communication terminal. The second wireless communication terminal includes a third communicator that performs wireless communication, a fourth communicator that performs a wireless communication, and a second memory. In a case where a communication utilization rate of the third communicator and a communication utilization rate of the fourth communicator are the same as each other in a third unit period, and a ratio between a transmission period and a reception period of the third communicator and a ratio between the transmission period and the reception period of the fourth communicator are the same as each other in the third unit period, the third communicator and the fourth communicator are configured such that a first power consumption of the third communicator in the third unit period is higher than a second power consumption of the fourth communicator in the third unit period. In a fourth unit period, a length of a third period is the same as a length of a fourth period, or is less than the length of the fourth period. In the third period, the third communicator is able to establish first communication connection for communication of a higher level than a data link level with a first communicator. In the fourth period, the fourth communicator is able to establish second communication connection for communication of the data link level with a second communicator. The second memory stores unchangeable scanning cycle information. The scanning cycle information indicates a cycle of scanning. A first wireless communication terminal includes the first communicator that performs wireless communication and the second communicator that performs wireless communication. A state of the first communicator is switched from a first state to a second state, or is switched from the second state to the first state. In a case where the state of the first communicator is the first state, the first communicator is able to respond to a scanning request of the data link level. In a case where the state of the first communicator is the second state, the first communicator is not able to respond to the scanning request. In the first step, the second wireless communication terminal confirms whether a wireless communication terminal having the first communicator in an operation in the first state is present by executing scanning. The second wireless communication terminal executes the scanning by transmitting the scanning request using the third communicator in a cycle indicated by the scanning cycle information. In the second step, the second wireless communication terminal generates first time information using a next scanning time calculated on the basis of the scanning cycle information as a reference. The next scanning time is a time at which the scanning using the third communicator is to be next performed. The first time information is information regarding the next scanning time. In the third step, the second wireless communication terminal transmits the first time information to the second communicator using the fourth communicator.

According to a fourteenth aspect of the present invention, there is provided a non-transitory computer-readable recording medium having a program recorded therein, the program causing a computer of a first wireless communication terminal to execute a first step, a second step, a third step, a fourth step, a fifth step, and a sixth step. The first wireless communication terminal includes a first communicator, a second communicator, and a first memory. The first communicator and the second communicator perform wireless communication. The first memory stores zeroth time information. A state of the first communicator which is a first state is switched to a second state at a first switching time, and a state of the first communicator which is the second state is switched to the first state at a second switching time. In a case where the state of the first communicator is the first state, the first communicator is able to respond to a scanning request of a data link level. In a case where the state of the first communicator is the second state, the first communicator is not able to respond to the scanning request. In a case where a communication utilization rate of the first communicator and a communication utilization rate of the second communicator are the same as each other in a first unit period, and a ratio between a transmission period and a reception period of the first communicator and a ratio between the transmission period and the reception period of the second communicator are the same as each other in the first unit period, the first communicator and the second communicator are configured such that a first power consumption of the first communicator in the first unit period is higher than a second power consumption of the second communicator in the first unit period. A length of a first period in a second unit period is the same as a length of a second period in the second unit period, or is less than the length of the second period. In the first period, the first communicator is able to establish first communication connection for communication of a higher level than the data link level with a third communicator. In the second period, the second communicator is able to establish second communication connection for communication of the data link level with a fourth communicator. A second wireless communication terminal includes the third communicator that performs wireless communication and the fourth communicator that performs wireless communication. The second wireless communication terminal confirms whether a wireless communication terminal having the first communicator in an operation in the first state is present by executing scanning. The second wireless communication terminal executes the scanning by transmitting the scanning request using the third communicator. In a case where first time information transmitted by the fourth communicator is not received by the second communicator, the first wireless communication terminal calculates the first switching time and the second switching time on the basis of the zeroth time information in the first step. The zeroth time information is information regarding a timing of switching between the first state and the second state of the first communicator. In a case where the first time information is received by the second communicator, the first wireless communication terminal calculates the first switching time and the second switching time on the basis of the first time information in the second step. The first time information is information regarding a next scanning time indicating a time at which the scanning is to be next performed by the second wireless communication terminal. The second switching time is a time after the first switching time. In a case where the first time information is not received by the second communicator, the computer switches the state of the first communicator which is the second state to the first state at the second switching time calculated on the basis of the zeroth time information in the fourth step. In a case where the state of the first communicator is the first state when the first time information is received by the second communicator, the computer switches the state of the first communicator to the second state at the first switching time calculated on the basis of the first time information in the third step. In a case where the state of the first communicator is the first state when the first time information is received by the second communicator, the first wireless communication terminal switches the state of the first communicator to the second state at the first switching time calculated on the basis of the first time information in the fifth step. In a case where the state of the first communicator is the second state when the first time information is received by the second communicator, the first communicator continues to be in the second state, and the first wireless communication terminal switches the state of the first communicator to the first state at the second switching time calculated on the basis of the first time information in the sixth step.

According to a fifteenth aspect of the present invention, there is provided a non-transitory computer-readable recording medium having a program recorded therein, the program causing a computer of a second wireless communication terminal to execute a first step, a second step, and a third step. The second wireless communication terminal includes a third communicator that performs wireless communication, a fourth communicator that performs wireless communication, and a second memory. In a case where a communication utilization rate of the third communicator and a communication utilization rate of the fourth communicator are the same as each other in a third unit period, and a ratio between a transmission period and a reception period of the third communicator and a ratio between the transmission period and the reception period of the fourth communicator are the same as each other in the third unit period, the third communicator and the fourth communicator are configured such that a first power consumption of the third communicator in the third unit period is higher than a second power consumption of the fourth communicator in the third unit period. In a fourth unit period, a length of a third period is the same as a length of a fourth period, or is less than the length of the fourth period. In the third period, the third communicator is able to establish first communication connection for communication of a higher level than a data link level with a first communicator. In the fourth period, the fourth communicator is able to establish second communication connection for communication of the data link level with a second communicator. The second memory stores unchangeable scanning cycle information. The scanning cycle information indicates a cycle of scanning. A first wireless communication terminal includes the first communicator that performs wireless communication and the second communicator that performs wireless communication. A state of the first communicator is switched from a first state to a second state, or is switched from the second state to the first state. In a case where the state of the first communicator is the first state, the first communicator is able to respond to a scanning request of a data link level. In a case where the state of the first communicator is the second state, the first communicator is not able to respond to the scanning request. In the first step, the second wireless communication terminal confirms whether a wireless communication terminal having the first communicator in an operation in the first state is present by executing scanning. The second wireless communication terminal executes the scanning by transmitting the scanning request using the third communicator in a cycle indicated by the scanning cycle information. In the second step, the second wireless communication terminal generates first time information using a next scanning time calculated on the basis of the scanning cycle information as a reference. The next scanning time is a time at which the scanning using the third communicator is to be next performed. The first time information is information regarding the next scanning time. In the third step, the second wireless communication terminal transmits the first time information to the second communicator using the fourth communicator.

BRIEF DESCRIPTION OF THE DRAWINGS

FIG. 32 is a sequence diagram showing a procedure of communication in the fourth embodiment of the present invention.

DETAILED DESCRIPTION OF THE INVENTION

Embodiments of the present invention will be described with reference to the drawings.

First Embodiment

Figure 1:
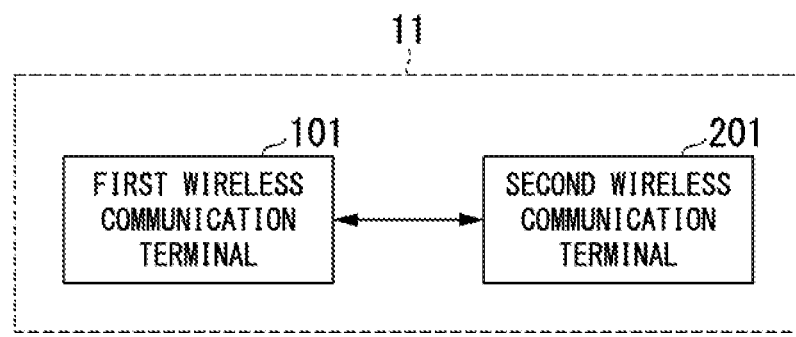
FIG. 1 is a block diagram showing a configuration of a wireless communication system according to a first embodiment of the present invention.

FIG. 1 shows a configuration of a wireless communication system 11 according to a first embodiment of the present invention. As shown in FIG. 1, the wireless communication system 11 includes a first wireless communication terminal 101 and a second wireless communication terminal 201. The first wireless communication terminal 101 and the second wireless communication terminal 201 perform wireless communication. In FIG. 1, one first wireless communication terminal 101 and one second wireless communication terminal 201 are shown. A plurality of first wireless communication terminals 101 or a plurality of second wireless communication terminals 201 may be present.

Figure 2:
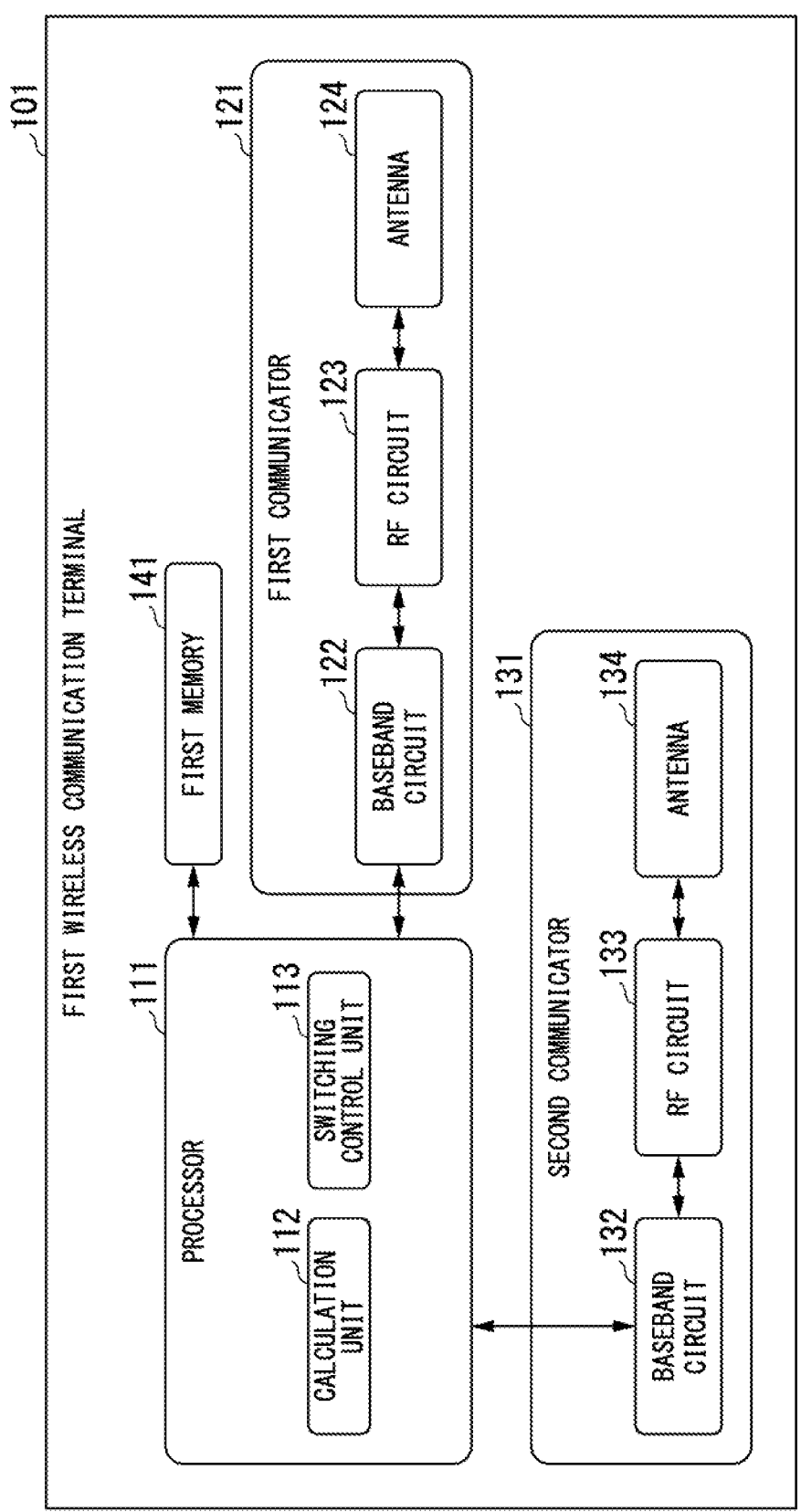
FIG. 2 is a block diagram showing a hardware configuration of a first wireless communication terminal according to the first embodiment of the present invention.

FIG. 2 shows a hardware configuration of the first wireless communication terminal 101. As shown in FIG. 2, the first wireless communication terminal 101 includes a processor 111, a first communicator 121, a second communicator 131, and a first memory 141. The processor 111 includes a calculation unit 112 and a switching control unit 113.

Figure 3:
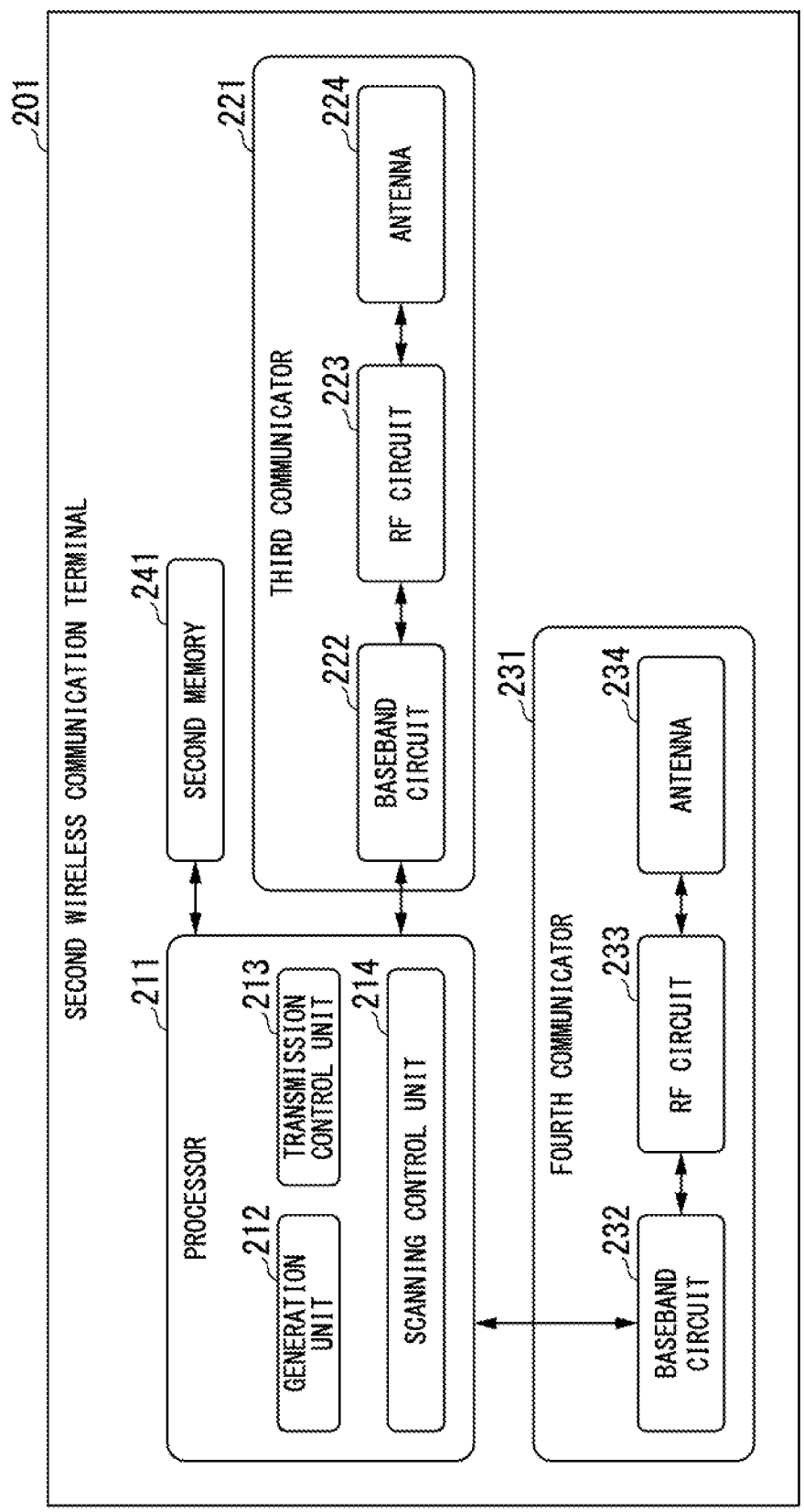
FIG. 3 is a block diagram showing a hardware configuration of a second wireless communication terminal according to the first embodiment of the present invention.

FIG. 3 shows a hardware configuration of the second wireless communication terminal 201. As shown in FIG. 3, the second wireless communication terminal 201 includes a processor 211, a third communicator 221, a fourth communicator 231, and a second memory 241. The processor 211 includes a generation unit 212, a transmission control unit 213, and a scanning control unit 214.

The schematic configurations of the first wireless communication terminal 101 and the second wireless communication terminal 201 will be described. The first communicator 121 and the second communicator 131 perform wireless communication. The first memory 141 stores zeroth time information. The calculation unit 112 calculates a first switching time and a second switching time. The switching control unit 113 switches the state of the first communicator 121 which is a first state from the first state to a second state at the first switching time, and switches the state of the first communicator 121 which is the second state from the second state to the first state at the second switching time. In a case where the state of the first communicator 121 is the first state, the first communicator 121 can respond to a scanning request of a data link level. In a case where the state of the first communicator 121 is the second state, the first communicator 121 cannot respond to the scanning request. In a case where a communication utilization rate of the first communicator 121 and a communication utilization rate of the second communicator 131 are the same as each other in a first unit period, and a ratio between a transmission period and a reception period of the first communicator 121 and a ratio between the transmission period and the reception period of the second communicator 131 are the same as each other in the first unit period, the first communicator 121 and the second communicator 131 are configured such that a first power consumption of the first communicator 121 in the first unit period is higher than a second power consumption of the second communicator 131 in the first unit period. A length of a first period in a second unit period is the same as a length of a second period in the second unit period, or is less than the length of the second period. In the first period, the first communicator 121 can establish first communication connection for communication of a higher level than the data link level with the third communicator 221. In the second period, the second communicator 131 can establish second communication connection for communication of the data link level with the fourth communicator 231.

The second wireless communication terminal 201 confirms whether a wireless communication terminal having the first communicator 121 in an operation in the first state is present by executing scanning. The second wireless communication terminal 201 executes the scanning by transmitting the scanning request using the third communicator 221. In a case where first time information transmitted by the fourth communicator 231 is not received by the second communicator 131, the calculation unit 112 calculates the first switching time and the second switching time on the basis of the zeroth time information. The zeroth time information is information regarding a switching timing between the first state and the second state of the first communicator 121. In a case where the first time information is received by the second communicator 131, the calculation unit 112 calculates the first switching time and the second switching time on the basis of the first time information. The first time information is information regarding a next scanning time indicating a time at which the scanning is to be next performed by the second wireless communication terminal 201. The second switching time is a time after the first switching time.

In a case where the first time information is not received by the second communicator 131, the switching control unit 113 switches the state of the first communicator 121 which is the first state from the first state to the second state at the first switching time calculated on the basis of the zeroth time information. In a case where the first time information is not received by the second communicator 131, the switching control unit 113 switches the state of the first communicator 121 which is the second state from the second state to the first state at the second switching time calculated on the basis of the zeroth time information. In a case where the state of the first communicator 121 is the first state when the first time information is received by the second communicator 131, the switching control unit 113 switches the state of the first communicator 121 from the first state to the second state at the first switching time calculated on the basis of the first time information. In a case where the state of the first communicator 121 is the second state when the first time information is received by the second communicator 131, the first communicator 121 continues to be in the second state, and the switching control unit 113 switches the state of the first communicator 121 from the second state to the first state at the second switching time calculated on the basis of the first time information.

In a case where a communication utilization rate of the third communicator 221 and a communication utilization rate of the fourth communicator 231 are the same as each other in a third unit period, and a ratio between a transmission period and a reception period of the third communicator 221 and a ratio between the transmission period and the reception period of the fourth communicator 231 are the same as each other in the third unit period, the third communicator 221 and the fourth communicator 231 are configured such that a first power consumption of the third communicator 221 in the third unit period is higher than a second power consumption of the fourth communicator 231 in the third unit period. In a fourth unit period, a length of a third period is the same as a length of a fourth period, or is less than the length of the fourth period. In the third period, the third communicator 221 can establish the first communication connection for communication of a higher level than the data link level with the first communicator 121. In the fourth period, the fourth communicator 231 can establish the second communication connection for communication of the data link level with the second communicator 131. The second memory 241 stores unchangeable scanning cycle information. The scanning cycle information indicates the cycle of scanning. The scanning control unit 214 confirms whether a wireless communication terminal having the first communicator 121 in an operation in the first state is present by executing scanning. The scanning control unit 214 executes the scanning by transmitting the scanning request using the third communicator 221 in a cycle indicated by the scanning cycle information. The generation unit 212 generates the first time information using a next scanning time calculated on the basis of the scanning cycle information as a reference. The next scanning time is a time at which scanning using the third communicator 221 is to be next performed. The first time information is information regarding the next scanning time. The transmission control unit 213 transmits the first time information to the second communicator 131 using the fourth communicator 231.

The first communicator 121 of the first wireless communication terminal 101 is in the second state while when scanning is not executed by the second wireless communication terminal 201, and is brought into the first state before the scanning is executed. Therefore, the power consumption of the first wireless communication terminal 101 is reduced. The first communicator 121 can respond to the scanning request when scanning is executed by the second wireless communication terminal 201. Therefore, the second wireless communication terminal 201 can find the first wireless communication terminal 101 in a shorter amount of time.

The first communicator 121 of the first wireless communication terminal 101 is an access point (AP) that operates as a master unit. The third communicator 221 of the second wireless communication terminal 201 is a station (STA) that operates as a slave unit. The data link level (data link layer) is one layer of an open systems interconnection (OSI) reference model. The scanning request and a response thereto are messages of the data link level. For example, communication of a higher level than the data link level is data communication of an application level. For example, the first communicator 121 and the third communicator 221 may perform an IEEE802.11 operation. The first communicator 121 and the third communicator 221 may perform an operation of another wireless communication system by which a slave unit performs active scanning. For example, the second communicator 131 and the fourth communicator 231 may perform a Bluetooth (registered trademark) operation. The second communicator 131 and the fourth communicator 231 may perform an operation in any of NFC, RFID, TransferJet (registered trademark), infrared communication, and the like.

Detailed configurations of the first wireless communication terminal 101 and the second wireless communication terminal 201 will be described. The first wireless communication terminal 101 has one or a plurality of processors. In FIG. 2, one processor 111 is shown. The processor 111 is a computer of the first wireless communication terminal 101. For example, the processor 111 is constituted by a central processing unit (CPU). The processor 111 controls the operation of the first wireless communication terminal 101. The calculation unit 112 and the switching control unit 113 may be distributed to a plurality of processors.

For example, the function of the processor 111 can be realized as a function of software by the processor 111 reading and executing a program including commands for specifying the operation of the processor 111. This program may be provided by a "computer readable recording medium" such as, for example, a flash memory. In addition, the above-described program may be transmitted from a computer having a storage device or the like in which this program is stored, through a transmission medium or through transmitted waves in the transmission medium, to the first wireless communication terminal 101. The "transmission medium" that transmits a program is a medium having a function of transmitting information like networks (communication networks) such as the Internet or communication channels (communication lines) such as a telephone line. In addition, the above-mentioned program may realize a portion of the above-mentioned functions. Further, the above-mentioned program may be a difference file (difference program) capable of realizing the above-mentioned function by a combination with a program which is already recorded in a computer.

In FIG. 2, an example is shown in which the calculation unit 112 and the switching control unit 113 function through software operating on the processor 111. The calculation unit 112 and the switching control unit 113 may be constituted by an application specific integrated circuit (ASIC) or a field-programmable gate array (FPGA).

For example, the first communicator 121 is a wireless module. The first communicator 121 includes a baseband circuit 122, an RF circuit 123, and an antenna 124. The baseband circuit 122 and the RF circuit 123 constitute a first communication circuit. The baseband circuit 122 performs digital signal processing in accordance with an instruction from the processor 111, and converts a digital signal into an analog signal through D/A conversion. The analog signal generated by the baseband circuit 122 is output to the RF circuit 123. In addition, the baseband circuit 122 converts the analog signal which is output from the RF circuit 123 into a digital signal through A/D conversion, and performs processes on the digital signal. Among the processes performed on the digital signal by the baseband circuit 122, a portion of a process of a media access control (MAC) layer is controlled by the processor 111. The MAC layer is included in the data link level.

The RF circuit 123 modulates the analog signal which is output from the baseband circuit 122 into an analog signal having a frequency band of a carrier wave. The analog signal modulated by the RF circuit 123 is output to the antenna 124. In addition, the RF circuit 123 demodulates the analog signal having a frequency band of a carrier wave which is output from the antenna 124. The analog signal demodulated by the RF circuit 123 is output to the baseband circuit 122. The antenna 124 converts the analog signal which is output from the RF circuit 123 into radio waves, and transmits the radio waves to the second wireless communication terminal 201. In addition, the antenna 124 receives the radio waves transmitted from the second wireless communication terminal 201, and converts the received radio waves into an analog signal. The analog signal processed by the antenna 124 is output to the RF circuit 123.

For example, the second communicator 131 is a wireless module. The second communicator 131 includes a baseband circuit 132, an RF circuit 133, and an antenna 134. The baseband circuit 132 and the RF circuit 133 constitute a second communication circuit. The function of the baseband circuit 132 is the same as the function of the baseband circuit 122. The function of the RF circuit 133 is the same as the function of the RF circuit 123. The function of the antenna 134 is the same as the function of the antenna 124.

The first communicator 121 performs wireless communication in accordance with a first communication protocol. The second communicator 131 performs wireless communication in accordance with a second communication protocol different from the first communication protocol. The first communication protocol and the second communication protocol include at least a protocol of the data link layer.

The first unit period is a period for defining a relationship of power consumption between the first communicator 121 and the second communicator 131. For example, the first unit period is 1 second. For example, in a case where a communication utilization rate is 0%, each of the first communicator 121 and the second communicator 131 is in a state where transmission and reception are not performed at all. In a case where the communication utilization rate is 100%, each of the first communicator 121 and the second communicator 131 is in a state where transmission and reception are performed at all times. In a case where the communication utilization rate is 50%, each of the first communicator 121 and the second communicator 131 is in a state where transmission and reception are performed in a period of 50%. For example, the ratio of transmission periods of the first communicator 121 and the second communicator 131 to the first unit period may be 80%, and the ratio of reception periods of the first communicator 121 and the second communicator 131 to the first unit period is 20%. In a case where a ratio between a transmission period and a reception period of the first communicator 121 and a ratio between the transmission period and the reception period of the second communicator 131 are the same as each other, the first power consumption of the first communicator 121 is larger than the second power consumption of the second communicator 131 at any of the communication utilization rates. The first unit period may be periods other than 1 second. The examples of the communication utilization rates herein are 0%, 50%, and 100%, but the relationships of power consumption between the first communicator 121 and the second communicator 131 are also the same as each other at other communication utilization rates. In addition, here, as a ratio between transmission and reception, an exemplary case is one in which transmission is 80% and reception is 20%, but the relationships of power consumption between the first communicator 121 and the second communicator 131 are also the same as each other in cases of other ratios.

The second unit period is a period for defining a relationship between periods in which the first communicator 121 and the second communicator 131 can establish communication connection. In the second unit period, the first communicator 121 and the second communicator 131 can perform a process for the establishment of communication connection. For example, the second unit period is ten minutes. For example, the second communicator 131 can establish communication connection for the entire ten minutes. On the other hand, the first communicator 121 can establish communication connection for only two minutes out of ten minutes. For the ten minutes, the first wireless communication terminal 101 operates. For example, for eight minutes out of the ten minutes, the power supply of only the first communicator 121 is cut off, or only the first communicator 121 is in a sleep (power saving) state. Alternatively, for eight minutes out of the ten minutes, the entirety of the first wireless communication terminal 101 including the first communicator 121 is in a sleep (power saving) state. For these reasons, the time for which the first communicator 121 can establish communication connection is only two minutes out of ten minutes. Even in a case where the entirety of the first wireless communication terminal 101 is in a sleep (power saving) state, the second communicator 131 can establish communication connection. The second unit period may be periods other than ten minutes.

The processor 111 transmits data or information to the second wireless communication terminal 201 using the first communicator 121 or the second communicator 131. Specifically, the processor 111 controls the first communicator 121 or the second communicator 131 so that data or information is transmitted to the second wireless communication terminal 201. That is, the processor 111 causes the first communicator 121 or the second communicator 131 to transmit data or information to the second wireless communication terminal 201. Thereby, the first communicator 121 or the second communicator 131 transmits data or information to the second wireless communication terminal 201. The processor 111 receives data or information from the second wireless communication terminal 201 using the first communicator 121 or the second communicator 131. Specifically, the processor 111 controls the first communicator 121 or the second communicator 131 so that data or information is received from the second wireless communication terminal 201. That is, the processor 111 causes the first communicator 121 or the second communicator 131 to receive data or information transmitted from the second wireless communication terminal 201. Thereby, the first communicator 121 or the second communicator 131 receives data or information from the second wireless communication terminal 201.

The first memory 141 is a volatile or non-volatile memory. The first memory 141 stores the zeroth time information. The first memory 141 may store a program for bringing the processor 111 into operation.

The first wireless communication terminal 101 may have components which are not shown in FIG. 2. For example, the first wireless communication terminal 101 may have at least one of a monitor and an operation unit.

As shown in FIG. 2, the antenna 124 and the antenna 134 are disposed within the communicators. The antenna 124 and the antenna 134 may be disposed outside the communicators. The antenna 124 may be disposed within the first communicator 121, and the antenna 134 may be disposed outside the second communicator 131. Alternatively, the antenna 124 may be disposed outside the first communicator 121, and the antenna 134 may be disposed within the second communicator 131. As shown in FIG. 2, the antenna 124 and the antenna 134 are configured as antennas different from each other. One antenna may be shared by the first communicator 121 and the second communicator 131.

The second wireless communication terminal 201 has one or a plurality of processors. In FIG. 3, one processor 211 is shown. The processor 211 is a computer of the second wireless communication terminal 201. For example, the processor 211 is constituted by a CPU. The processor 211 controls the operation of the second wireless communication terminal 201. The generation unit 212, the transmission control unit 213, and the scanning control unit 214 may be distributed to a plurality of processors.

For example, the function of the processor 211 can be realized as a function of software by the processor 211 reading and executing a program including commands for specifying the operation of the processor 211. A configuration for realizing this program is the same as a configuration for realizing a program for realizing the function of the processor 111.

In FIG. 3, an example is shown in which the generation unit 212, the transmission control unit 213, and the scanning control unit 214 function through software operating on the processor 211. The generation unit 212, the transmission control unit 213, and the scanning control unit 214 may be constituted by an ASIC or a FPGA.

For example, the third communicator 221 is a wireless module. The third communicator 221 includes a baseband circuit 222, an RF circuit 223, and an antenna 224. The baseband circuit 222 and the RF circuit 223 constitute a third communication circuit. The baseband circuit 222 performs digital signal processing in accordance with an instruction from the processor 211, and converts the digital signal into an analog signal through D/A conversion. The analog signal generated by the baseband circuit 222 is output to the RF circuit 223. In addition, the baseband circuit 222 converts the analog signal which is output from the RF circuit 223 into a digital signal through A/D conversion, and performs processes on the digital signal. Among the processes performed on the digital signal by the baseband circuit 222, a portion of a process of a MAC layer is controlled by the processor 211.

The RF circuit 223 modulates the analog signal which is output from the baseband circuit 222 into an analog signal having a frequency band of a carrier wave. The analog signal modulated by the RF circuit 223 is output to the antenna 224. In addition, the RF circuit 223 demodulates the analog signal having a frequency band of a carrier wave which is output from the antenna 224. The analog signal demodulated by the RF circuit 223 is output to the baseband circuit 222. The antenna 224 converts the analog signal which is output from the RF circuit 223 into radio waves, and transmits the radio waves to the first wireless communication terminal 101. In addition, the antenna 224 receives the radio waves transmitted from the first wireless communication terminal 101, and converts the received radio waves into an analog signal. The analog signal processed by the antenna 224 is output to the RF circuit 223.

For example, the fourth communicator 231 is a wireless module. The fourth communicator 231 includes a baseband circuit 232, an RF circuit 233, and an antenna 234. The baseband circuit 232 and the RF circuit 233 constitute a fourth communication circuit. The function of the baseband circuit 232 is the same as the function of the baseband circuit 222. The function of the RF circuit 233 is the same as the function of the RF circuit 223. The function of the antenna 234 is the same as the function of the antenna 224.

The third communicator 221 performs wireless communication in accordance with the first communication protocol. The fourth communicator 231 performs wireless communication in accordance with the second communication protocol.

The third unit period is a period for defining a relationship of power consumption between the third communicator 221 and the fourth communicator 231. For example, the third unit period is 1 second. The relationship of power consumption between the third communicator 221 and the fourth communicator 231 in the third unit period is the same as the relationship of power consumption between the first communicator 121 and the second communicator 131 in the first unit period.

The fourth unit period is a period for defining a relationship between periods in which the third communicator 221 and the fourth communicator 231 can establish communication connection. For example, the fourth unit period is ten minutes. The relationship between periods in which the third communicator 221 and the fourth communicator 231 can establish communication connection in the fourth unit period is the same as the relationship between periods in which the first communicator 121 and the second communicator 131 can establish communication connection in the second unit period.

The processor 211 transmits data or information to the first wireless communication terminal 101 using the third communicator 221 or the fourth communicator 231. Specifically, the processor 211 controls the third communicator 221 or the fourth communicator 231 so that data or information is transmitted to the first wireless communication terminal 101. That is, the processor 211 causes the third communicator 221 or the fourth communicator 231 to transmit data or information to the first wireless communication terminal 101. Thereby, the third communicator 221 or the fourth communicator 231 transmits data or information to the first wireless communication terminal 101. The processor 211 receives data or information from the first wireless communication terminal 101 using the third communicator 221 or the fourth communicator 231. Specifically, the processor 211 controls the third communicator 221 or the fourth communicator 231 so that data or information is received from the first wireless communication terminal 101. That is, the processor 211 causes the third communicator 221 or the fourth communicator 231 to receive data or information transmitted from the first wireless communication terminal 101. Thereby, the third communicator 221 or the fourth communicator 231 receives data or information from the first wireless communication terminal 101.

The second memory 241 is a non-volatile memory. The second memory 241 stores the scanning cycle information. The second memory 241 may store a program for bringing the processor 211 into operation.

The second wireless communication terminal 201 may have components which are not shown in FIG. 3. For example, the second wireless communication terminal 201 may have at least one of a monitor and an operation unit.

As shown in FIG. 3, the antenna 224 and the antenna 234 are disposed within the communicators. The antenna 224 and the antenna 234 may be disposed outside the communicators. The antenna 224 may be disposed within the third communicator 221, and the antenna 234 may be disposed outside the fourth communicator 231. Alternatively, the antenna 224 may be disposed outside the third communicator 221, and the antenna 234 may be disposed within the fourth communicator 231. As shown in FIG. 3, the antenna 224 and the antenna 234 are configured as antennas different from each other. One antenna may be shared by the third communicator 221 and the fourth communicator 231.

The first state and the second state indicate the operation states of the first communicator 121 in the first wireless communication terminal 101. The first state is a state in which the first communicator 121 performs an operation as a master unit defined in a wireless communication system applied to the first communicator 121. For example, the first state in IEEE802.11 is a state in which the transmission of Beacon and the transmission of a Probe Response can be performed. The Probe Response is a scanning response to a Probe Request which is a scanning request. The first communicator 121 which is in the first state may perform an operation as an AP of IEEE802.11, in addition to the transmissions of the Beacon and the Probe Response. The operation as an AP of IEEE802.11 is acceptance of connection from the STA and authentication and the like. The acceptance of connection in IEEE802.11 includes the reception of a connection request and the transmission of a connection request response. The connection request in IEEE802.11 is Association Request. The connection request response in IEEE802.11 is Association Response. The connection request and the connection request response are messages of the data link level.

The second state is a state in which the first communicator 121 does not perform an operation as a master unit defined in a wireless communication system applied to the first communicator 121. For example, the second state in IEEE802.11 is a state in which the transmission of Beacon and the transmission of Probe Response cannot be performed. For example, the second state is the following state.

(First Example of Second State)

The first wireless communication terminal 101 operates, and the first communicator 121 also operates. However, the start of an operation as a master unit is not instructed by the processor 111. For example, after the first communicator 121 starts an operation, the start of an operation as a master unit may not be instructed by the processor 111. Alternatively, after the stop of an operation as a master unit is instructed to the first communicator 121 by the processor 111, the start of an operation as a master unit may not be instructed by the processor 111.

(Second Example of Second State)

The first wireless communication terminal 101 operates. However, the first communicator 121 is in a sleep (power saving) state. Alternatively, the power is not supplied to the first communicator 121.

(Third Example of Second State)

The first wireless communication terminal 101 is in a sleep (power saving) state, and the first communicator 121 is also in a sleep (power saving) state. Alternatively, power is not supplied to the first communicator 121.

The zeroth time information (reference time information) indicates a timing of transition from the first state to the second state and a timing of transition from the second state to the first state. A time indicated by the zeroth time information may be any of an absolute time and a relative time. Insofar as the zeroth time information can indicate a timing of transition, the form of the zeroth time information may be other forms.

For example, the zeroth time information is a value written in a program for bringing the processor 111 into operation. The zeroth time information may be a value written in the non-volatile first memory 141. For example, the zeroth time information is written in the non-volatile first memory 141 in a manufacturing process. Alternatively, after a product is shipped, a user operates an operation unit, and thus the zeroth time information is written in the non-volatile first memory 141. The second communicator 131 may receive the zeroth time information from another terminal, and the received zeroth time information may be written in the non-volatile or volatile first memory 141. The zeroth time information may be received from another terminal through communication using another wired or wireless communicator which is not shown in the drawing, and the received zeroth time information may be written in the non-volatile or volatile first memory 141. A recording medium having the zeroth time information recorded thereon may be connected to the first wireless communication terminal 101, and the zeroth time information which is read out from the recording medium may be written in the non-volatile or volatile first memory 141. The zeroth time information may be changed on the basis of the operation of the first wireless communication terminal 101. For example, the zeroth time information may be changed so that a time period for which the first communicator 121 continues to be in the first state is shortened as the remaining amount of a battery of the first wireless communication terminal 101 is reduced.

The first time information indicates a timing at which the third communicator 221 of the second wireless communication terminal 201 performs the next scanning. The time indicated by the first time information may be any of an absolute time and a relative time. Insofar as the first time information can indicate a timing at which the next scanning is performed, the form of the first time information may be other forms.

The first switching time is a time at which the state of the first communicator 121 is switched from the first state to the second state. The switching control unit 113 switches the state of the first communicator 121 from the first state to the second state by giving an instruction for master unit operation stop to the first communicator 121 at the first switching time. The instruction for master unit operation stop is an instruction for causing the first communicator 121 to stop an operation as a master unit. The second switching time is a time at which the state of the first communicator 121 is switched from the second state to the first state. The second switching time is a time after the first switching time. The switching control unit 113 switches the state of the first communicator 121 from the second state to the first state by giving an instruction for master unit operation start to the first communicator 121 at the second switching time. The instruction for master unit operation start is an instruction for causing the first communicator 121 to start an operation as a master unit.

For example, the scanning cycle information indicates a constant cycle at all times. For example, a cycle indicated by the scanning cycle information is 10 seconds. The constant cycle may be cycles other than 10 seconds. Alternatively, the scanning cycle information indicates a varying cycle. For example, the cycle indicated by the scanning cycle information varies like 10 seconds, 20 seconds, 30 seconds, . . . . The cycle may vary like other than this example. The content of the scanning cycle information cannot be changed from at least a user application. The content of the scanning cycle information may not able to be changed from the processor 111.

Figure 4:
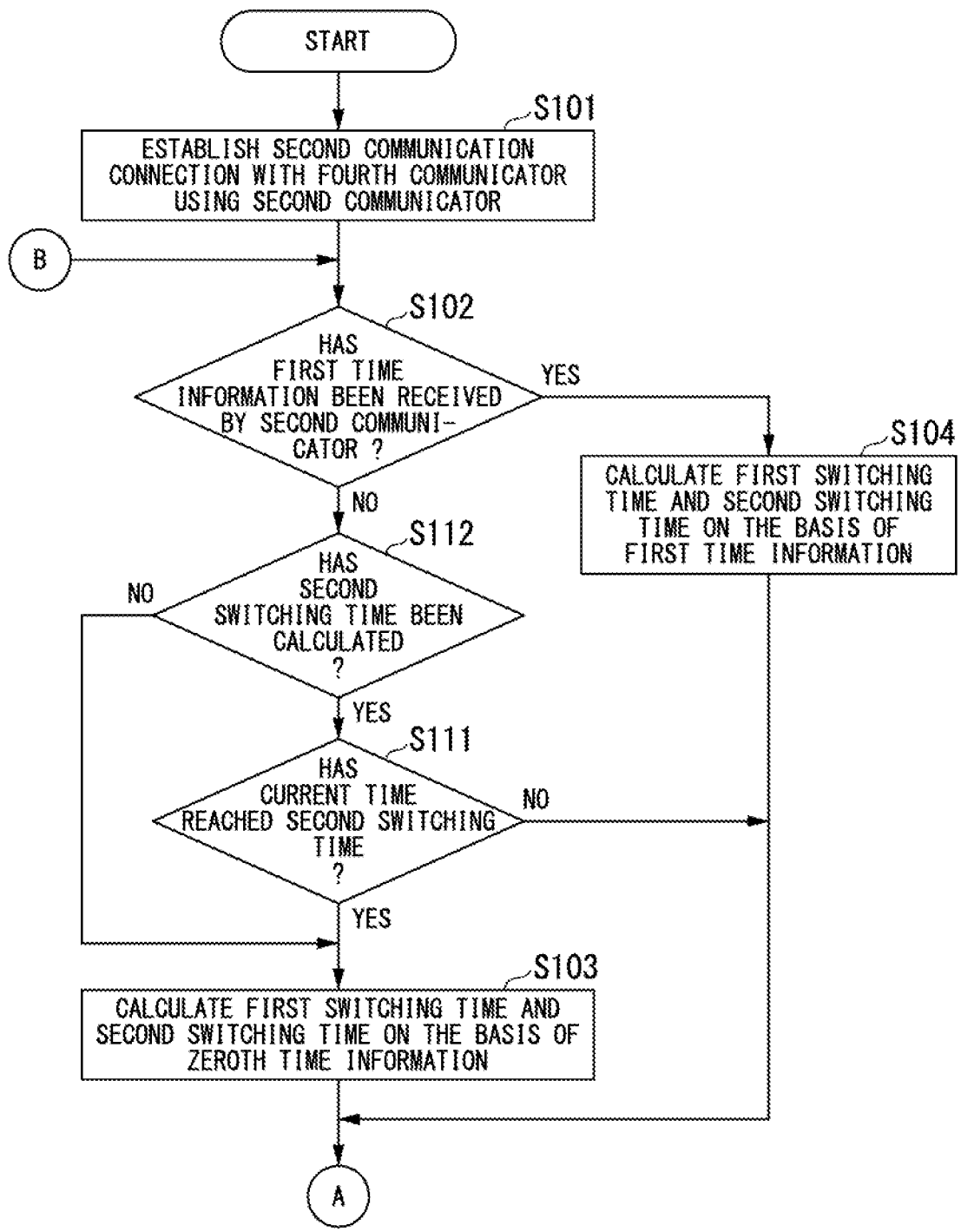
FIG. 4 is a flowchart showing a procedure of operations of the first wireless communication terminal according to the first embodiment of the present invention.
Figure 5:
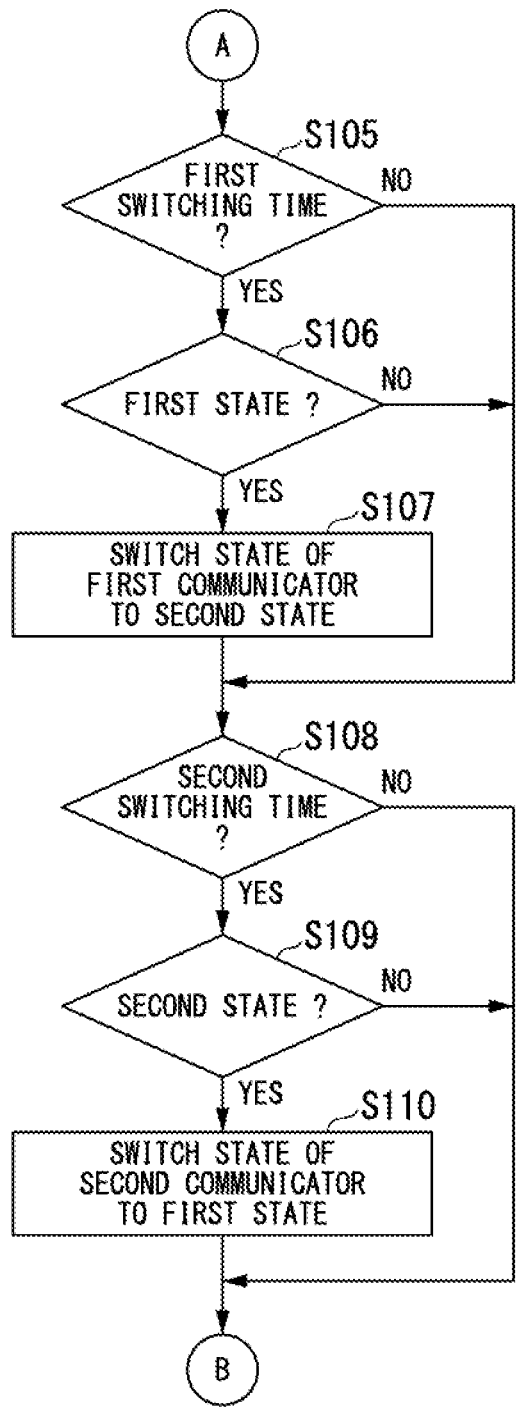
FIG. 5 is a flowchart showing a procedure of operations of the first wireless communication terminal according to the first embodiment of the present invention.

The operations of the first wireless communication terminal 101 will be described. FIGS. 4 and 5 show the operations of the first wireless communication terminal 101. In the operations shown in FIGS. 4 and 5, the first communicator 121 and the second communicator 131 maintain the above-described relationship of power consumption. In the description of flowcharts other than that shown in FIG. 4, the above-described relationship of power consumption is also maintained. At any timing before the operations shown in FIGS. 4 and 5 are started, the second communicator 131 and the fourth communicator 231 are brought into a state in which communication of the data link level can be performed.

(Step S101)

The processor 111 establishes the second communication connection with the fourth communicator 231 using the second communicator 131. That is, the processor 111 instructs the second communicator 131 to establish the second communication connection. The second communicator 131 establishes the second communication connection with the fourth communicator 231. Thereby, the second communication connection using the second communicator 131 and the fourth communicator 231 is established between the first wireless communication terminal 101 and the second wireless communication terminal 201. After a process in step S101 is performed, a process in step S102 is performed.

Regarding the establishment of the second communication connection, the first wireless communication terminal 101 performs the establishment of connection to the second wireless communication terminal 201, or accepts connection from the second wireless communication terminal 201. Depending on the type of wireless communication system to which the second communicator 131 and the fourth communicator 231 correspond, the role of a terminal is limited to a role of performing connection or a role of accepting connection. For example, the first wireless communication terminal 101 has a role of performing connection, and the second wireless communication terminal 201 has a role of accepting connection. Alternatively, the first wireless communication terminal 101 has a role of accepting connection, and the second wireless communication terminal 201 has a role of performing connection. In a case where the role of a terminal is not limited, the first wireless communication terminal 101 and the second wireless communication terminal 201 can perform both the execution of connection and the acceptance of connection. Regarding the establishment of the second communication connection, only single communication from one terminal to the other terminal is performed. Alternatively, multiple communications are performed between one terminal and the other terminal.

(Step S102)

In a case where the first time information is transmitted by the fourth communicator 231, the second communicator 131 receives the first time information. The calculation unit 112 monitors the second communicator 131, and determines whether the first time information has been received. In a case where the calculation unit 112 determines that the first time information has been received, a process in step S104 is performed. Until initial first time information is received, the calculation unit 112 determines that the first time information has not been received. After the calculation unit 112 determines that the first time information has been received, and until new first time information is received, the calculation unit 112 determines that the first time information has not been received. In a case where the calculation unit 112 determines that the first time information has not been received, a process in step S112 is performed.

In a case where the first time information is represented by an absolute time, the time is required to be synchronized in the first wireless communication terminal 101 and the second wireless communication terminal 201. A process for the synchronization of time is performed at a timing which is not shown in FIGS. 4 and 5. For example, the second wireless communication terminal 201 operating as a slave unit updates a timer on the basis of time information included in a notification signal which is transmitted by the first wireless communication terminal 101 operating as a master unit, and thus the synchronization of time may be performed. For example, in IEEE802.11, the notification signal is a Beacon. For example, in IEEE802.11, the timer is a TSF timer.

A structure of timing synchronization in a wireless communication system applied to the second communicator 131 may be used. Alternatively, a structure different from the structure of timing synchronization in the wireless communication system may be used. For example, the synchronization of time may be performed through communication using the second communicator 131 and the fourth communicator 231. Alternatively, the synchronization of time may be performed through communication using another wired or wireless communicator which is not shown in the drawing. Alternatively, the synchronization of time may be performed by a user performing a setting through an operation unit which is not shown in the drawing.

(Step S112)

The calculation unit 112 determines whether the second switching time has been calculated. In a case where the calculation unit 112 determines that the second switching time has been calculated, a process in step S111 is performed. In a case where the calculation unit 112 determines that the second switching time has not been calculated, a process in step S103 is performed. When the operations shown in FIGS. 4 and 5 are started, the second switching time is not yet calculated. After the second switching time is calculated through the process in step S103, the second switching time has been calculated.

(Step S111)

The calculation unit 112 determines whether a current time in the first wireless communication terminal 101 has reached the second switching time. In a case where the calculation unit 112 determines that the current time in the first wireless communication terminal 101 has reached the second switching time, the process in step S103 is performed. In a case where the calculation unit 112 determines that the current time in the first wireless communication terminal 101 has not reached the second switching time, a process in step S105 is performed.

(Step S103)

The calculation unit 112 calculates the first switching time and the second switching time on the basis of the zeroth time information. For example, the first switching time and the second switching time are calculated as follows.

A case will be described in which the timing of state transition is represented by an absolute time using the zeroth time information. For example, the zeroth time information is "transition to the first state in 1000 seconds, transition to the second state in 1060 seconds, transition to the first state in 1150 seconds, and transition to the second state in 1210 seconds". The first switching time is a timing of transition from the first state to the second state in the zeroth time information. The second switching time is later than the first switching time, and is a timing of transition from the second state to the first state.

A case will be described in which the timing of state transition is represented by a relative time using the zeroth time information. For example, the zeroth time information is "a repeat of the first state of 60 seconds and the second state of 90 seconds". For example, the first switching time is a time obtained by adding the duration of the first state indicated by the zeroth time information to the second switching time previously calculated. The second switching time is a time obtained by adding the duration of the second state indicated by the zeroth time information to the first switching time calculated in this manner. In a case where the first switching time and the second switching time are to be initially calculated, the second switching time may be the current time in the first wireless communication terminal 101. For example, a time at which the first switching time and the second switching time are initially calculated is a time when the power supply of the first wireless communication terminal 101 is turned on, and immediately after the second communication connection is established with the fourth communicator 231 by the second communicator 131. The switching control unit 113 is notified of the first switching time and the second switching time calculated by the calculation unit 112. In a case where the first switching time and the second switching time are to be initially calculated, the second switching time may be a time slightly later than the current time in the first wireless communication terminal 101. That is, a processing time period of the calculation unit 112 and a delay time period of a signal from the calculation unit 112 to the switching control unit 113 may be considered. Specifically, the second switching time may be a time obtained by adding a time period equal to or more than the sum of the processing time period and the delay time period to the current time in the first wireless communication terminal 101. After the second switching time is calculated, the switching control unit 113 can reliably switch the first communicator 121 to be in the first state. In a case where the first switching time and the second switching time are to be initially calculated, the first switching time is a time obtained by subtracting a duration of the second state indicated by the zeroth time information from the second switching time calculated in this manner. In that case, the first switching time may indicate the past time, but the first switching time may be ignored.

(Step S104)

The calculation unit 112 calculates the first switching time and the second switching time on the basis of the first time information. For example, the first switching time and the second switching time are calculated as follows.

A case will be described in which the timing of state transition is represented by an absolute time using the first time information. For example, the first time information is "1100 seconds". For example, the first switching time is a time at which the calculation unit 112 receives the first time information using the second communicator 131. The first switching time may be a time slightly later than the time at which the calculation unit 112 receives the first time information using the second communicator 131. That is, a processing time period of the calculation unit 112 and a delay time period of a signal from the calculation unit 112 to the switching control unit 113 may be considered. Specifically, the first switching time may be a time obtained by adding a time period equal to or more than the sum of the processing time period and the delay time period to the time at which the calculation unit 112 receives the first time information using the second communicator 131. The second switching time is a time slightly earlier than a timing indicated by the first time information. A delay time period from a first timing to a second timing is considered. The first timing is a timing at which the switching control unit 113 gives the instruction for master unit operation start to the first communicator 121. The second timing is a timing at which the first communicator 121 actually is brought into the first state and the transmission of a Beacon and a Probe Response can be performed. That is, the second switching time is a time obtained by subtracting a time period equal to or more than the delay time period from a timing indicated by the first time information.

A case will be described in which the timing of state transition is represented by a relative time using the first time information. For example, the first time information is "20 seconds later". The first switching time is the same as the first switching time in a case where the timing of state transition is represented by an absolute time. The second switching time is a time slightly earlier than a time obtained by adding a timing indicated by the first time information to the current time in the first wireless communication terminal 101. In the calculation of the second switching time, a processing time period of the calculation unit 112 and a first delay time period of a signal from the calculation unit 112 to the switching control unit 113 are considered. That is, the second switching time may be a time obtained by subtracting a time period equal to or more than the sum of the processing time period and the first delay time period from a time obtained by adding a timing indicated by the first time information to the current time in the first wireless communication terminal 101. Further, a second delay time period from a timing at which the second communicator 131 receives the first time information to a timing at which the calculation unit 112 receives a receipt notification for the first time information from the second communicator 131 may be considered. That is, the second switching time may be a time obtained by subtracting a time period equal to or more than the second delay time period from a time obtained by considering the processing time period and the first delay time period. Further, a third delay time period from a timing at which the first time information is generated in the second wireless communication terminal 201 to a timing at which the first time information is transmitted may be considered. That is, the second switching time may be a time obtained by subtracting a time period equal to or more than the third delay time period from a time obtained by considering the processing time period, the first delay time period, and the second delay time period.

(Step S105)

After the first switching time and the second switching time are calculated through step S103 or step S104, the switching control unit 113 determines whether the current time in the first wireless communication terminal 101 is the first switching time. In a case where the switching control unit 113 determines that the current time in the first wireless communication terminal 101 is the first switching time, a process in step S106 is performed. In a case where the switching control unit 113 determines that the current time in the first wireless communication terminal 101 is not the first switching time, a process in step S108 is performed.

(Step S106)

The switching control unit 113 determines whether the state of the first communicator 121 is the first state. For example, in a case where the switching control unit 113 has not given the instruction for master unit operation start to the first communicator 121, the switching control unit 113 determines that the state of the first communicator 121 is not the first state. On the other hand, in a case where the switching control unit 113 has given the instruction for master unit operation start to the first communicator 121, the switching control unit 113 makes the following determination. After the instruction is finally given, in a case where the switching control unit 113 has not given the instruction for master unit operation stop to the first communicator 121, and the switching control unit 113 does not receive a notification for master unit operation stop from the first communicator 121, the switching control unit 113 determines that the state of the first communicator 121 is the first state. Otherwise, the switching control unit 113 determines that the state of the first communicator 121 is not the first state. The switching control unit 113 may inquire the state of the first communicator 121, and may determine the state of the first communicator 121 on the basis of the content of a response from the first communicator 121. In a case where the switching control unit 113 determines that the state of the first communicator 121 is the first state, a process in step S107 is performed. In a case where the switching control unit 113 determines that the state of the first communicator 121 is not the first state, the process in step S108 is performed. That is, in a case where the state of the first communicator 121 is already the second state in the first switching time, the first communicator 121 continues to be in the second state.

(Step S107)

The switching control unit 113 switches the state of the first communicator 121 from the first state to the second state by giving the instruction for master unit operation stop to the first communicator 121. The state of the first communicator 121 is switched from the first state to the second state. After the process in step S107 is performed, the process in step S108 is performed.

(Step S108)

The switching control unit 113 determines whether the current time in the first wireless communication terminal 101 is the second switching time. In a case where the switching control unit 113 determines that the current time in the first wireless communication terminal 101 is the second switching time, a process in step S109 is performed. In a case where the switching control unit 113 determines that the current time in the first wireless communication terminal 101 is not the second switching time, the process in step S102 is performed.

(Step S109)

The switching control unit 113 determines whether the state of the first communicator 121 is the second state. For example, in a case where the switching control unit 113 has not given the instruction for master unit operation start to the first communicator 121, the switching control unit 113 determines that the state of the first communicator 121 is the second state. On the other hand, in a case where the switching control unit 113 has given the instruction for master unit operation start to the first communicator 121, the switching control unit 113 makes the following determination. After the instruction is finally given, in a case where the switching control unit 113 has not given the instruction for master unit operation stop to the first communicator 121, and the switching control unit 113 does not receive a notification for master unit operation stop from the first communicator 121, the switching control unit 113 determines that the state of the first communicator 121 is not the second state. Otherwise, the switching control unit 113 determines that the state of the first communicator 121 is the second state. The switching control unit 113 may inquire the state of the first communicator 121, and may determine the state of the first communicator 121 on the basis of the content of a response from the first communicator 121. In a case where the switching control unit 113 determines that the state of the first communicator 121 is the second state, a process in step S110 is performed. In a case where the switching control unit 113 determines that the state of the first communicator 121 is not the second state, the process in step S102 is performed. That is, in a case where the state of the first communicator 121 is already the first state in the second switching time, the first communicator 121 continues to be in the first state.

(Step S110)

The switching control unit 113 switches the state of the first communicator 121 from the second state to the first state by giving the instruction for master unit operation start to the first communicator 121. The state of the first communicator 121 is switched from the second state to the first state. After the process in step S110 is performed, the process in step S102 is performed.

In a case where the first wireless communication terminal 101 and the second wireless communication terminal 201 establish the first communication connection using the first communicator 121 and the third communicator 221 at a timing which is not shown in FIGS. 4 and 5, processes in FIGS. 4 and 5 are not performed. In that case, the first communicator 121 continues to be in the first state. In that case, after the first communication connection using the first communicator 121 and the third communicator 221 is cut off, processes in FIGS. 4 and 5 are performed from S102.

The operation of the first wireless communication terminal 101 when the state of the first communicator 121 is the first state will be described. In a case where a scanning request is transmitted by the third communicator 221, the first communicator 121 receives the scanning request. In a case where the scanning request is received, the processor 111 transmits a scanning response to the third communicator 221 using the first communicator 121.

In a case where a connection request is transmitted by the third communicator 221, the first communicator 121 receives the connection request. In a case where the connection request is received, the processor 111 transmits a connection request response to the third communicator 221 using the first communicator 121, and establishes the first communication connection with the third communicator 221. Thereafter, the processor 111 connects to the third communicator 221 by the first communicator 121, and performs data communication with the third communicator 221. Data which is transmitted between the first wireless communication terminal 101 and the second wireless communication terminal 201 may be any of moving image data, still image data, audio data, and document data. In a case where the second wireless communication terminal 201 has some kind of sensor, data which is transmitted between the first wireless communication terminal 101 and the second wireless communication terminal 201 may be sensor data.

After the first communication connection is established by the first communicator 121 and the third communicator 221, authentication and encryption of data communication may be performed in data communication performed by the first communicator 121 and the third communicator 221. After the second communication connection is established by the second communicator 131 and the fourth communicator 231, authentication and encryption of data communication may be performed in data communication performed by the second communicator 131 and the fourth communicator 231.

Figure 6:
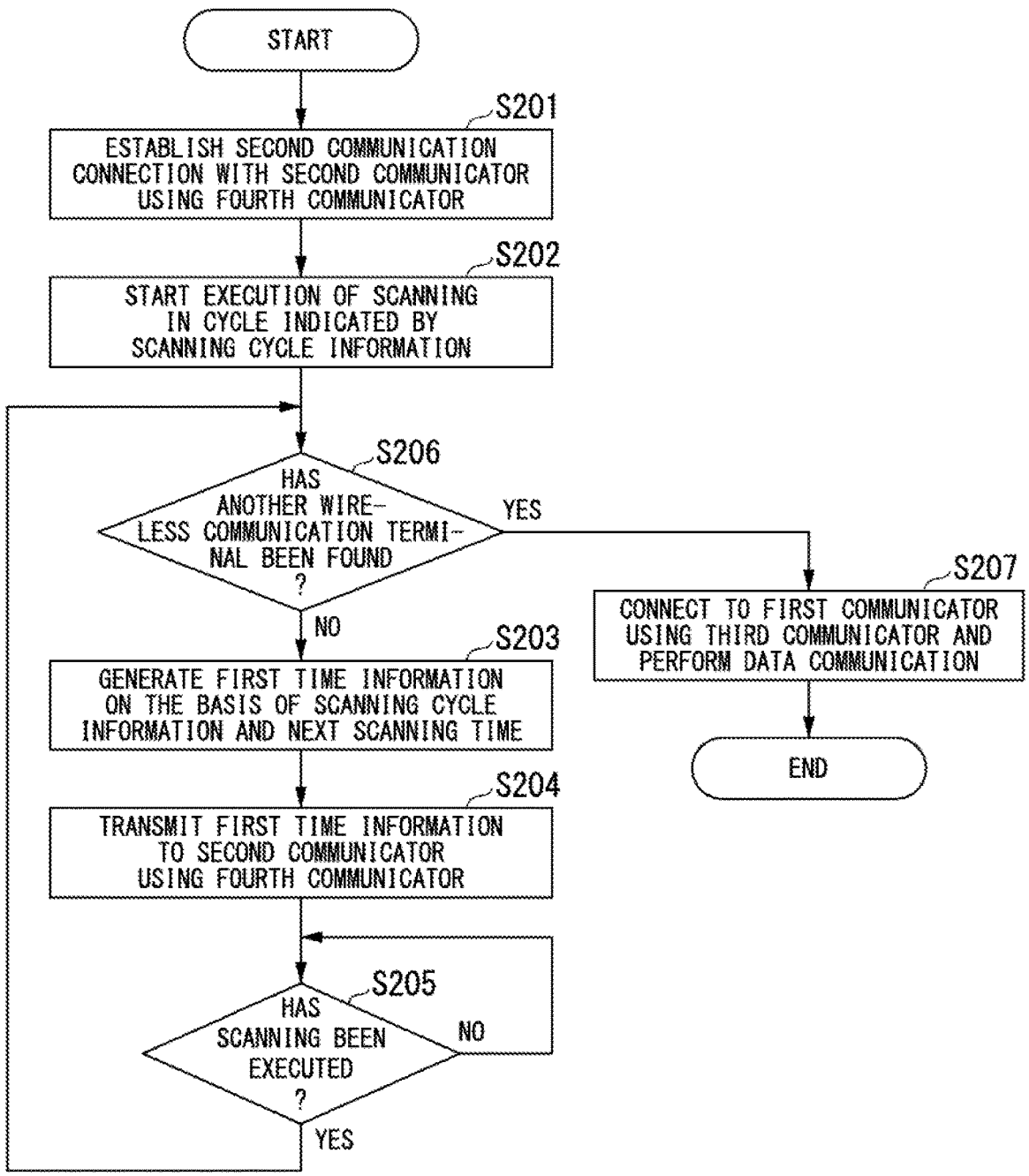
FIG. 6 is a flowchart showing a procedure of operations of the second wireless communication terminal according to the first embodiment of the present invention.

The operation of the second wireless communication terminal 201 will be described. FIG. 6 shows the operation of the second wireless communication terminal 201. In the operation shown in FIG. 6, the third communicator 221 and the fourth communicator 231 maintain the above-described relationship of power consumption. In the description of flowcharts other than that shown in FIG. 6, the above-described relationship of power consumption is also maintained. At any timing before the operation shown in FIG. 6 is started, the second communicator 131 and the fourth communicator 231 are brought into a state in which communication of the data link level can be performed.

(Step S201)

The processor 211 establishes the second communication connection with the second communicator 131 using the fourth communicator 231. That is, the processor 211 instructs the fourth communicator 231 to establish the second communication connection. The fourth communicator 231 establishes the second communication connection with the second communicator 131. Thereby, the second communication connection using the second communicator 131 and the fourth communicator 231 is established between the first wireless communication terminal 101 and the second wireless communication terminal 201. After a process in step S201 is performed, a process in step S202 is performed.

(Step S202)

The scanning control unit 214 reads out the scanning cycle information from the second memory 241. The scanning control unit 214 starts the execution of scanning in a cycle indicated by the scanning cycle information. After the execution of scanning is started, the scanning control unit 214 transmits the scanning request using the third communicator 221 in a cycle indicated by the scanning cycle information. In a case where the scanning request is transmitted by the third communicator 221, and then the scanning response is transmitted by the first communicator 121, the third communicator 221 receives the scanning response. The third communicator 221 notifies the scanning control unit 214 of a scanning completion result indicating whether the scanning response has been received. In FIG. 6, processes regarding the transmission of the scanning request and the reception of the scanning response are not shown. After the process in step S202 is performed, a process in step S206 is performed.

(Step S206)

After the execution of scanning is started, the scanning control unit 214 determines whether another wireless communication terminal, that is, the first wireless communication terminal 101 has been found on the basis of the scanning completion result from the third communicator 221. In a case where the scanning control unit 214 determines that the first wireless communication terminal 101 has been found, a process in step S207 is performed. In a case where the scanning control unit 214 determines that the first wireless communication terminal 101 has not been found, a process in step S203 is performed.

(Step S207)

The processor 211 establishes the first communication connection with the first communicator 121 of the found first wireless communication terminal 101 using the third communicator 221. Further, the processor 211 connects to the first communicator 121 by the third communicator 221, and performs data communication with the first communicator 121.

(Step S203)

The generation unit 212 generates the first time information on the basis of the scanning cycle information and the next scanning time. Specifically, the generation unit 212 calculates the next scanning time on the basis of the scanning cycle information, and generates the first time information using the next scanning time as a reference. After the process in step S203 is performed, a process in step S204 is performed. For example, the first time information is generated as follows.

A case will be described in which the timing of state transition is represented by an absolute time using the first time information. The generation unit 212 calculates the next scanning time on the basis of the scanning cycle information stored in the second memory 241 and the previous scanning time. The generation unit 212 generates the first time information indicating the calculated next scanning time. For example, in a case where a cycle indicated by the scanning cycle information is 60 seconds, and the previous scanning time is 1000 seconds, the next scanning time and the first time information indicate 1060 seconds.

A case will be described in which the timing of state transition is represented by a relative time using the first time information. The generation unit 212 calculates the next scanning time on the basis of the scanning cycle information stored in the second memory 241 and the previous scanning time. The generation unit 212 calculates a difference between the calculated next scanning time and a current time in the second wireless communication terminal 201, and generates the first time information indicating the calculated difference. For example, in a case where a cycle indicated by the scanning cycle information is 60 seconds, and the previous scanning time is 1000 seconds, the next scanning time is 1060 seconds. In a case where the current time is 1020 seconds, the first time information is "40 seconds later".

(Step S204)

The transmission control unit 213 transmits the first time information to the second communicator 131 using the fourth communicator 231. After the process in step S204 is performed, a process in step S205 is performed.

(Step S205)

The scanning control unit 214 waits for the scanning completion result from the third communicator 221. In a case where the scanning completion result is given from the third communicator 221, the process in step S206 is performed.

Figure 7:
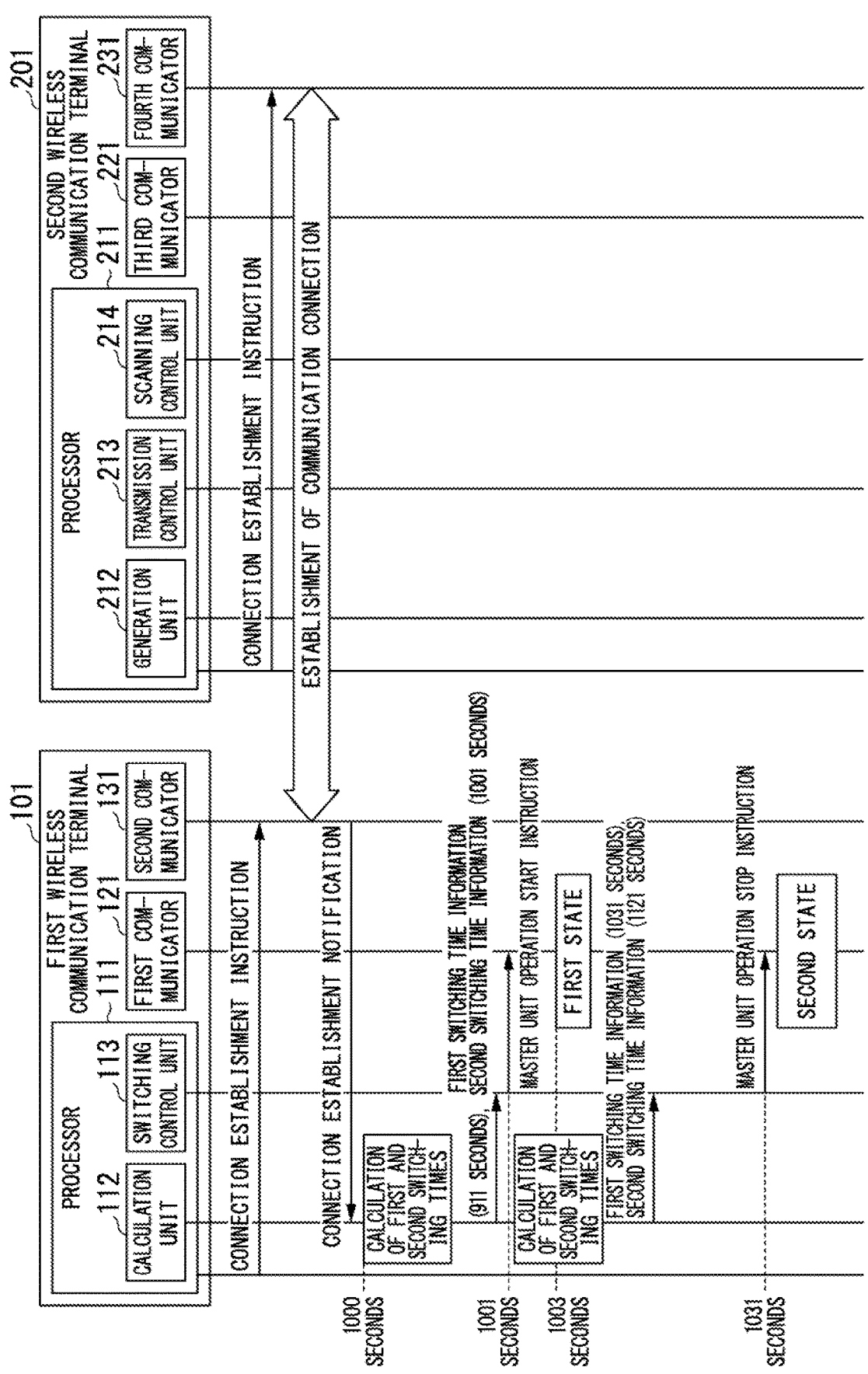
FIG. 7 is a sequence diagram showing a procedure of communication in the first embodiment of the present invention.
Figure 8:
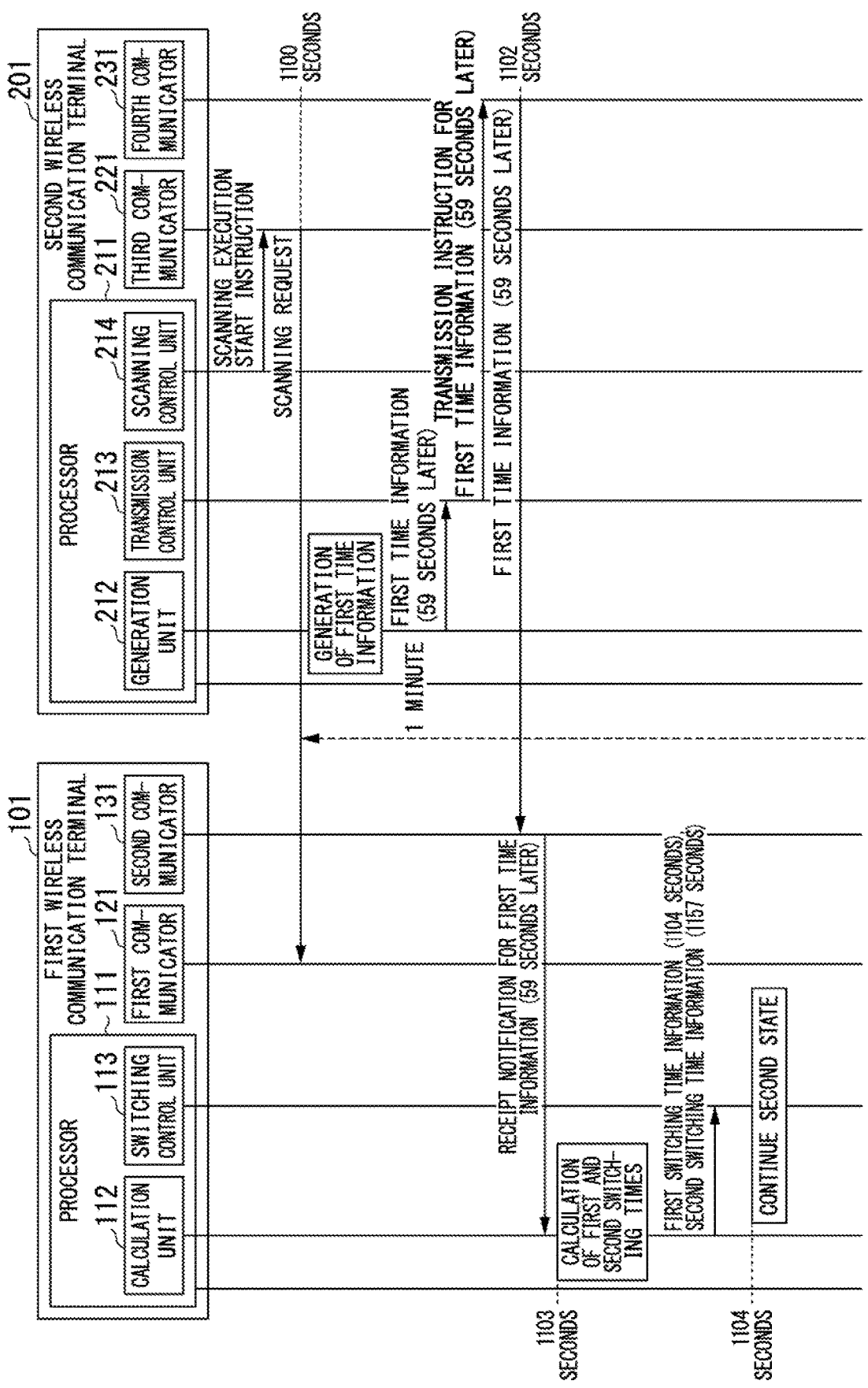
FIG. 8 is a sequence diagram showing a procedure of communication in the first embodiment of the present invention.
Figure 9:
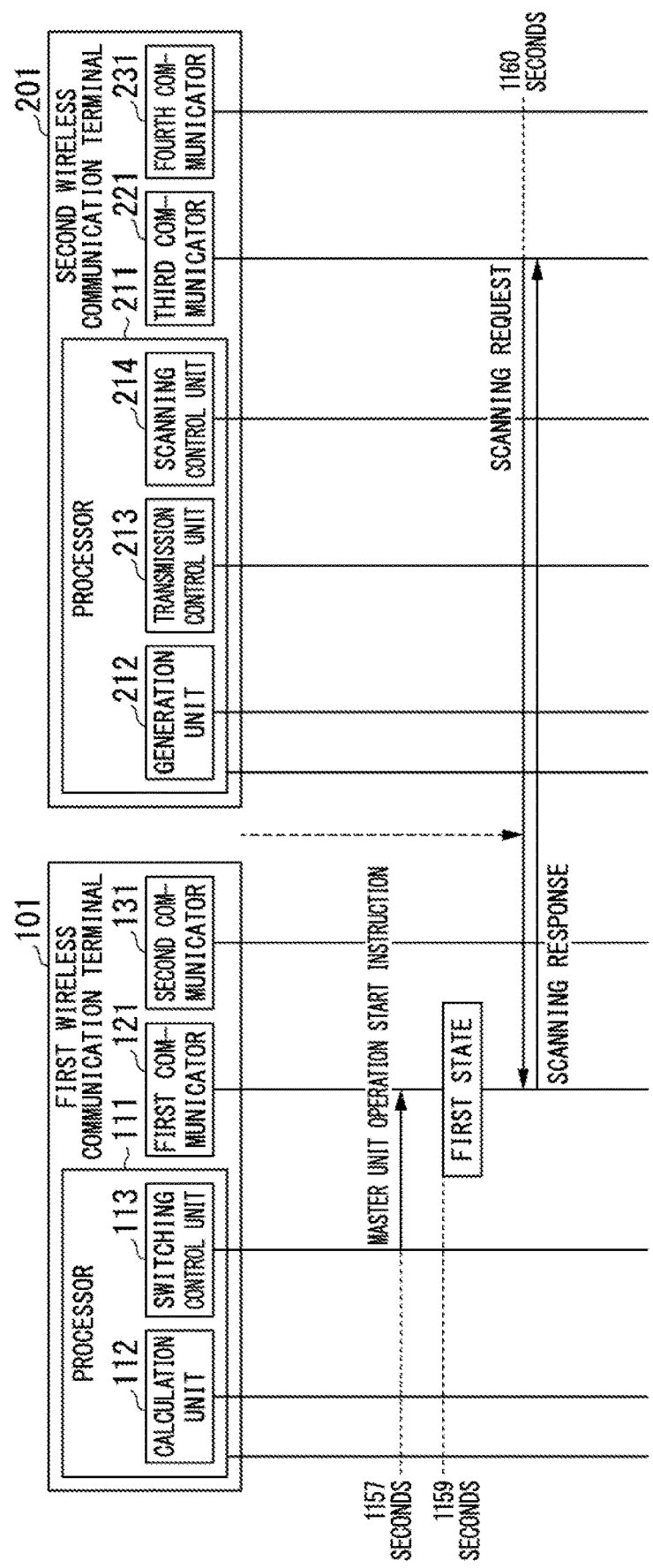
FIG. 9 is a sequence diagram showing a procedure of communication in the first embodiment of the present invention.

FIGS. 7 to 9 show a procedure of communication performed by the first wireless communication terminal 101 and the second wireless communication terminal 201. After communication shown in FIG. 7 is performed, communication shown in FIG. 8 is performed. After the communication shown in FIG. 8 is performed, communication shown in FIG. 9 is performed. The operation of each terminal will be described with reference to FIGS. 7 to 9.

Absolute times in the first wireless communication terminal 101 are written on the left ends of FIGS. 7 to 9. Absolute times in the second wireless communication terminal 201 are written on the right ends of FIGS. 7 to 9. For convenience for illustration, an interval between auxiliary lines indicating time is not necessarily proportional to an interval between each time. The foregoing particulars are also applied to time in the description of sequence diagrams other than those shown in FIGS. 7 to 9. The operation of each terminal is not limited by the time described in the following exemplary description.

In the first wireless communication terminal 101, the processor 111 instructs the second communicator 131 to establish the second communication connection (step S101). In the second wireless communication terminal 201, the processor 211 instructs the fourth communicator 231 to establish the second communication connection (step S201). The second communicator 131 and the fourth communicator 231 establish the second communication connection (step S101 and step S201).

After the second communication connection is established, the second communicator 131 gives notice of the establishment of the second communication connection to the calculation unit 112 (step S101). The calculation unit 112 receives the notice of the establishment of the second communication connection from the second communicator 131 (step S101). The calculation unit 112 calculates the first switching time and the second switching time on the basis of the zeroth time information (step S103). In this case, the current time in the first wireless communication terminal 101 is 1000 seconds. The calculation unit 112 notifies the switching control unit 113 of the first switching time and the second switching time which are calculated (step S103).

For example, a delay time period A from a timing at which the calculation unit 112 receives the notice of the establishment of the second communication connection from the second communicator 131 to a timing at which the switching control unit 113 receives information of the first switching time and the second switching time from the calculation unit 112 is 1 second. For example, the zeroth time information is "a repeat of the first state of 30 seconds and the second state of 90 seconds". In this example, the first communicator 121 attempts to start a master unit operation according to the instruction for master unit operation start. The first communicator 121 is brought into the first state 2 seconds later that. After the second communication connection is established, and the calculation unit 112 receives the notice of the establishment of the second communication connection from the second communicator 131, the calculation unit 112 calculates the first switching time and the second switching time. This time is first calculation.

As shown in Expression (1), the second switching time is a sum (1001 seconds) of the current time (1000 seconds) and the delay time period A (1 second).

$$1000 \text{ seconds} + 1 \text{ second} = 1001 \text{ seconds} \quad (1)$$

As shown in Expression (2), the first switching time is a difference (911 seconds) between the second switching time (1001 seconds) and a duration (90 seconds) of the second state indicated by the zeroth time information.

$$1001 \text{ seconds} - 90 \text{ seconds} = 911 \text{ second} \quad (2)$$

When the current time in the first wireless communication terminal 101 reaches 1001 seconds which is the second switching time, the switching control unit 113 causes the first communicator 121 to start a master unit operation by giving the instruction for master unit operation start to the first communicator 121 (step S110). The first communicator 121 is brought into the first state at 1003 seconds which is 2 seconds after 1001 seconds.

After the switching control unit 113 gives the instruction for master unit operation start to the first communicator 121, the calculation unit 112 calculates the first switching time and the second switching time again on the basis of the zeroth time information (step S103). The first switching time is 1031 seconds obtained by adding the duration (30 seconds) of the first state indicated by the zeroth time information to the previous second switching time (1001 seconds). The second switching time is 1121 seconds obtained by adding the duration (90 seconds) of the second state indicated by the zeroth time information to the calculated first switching time (1031 seconds).

When the current time in the first wireless communication terminal 101 reaches 1031 seconds which is the first switching time, the switching control unit 113 causes the first communicator 121 to stop the master unit operation by giving the instruction for master unit operation stop to the first communicator 121 (step S107). The first communicator 121 is brought into the second state.

In the second wireless communication terminal 201, the scanning control unit 214 gives an instruction for scanning execution start to the third communicator 221 (step S202). For example, a user inputs the instruction for scanning execution start by operating an operation unit. The third communicator 221 transmits a scanning request. In this case, the current time in the second wireless communication terminal 201 is 1100 seconds. In this case, the first communicator 121 of the first wireless communication terminal 101 is in a second state. For this reason, the first communicator 121 cannot respond to the scanning request. Since the scanning response is not obtained for a predetermined time period, the generation unit 212 generates the first time information (step S203). For example, the predetermined time period is 1 second.

In the examples shown in FIGS. 7 to 9, the first time information is represented by a relative time. Since a cycle indicated by the scanning cycle information is 60 seconds, and the previous scanning time is 1100 seconds, the next scanning time is 1160 seconds. For example, in a case where the predetermined time period is 1 second, the first time information is generated 1 second after the time (1100 seconds) at which the scanning request is transmitted. In this case, since the current time in the second wireless communication terminal 201 is 1101 seconds, the first time information is "59 seconds later".

The generation unit 212 notifies the transmission control unit 213 of the first time information (step S203). The transmission control unit 213 gives a transmission instruction for the first time information to the fourth communicator 231, and transmits the first time information to the second communicator 131 using the fourth communicator 231 (step S204).

When the first time information is received, the second communicator 131 gives a receipt notification for the first time information to the calculation unit 112 (step S102). The calculation unit 112 receives the receipt notification for the first time information from the second communicator 131 (step S102). The calculation unit 112 calculates the first switching time and the second switching time on the basis of the first time information (step S104). In this case, the current time in the first wireless communication terminal 101 is 1103 seconds. The calculation unit 112 notifies the switching control unit 113 of the first switching time and the second switching time which are calculated (step S104).

When a delay time period from a timing at which the generation unit 212 generates the first time information to a timing at which the transmission control unit 213 transmits the first time information using the fourth communicator 231 is defined as a delay time period B, the first wireless communication terminal 101 assumes the delay time period B to be 1 second. A delay time period C from a timing at which the second communicator 131 receives the first time information to a timing at which the calculation unit 112 receives the receipt notification for the first time information from the second communicator 131 is 1 second. A delay time period D from a timing at which the calculation unit 112 receives the receipt notification for the first time information from the second communicator 131 to a timing at which the switching control unit 113 receives the information of the first switching time and the second switching time from the calculation unit 112 is 1 second. An estimated time period from a timing at which the switching control unit 113 gives the instruction for master unit operation start to the first communicator 121 until the first communicator 121 is brought into the first state is 2 seconds.

As shown in Expression (3), the first switching time is 1104 seconds obtained by adding the delay time period D (1 second) to the timing (1103 seconds) at which the calculation unit 112 has received the receipt notification for the first time information.

$$1103 \text{ seconds} + 1 \text{ second} = 1104 \text{ seconds} \quad (3)$$

As shown in Expression (4), the second switching time is 1157 seconds obtained by subtracting the estimated time period (2 seconds), the delay time period B (1 second), the delay time period C (1 second), and the delay time period D (1 second) from a time obtained by adding the time (59 seconds) indicated by the first time information to the timing (1103 seconds) at which the calculation unit 112 has received the receipt notification for the first time information.

$$1103 \text{ seconds} + 59 \text{ seconds} - 2 \text{ seconds} - 1 \text{ second} - 1 \text{ second} - 1 \text{ second} = 1157 \text{ seconds} \quad (4)$$

When the current time in the first wireless communication terminal 101 reaches 1104 seconds which is the first switching time, the switching control unit 113 determines that the first communicator 121 is already in the second state (step S106). Therefore, the switching control unit 113 causes the first communicator 121 to continue to be in the second state.

When the current time in the first wireless communication terminal 101 reaches 1157 seconds which is the second switching time, the switching control unit 113 causes the first communicator 121 to start an master unit operation by giving the instruction for master unit operation start to the first communicator 121 (step S110). The first communicator 121 is brought into the first state at 1159 seconds which is 2 seconds after 1157 seconds.

When the current time in the second wireless communication terminal 201 reaches 1160 seconds, the third communicator 221 transmits a scanning request. In this case, the first communicator 121 of the first wireless communication terminal 101 is in the first state. Therefore, the first communicator 121 transmits a scanning response. The third communicator 221 receives the scanning response. Since the scanning response is received, the scanning control unit 214 finds the first wireless communication terminal 101 (step S206).

A wireless communication method of each aspect of the present invention is based on the operations shown in FIGS. 4 and 5. The wireless communication method has a first step (step S103), a second step (step S104), a third step (step S107), a fourth step (step S110), a fifth step (step S107), and a sixth step (step S110) which are executed by the first wireless communication terminal 101. In a case where the first time information transmitted by the fourth communicator 231 is not received by the second communicator 131, in the first step, the first wireless communication terminal 101 (calculation unit 112) calculates the first switching time and the second switching time on the basis of the zeroth time information. In a case where the first time information is received by the second communicator 131, in the second step, the first wireless communication terminal 101 (calculation unit 112) calculates the first switching time and the second switching time on the basis of the first time information.

In a case where the first time information is not received by the second communicator 131, in the third step, the first wireless communication terminal 101 (switching control unit 113) switches the state of the first communicator 121 which is the first state from the first state to the second state at the first switching time calculated on the basis of the zeroth time information. In a case where the first time information is not received by the second communicator 131, in the fourth step, the first wireless communication terminal 101 (switching control unit 113) switches the state of the first communicator 121 which is the second state from the second state to the first state at the second switching time calculated on the basis of the zeroth time information. In a case where the state of the first communicator 121 is the first state when the first time information is received by the second communicator 131, in the fifth step, the first wireless communication terminal 101 (switching control unit 113) switches the state of the first communicator 121 from the first state to the second state at the first switching time calculated on the basis of the first time information. In a case where the state of the first communicator 121 is the second state when the first time information is received by the second communicator 131, the first communicator 121 continues to be in the second state, and in the sixth step, the first wireless communication terminal 101 (switching control unit 113) switches the state of the first communicator 121 from the second state to the first state at the second switching time calculated on the basis of the first time information.

The wireless communication method of each aspect of the present invention need not have processes other than the processes corresponding to the first to sixth steps.

Another wireless communication method of each aspect of the present invention is based on operation shown in FIG. 6. The wireless communication method has a first step (step S202), a second step (step S203), and a third step (step S204) which are executed by the second wireless communication terminal 201. In the first step, the second wireless communication terminal 201 (scanning control unit 214) confirms whether a wireless communication terminal having the first communicator 121 in an operation in the first state is present by executing scanning. The second wireless communication terminal 201 (scanning control unit 214) executes the scanning by transmitting the scanning request using the third communicator 221 at a cycle indicated by the scanning cycle information. In the second step, the second wireless communication terminal 201 (generation unit 212) generates the first time information using the next scanning time calculated on the basis of the scanning cycle information as a reference. In the third step, the second wireless communication terminal 201 (transmission control unit 213) transmits the first time information to the second communicator 131 using the fourth communicator 231.

Another wireless communication method of each aspect of the present invention need not have processes other than the processes corresponding to the first to third steps.

As stated above, the second wireless communication terminal 201 transmits the first time information to the first wireless communication terminal 101 using the fourth communicator 231. The first communicator 121 of the first wireless communication terminal 101 is in the second state while the second wireless communication terminal 201 does not execute scanning, and is brought into the first state before the scanning is executed. Therefore, in the first embodiment, it is possible to suppress the power consumption of the first wireless communication terminal 101, and to shorten a time period required for finding the first wireless communication terminal 101.

(First Modification Example of First Embodiment)

Figure 10:
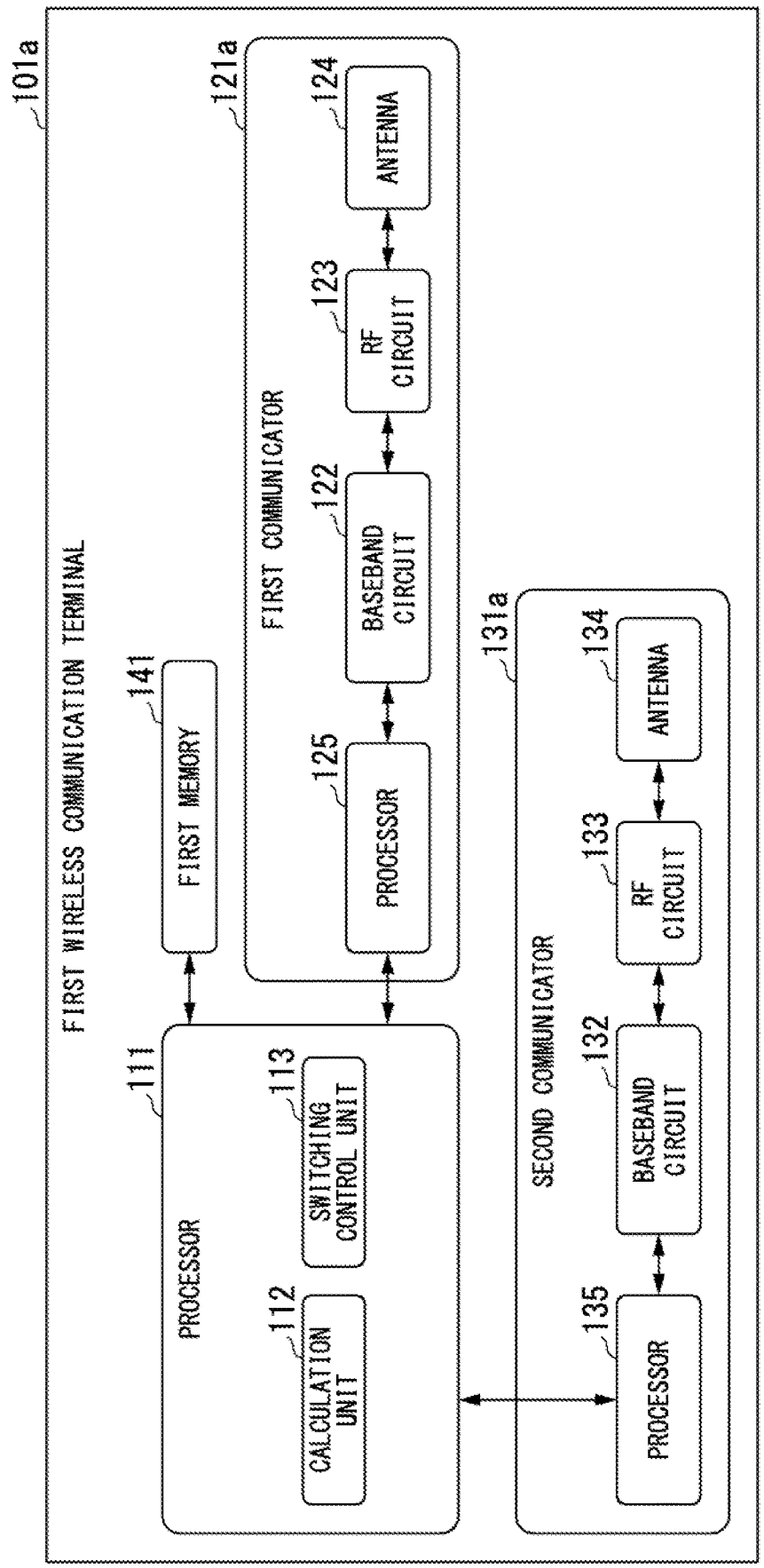
FIG. 10 is a block diagram showing a hardware configuration of a first wireless communication terminal according to a first modification example of the first embodiment of the present invention.

FIG. 10 shows a hardware configuration of a first wireless communication terminal 101*a* according to a first modification example of the first embodiment of the present invention. Regarding the configuration shown in FIG. 10, points different from those of the configuration shown in FIG. 2 will be described.

In the first wireless communication terminal 101*a*, the first communicator 121 in the first wireless communication terminal 101 shown in FIG. 2 is changed to a first communicator 121*a*, and the second communicator 131 in the first wireless communication terminal 101 shown in FIG. 2 is changed to a second communicator 131*a*. The first communicator 121*a* includes a baseband circuit 122, an RF circuit 123, an antenna 124, and a processor 125. The processor 125 controls the baseband circuit 122. In the first communicator 121*a*, components other than the processor 125 are the same as the components in the first communicator 121. The second communicator 131*a* includes a baseband circuit 132, an RF circuit 133, an antenna 134, and a processor 135.

The processor 135 controls the baseband circuit 132. In the second communicator 131*a*, components other than the processor 135 are the same as the components in the second communicator 131. The processor 111 controls the processor 125 and the processor 135. The processor 111, the processor 125, and the processor 135 control wireless communication in cooperation with each other. Regarding points other than stated, the configuration shown in FIG. 10 is the same as the configuration shown in FIG. 2.

Only the first communicator 121*a* out of the first communicator 121*a* and the second communicator 131*a* may be changed to the first communicator 121 shown in FIG. 2. Alternatively, only the second communicator 131*a* out of the first communicator 121*a* and the second communicator 131*a* may be changed to the second communicator 131 shown in FIG. 2.

The calculation unit 112 and the switching control unit 113 operate on the processor 111. The switching control unit 113 may operate on the processor 125. The calculation unit 112 may operate on the processor 125 or the processor 135. In a case where the switching control unit 113 operates on the processor 125, the calculation unit 112 operates on the processor 125 or the processor 135. In a case where the switching control unit 113 operates on the processor 111, the calculation unit 112 operates on the processor 111 or the processor 135.

In a case where the calculation unit 112 operates on the processor 125, the first memory 141 may be disposed within the first communicator 121*a*, and be accessed from the processor 125. Alternatively, in a case where the calculation unit 112 operates on the processor 125, the first memory 141 may be disposed outside the first communicator 121*a*, and be accessed from the processor 125.

In a case where the calculation unit 112 operates on the processor 135, the first memory 141 may be disposed within the second communicator 131*a*, and be accessed from the processor 135. Alternatively, in a case where the calculation unit 112 operates on the processor 135, the first memory 141 may be disposed outside the second communicator 131*a*, and be accessed from the processor 135.

(Second Modification Example of First Embodiment)

Figure 11:
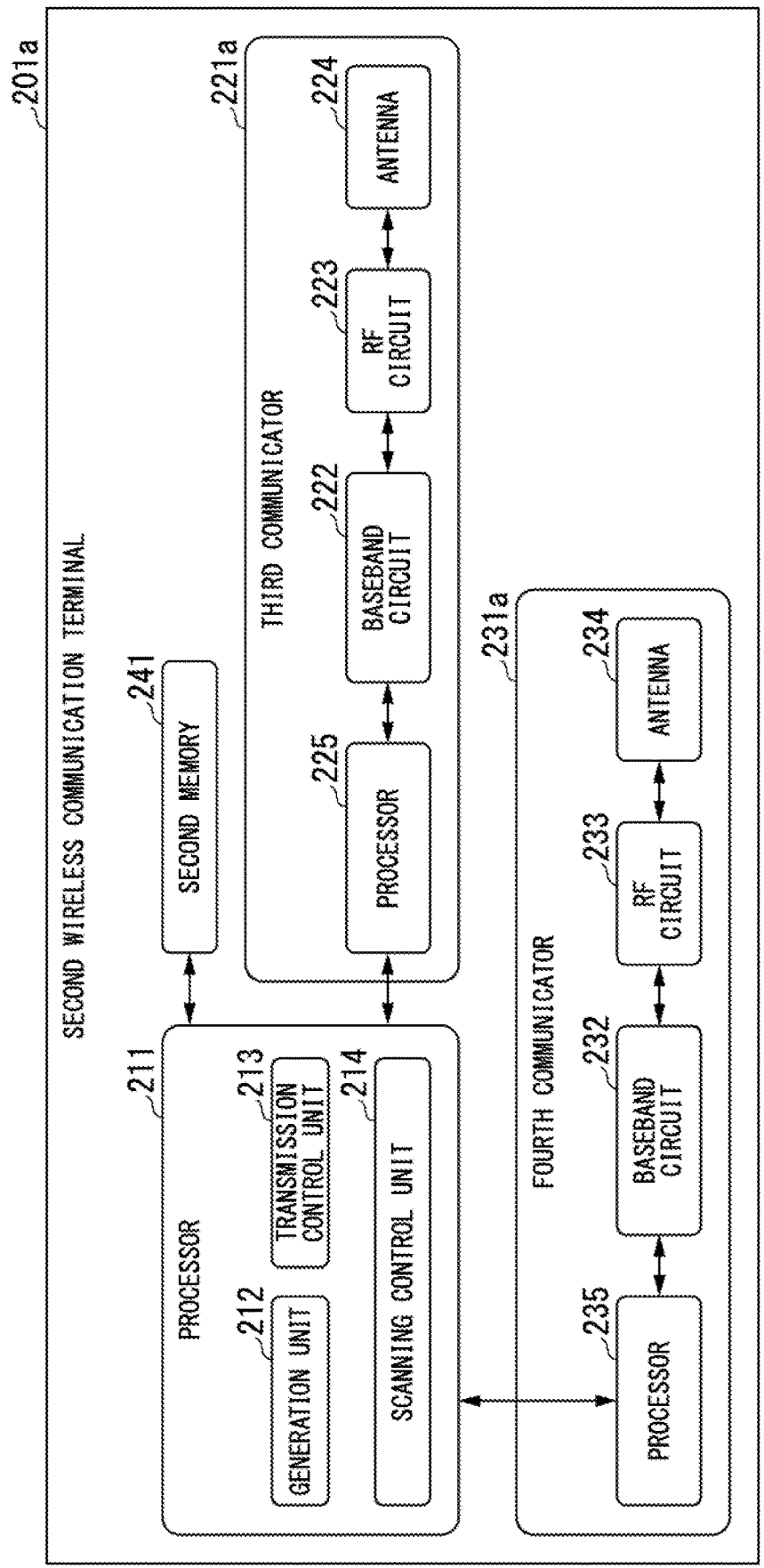
FIG. 11 is a block diagram showing a hardware configuration of a second wireless communication terminal according to a second modification example of the first embodiment of the present invention.

FIG. 11 shows a hardware configuration of a second wireless communication terminal 201*a* according to a second modification example of the first embodiment of the present invention. Regarding the configuration shown in FIG. 11, points different from those of the configuration shown in FIG. 3 will be described.

In the second wireless communication terminal 201*a*, the third communicator 221 in the second wireless communication terminal 201 shown in FIG. 3 is changed to a third communicator 221*a*, and the fourth communicator 231 in the second wireless communication terminal 201 shown in FIG. 3 is changed to a fourth communicator 231*a*. The third communicator 221*a* includes a baseband circuit 222, an RF circuit 223, an antenna 224, and a processor 225. The processor 225 controls the baseband circuit 222. In the third communicator 221*a*, components other than the processor 225 are the same as the components in the third communicator 221. The fourth communicator 231*a* includes a baseband circuit 232, an RF circuit 233, an antenna 234, and a processor 235. The processor 235 controls the baseband circuit 232. In the fourth communicator 231*a*, components other than the processor 235 are the same as the components in the fourth communicator 231. The processor 211 controls the processor 225 and the processor 235. The processor 211, the processor 225, and the processor 235 control wireless communication in cooperation with each other. Regarding points other than stated, the configuration shown in FIG. 11 is the same as the configuration shown in FIG. 3.

Only the third communicator 221*a* out of the third communicator 221*a* and the fourth communicator 231*a* may be changed to the third communicator 221 shown in FIG. 3. Alternatively, only the fourth communicator 231*a* out of the third communicator 221*a* and the fourth communicator 231*a* may be changed to the fourth communicator 231 shown in FIG. 3.

The generation unit 212, the transmission control unit 213, and the scanning control unit 214 operate on the processor 211. The scanning control unit 214 may operate on the processor 225. The transmission control unit 213 may operate on the processor 235. The generation unit 212 may operate on the processor 225 or the processor 235. In a case where the scanning control unit 214 operates on the processor 211, the generation unit 212 operates on the processor 211 or the processor 235. In a case where the transmission control unit 213 operates on the processor 211, the generation unit 212 operates on the processor 211 or the processor 225.

(Third Modification Example of First Embodiment)

Figure 12:
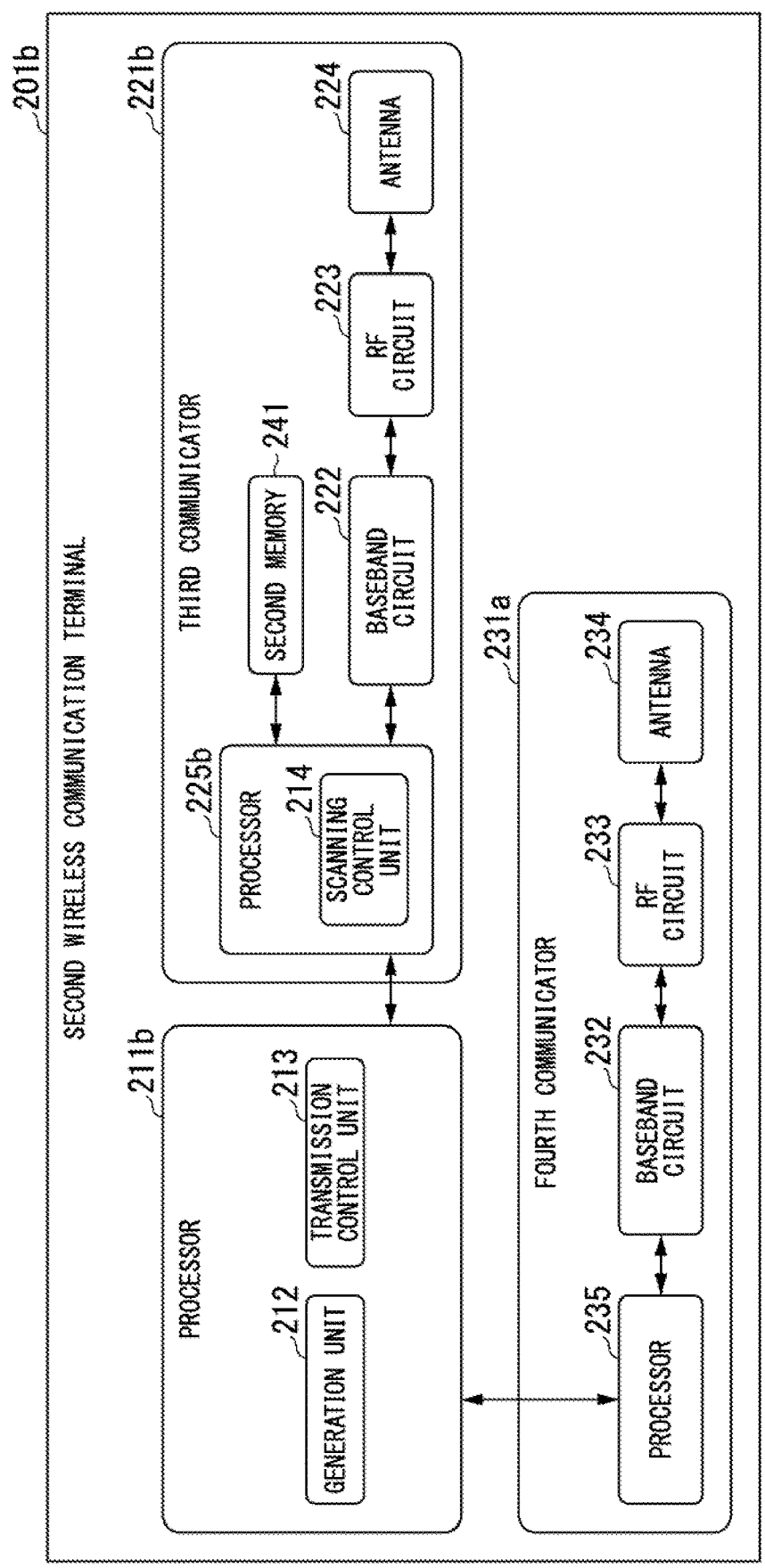
FIG. 12 is a block diagram showing a hardware configuration of a second wireless communication terminal according to a third modification example of the first embodiment of the present invention.

FIG. 12 shows a hardware configuration of a second wireless communication terminal 201*b* according to a third modification example of the first embodiment of the present invention. Regarding the configuration shown in FIG. 12, points different from those of the configuration shown in FIG. 11 will be described.

In the second wireless communication terminal 201b, the processor 211 in the second wireless communication terminal 201a shown in FIG. 11 is changed to a processor 211b, and the third communicator 221a in the second wireless communication terminal 201a shown in FIG. 11 is changed to a third communicator 221b. The processor 211b includes a generation unit 212 and a transmission control unit 213. In the third communicator 221b, the processor 225 in the second wireless communication terminal 201a shown in FIG. 11 is changed to a processor 225b. The processor 225b includes a scanning control unit 214. The second memory 241 is disposed within the third communicator 221b, and is accessed from the processor 225b. Regarding points other than stated, the configuration shown in FIG. 12 is the same as the configuration shown in FIG. 10.

The fourth communicator 231a may be changed to the fourth communicator 231 shown in FIG. 3. The second memory 241 may be disposed outside the third communicator 221b, and be accessed from the processor 225b.

Second Embodiment

Figure 13:
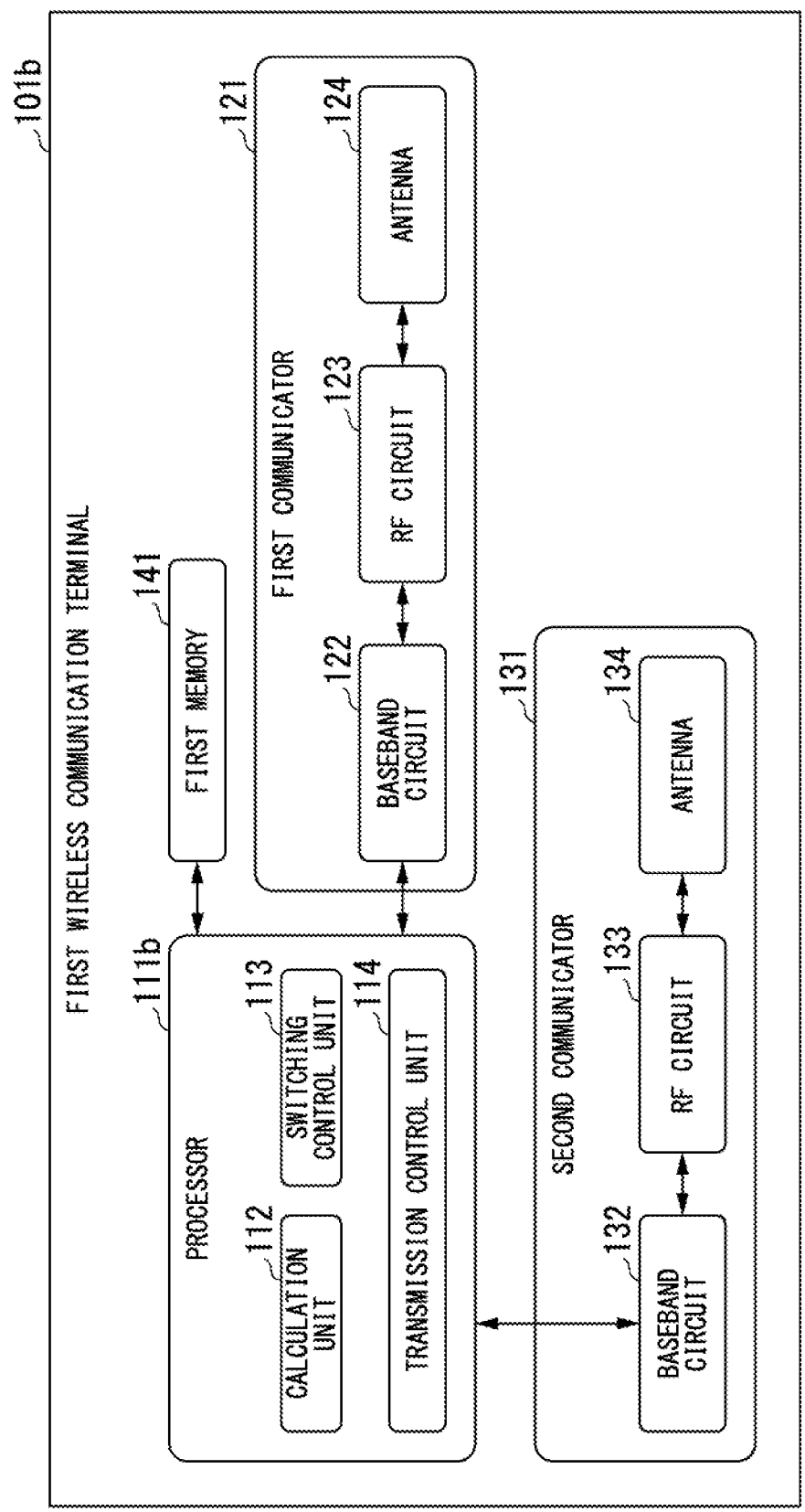
FIG. 13 is a block diagram showing a hardware configuration of a first wireless communication terminal according to a second embodiment of the present invention.

FIG. 13 shows a hardware configuration of a first wireless communication terminal 101b according to a second embodiment of the present invention. Regarding the configuration shown in FIG. 13, points different from those of the configuration shown in FIG. 2 will be described.

In the first wireless communication terminal 101b, the processor 111 in the first wireless communication terminal 101 shown in FIG. 2 is changed to a processor 111b.

The processor 111b includes a calculation unit 112, a switching control unit 113, and a transmission control unit 114.

The transmission control unit 114 transmits second time information to the fourth communicator 231 using the second communicator 131. The second time information indicates a time at which the state of the first communicator 121 is switched from the second state to the first state in accordance with a first instruction (instruction for master unit operation start) given to the first communicator 121 by the switching control unit 113 at the second switching time calculated on the basis of the first time information. The first instruction is an instruction for switching the state of the first communicator 121 from the second state to the first state. In a case where a connection request is not received by the first communicator 121 until the first switching time calculated on the basis of the first time information comes, the transmission control unit 114 transmits the second time information to the fourth communicator 231 using the second communicator 131. The connection request indicates a request for communication connection for communication of a higher level than the data link level.

The transmission control unit 114 further transmits third time information to the fourth communicator 231 using the second communicator 131. The third time information indicates a time at which the state of the first communicator 121 is switched from the first state to the second state in accordance with a second instruction (instruction for master unit operation stop) given to the first communicator 121 by the switching control unit 113 at the first switching time calculated on the basis of the first time information. The second instruction is an instruction for switching the state of the first communicator 121 from the first state to the second state. In a case where a connection request is not received by the first communicator 121 until the first switching time calculated on the basis of the first time information comes, the transmission control unit 114 further transmits the third time information to the fourth communicator 231 using the second communicator 131.

In a case where a scanning request is received by the first communicator 121 which is in the first state, the transmission control unit 114 transmits a scanning response to the third communicator 221 using the first communicator 121. In a case where the connection request is received by the first communicator 121 which is in the first state, the transmission control unit 114 transmits a connection request response to the third communicator 221 using the first communicator 121.

In FIG. 13, an example is shown in which the transmission control unit 114 functions through software operating on the processor 111b. The transmission control unit 114 may be constituted by an ASIC or a FPGA.

Regarding points other than stated, the configuration shown in FIG. 13 is the same as the configuration shown in FIG. 2.

The operation of the second wireless communication terminal 201 of the second embodiment is different from the operation of the second wireless communication terminal 201 of the first embodiment in the following points. In a case where the second time information transmitted by the second communicator 131 is received by the fourth communicator 231, the generation unit 212 generates the first time information by correcting the next scanning time on the basis of the second time information. The second time information indicates a time at which the state of the first communicator 121 which is the second state is switched from the second state to the first state, that is, the second switching time.

In a case where the third time information transmitted by the second communicator 131 is received by the fourth communicator 231, the generation unit 212 generates the first time information by correcting the next scanning time on the basis of the second time information and the third time information. The third time information indicates a time at which the state of the first communicator 121 which is the first state is switched from the first state to the second state, that is, the first switching time.

In a case where the second wireless communication terminal 201 cannot find the first wireless communication terminal 101b through scanning executed after the first time information is transmitted, the second time information and the third time information regarding the operation of the first wireless communication terminal 101b are transmitted to the second wireless communication terminal 201. The generation unit 212 of the second wireless communication terminal 201 generates new first time information by correcting the next scanning time on the basis of the second time information and the third time information. The new first time information is transmitted to the first wireless communication terminal 101b, and thus the first communicator 121 of the first wireless communication terminal 101b can be brought into the first state before the next scanning is executed. Therefore, the second wireless communication terminal 201 can find the first wireless communication terminal 101b.

The operation of the first wireless communication terminal 101b will be described. Among processes shown in FIGS. 4 and 5 in the first embodiment, processes shown in FIG. 5 are changed to processes shown in FIG. 14. Regarding the processes shown in FIG. 14, points different from those of the processes shown in FIG. 5 will be described.

(Step S121)

The switching control unit 113 determines whether the first communicator 121 has been brought into the first state as the second switching time based on the first time information has elapsed. In a case where the switching control unit 113 determines that the first communicator 121 has been brought into the first state as the second switching time based on the first time information has elapsed, a process in step S122 is performed. In a case where the switching control unit 113 determines that the first communicator 121 has been brought into the first state as the second switching time based on the zeroth time information has elapsed, the process in step S107 is performed.

(Step S122)

The switching control unit 113 determines whether the connection request has been received when the state of the first communicator 121 is the first state. In a case where the switching control unit 113 determines that the connection request has been received when the state of the first communicator 121 is the first state, the process in step S108 is performed. In a case where the switching control unit 113 determines that the connection request has not been received when the state of the first communicator 121 is the first state, a process in step S123 is performed.

(Step S123)

The switching control unit 113 switches the state of the first communicator 121 from the first state to the second state by giving the instruction for master unit operation stop to the first communicator 121. The state of the first communicator 121 is switched from the first state to the second state. The process in step S123 is the same as the process in step S107. After the process in step S123 is performed, a process in step S124 is performed.

(Step S124)

The calculation unit 112 generates the second time information and the third time information. The second time information indicates a time at which the state of the first communicator 121 is actually switched to the first state. The third time information indicates a time at which the state of the first communicator 121 is switched to the second state through step S123. After the process in step S124 is performed, a process in step S125 is performed.

(Step S125)

The transmission control unit 114 transmits the second time information and the third time information to the fourth communicator 231 using the second communicator 131. For example, the second time information and the third time information are simultaneously transmitted. The second time information and the third time information may be sequentially transmitted. After the process in step S125 is performed, the process in step S108 is performed.

Figure 14:
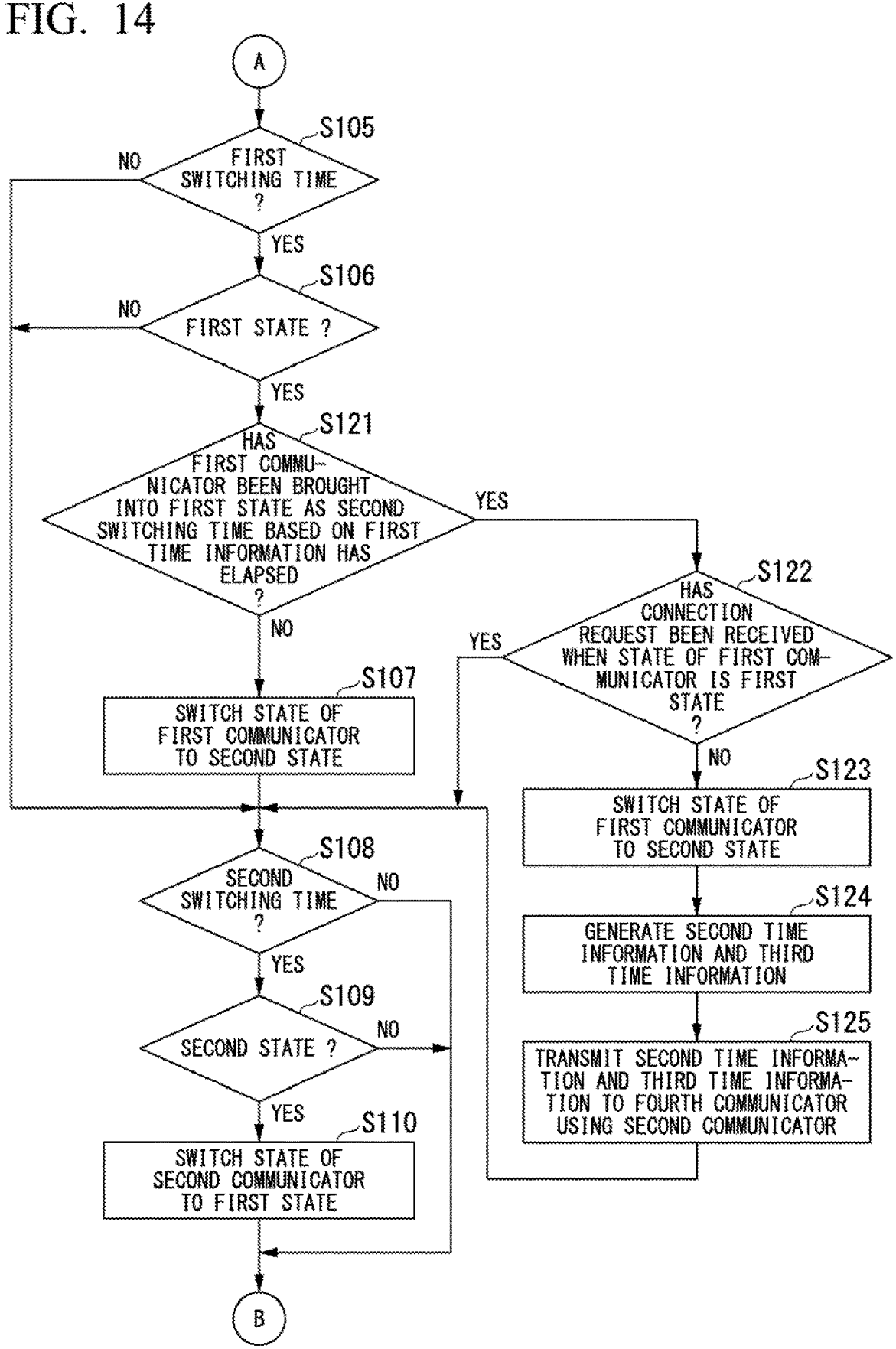
FIG. 14 is a flowchart showing a procedure of operations of the first wireless communication terminal according to the second embodiment of the present invention.

Regarding points other than stated, the processes shown in FIG. 14 are the same as the processes shown in FIG. 5.

In the processes shown in FIG. 14, the connection request may not be received by the first communicator 121 until a current time in the first wireless communication terminal 101b reaches the first switching time calculated on the basis of the first time information through the step S104 (step S122). In this case, the transmission control unit 114 transmits the second time information to the fourth communicator 231 using the second communicator 131 (step S125).

In the second embodiment, the third time information is not an essential element. Therefore, only the second time information may be generated in step S124, and only the second time information may be transmitted in step S125.

The operation of the second wireless communication terminal 201 will be described. The processes shown in FIG. 6 in first embodiment are changed to processes shown in FIG. 15. Regarding the processes shown in FIG. 15, points different from those of the processes shown in FIG. 6 will be described.

(Step S221)

In a case where the second time information and the third time information are transmitted by the second communicator 131, the fourth communicator 231 receives the second time information and the third time information. The fourth communicator 231 notifies the generation unit 212 of a reception result indicating whether the second time information and the third time information have been received. The generation unit 212 determines whether the second time information and the third time information have been received within a predetermined time period from a timing at which a scanning request is transmitted, on the basis of the reception result. For example, the predetermined time period is a cycle of scanning based on the scanning cycle information. In a case where the generation unit 212 determines that the second time information and the third time information have been received within the predetermined time period from a timing at which the scanning request is transmitted, a process in step S222 is performed. In a case where the generation unit 212 determines that the second time information and the third time information have not been received within the predetermined time period from a timing at which the scanning request is transmitted, the process in step S203 is performed.

(Step S222)

The generation unit 212 generates the first time information on the basis of the scanning cycle information, the next scanning time, the second time information, and the third time information. Specifically, the generation unit 212 calculates the next scanning time on the basis of the scanning cycle information, and generates the first time information by correcting the next scanning time on the basis of the second time information and the third time information. After the process in step S222 is performed, a process in step S204 is performed. For example, the first time information is generated as follows.

A case will be described in which the timing of state transition is represented by an absolute time using the first time information. The generation unit 212 calculates the next scanning time on the basis of the scanning cycle information stored in the second memory 241 and the previous scanning time. The generation unit 212 corrects the calculated next scanning time on the basis of the second time information and the third time information. The generation unit 212 generates the first time information indicating the corrected next scanning time. For example, in a case where a cycle indicated by the scanning cycle information is 60 seconds, and the previous scanning time is 1000 seconds, the next scanning time before being corrected is 1060 seconds. In a case where the second time information indicates 1002 seconds, the corrected next scanning time is 1058 seconds as shown in Expression (5). Therefore, the first time information indicates 1058 seconds.

$$1060 \text{ seconds} - (1002 \text{ seconds} - 1000 \text{ seconds}) = 1058 \text{ seconds} \qquad (5)$$

Further, correction at any time period may be considered. Through the above calculation, the next scanning time indicating the first time information is the same as a timing at which the first communicator 121 is brought into the first state. The first communicator 121 reliably is brought into the first state before the next scanning time by subtracting any time period from the next scanning time calculated as stated above. This any time period is less than a period from a time indicated by the second time information to a time indicated by the third time information. For example, in the above example, the next scanning time may be 1056 seconds by making the next scanning time 2 seconds earlier. For example, a time indicated by the third time information is 1012 seconds. In this case, 2 seconds corresponding to any time period is less than a period (1012−1002=10 seconds) from a time indicated by the second time information to a time indicated by the third time information.

A case will be described in which the timing of state transition is represented by a relative time using the first time information. The generation unit 212 calculates the next scanning time on the basis of the scanning cycle information stored in the second memory 241 and the previous scanning time. The generation unit 212 corrects the calculated next scanning time on the basis of the second time information. The generation unit 212 calculates a difference between the corrected next scanning time and the current time in the second wireless communication terminal 201, and generates the first time information indicating the calculated difference. For example, in a case where a cycle indicated by the scanning cycle information is 60 seconds, and the previous scanning time is 1000 seconds, the next scanning time before being corrected is 1060 seconds. In a case where the second time information indicates 1002 seconds, the corrected next scanning time is 1058 seconds as shown in Expression (5). In a case where the current time is 1020 seconds, the first time information is "38 seconds later". Further, correction at any time period may be considered. This correction is the same as the correction at any time period in a case where the timing of state transition is represented by an absolute time using the first time information.

Figure 15:
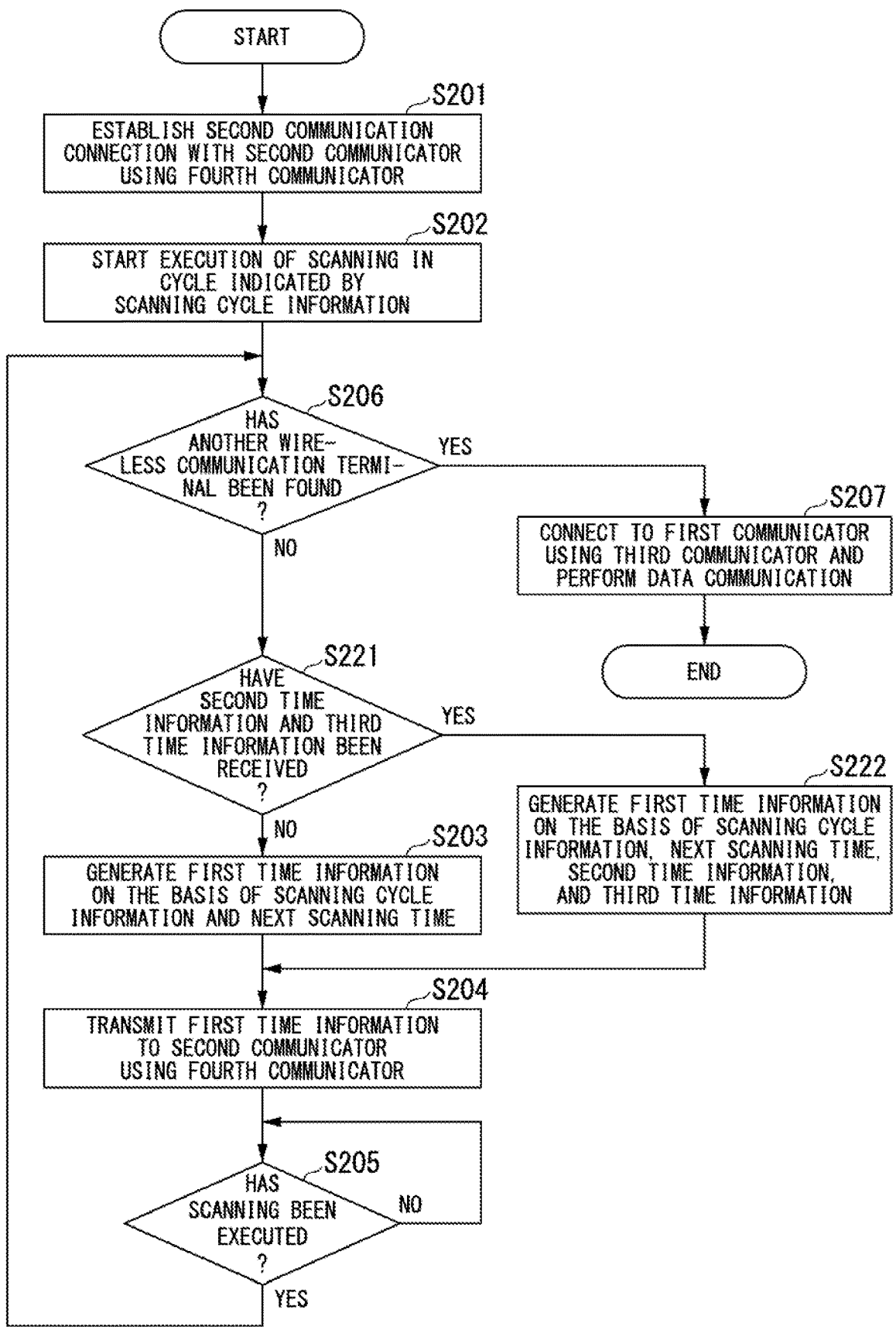
FIG. 15 is a flowchart showing a procedure of operations of a second wireless communication terminal according to the second embodiment of the present invention.

Regarding points other than stated, the processes shown in FIG. 15 are the same as the processes shown in FIG. 6.

In the processes shown in FIG. 15, in a case where the second time information transmitted by the second communicator 131 is received by the fourth communicator 231, the generation unit 212 generates the first time information by correcting the next scanning time on the basis of the second time information (step S222). In a case where the third time information transmitted by the second communicator 131 is received by the fourth communicator 231, the generation unit 212 generates the first time information by correcting the next scanning time on the basis of the second time information and the third time information (step S222).

In the second embodiment, the third time information is not an essential element. Therefore, the reception of only the second time information may be determined in step S221, and the third time information need not be used in step S222.

Figure 16:
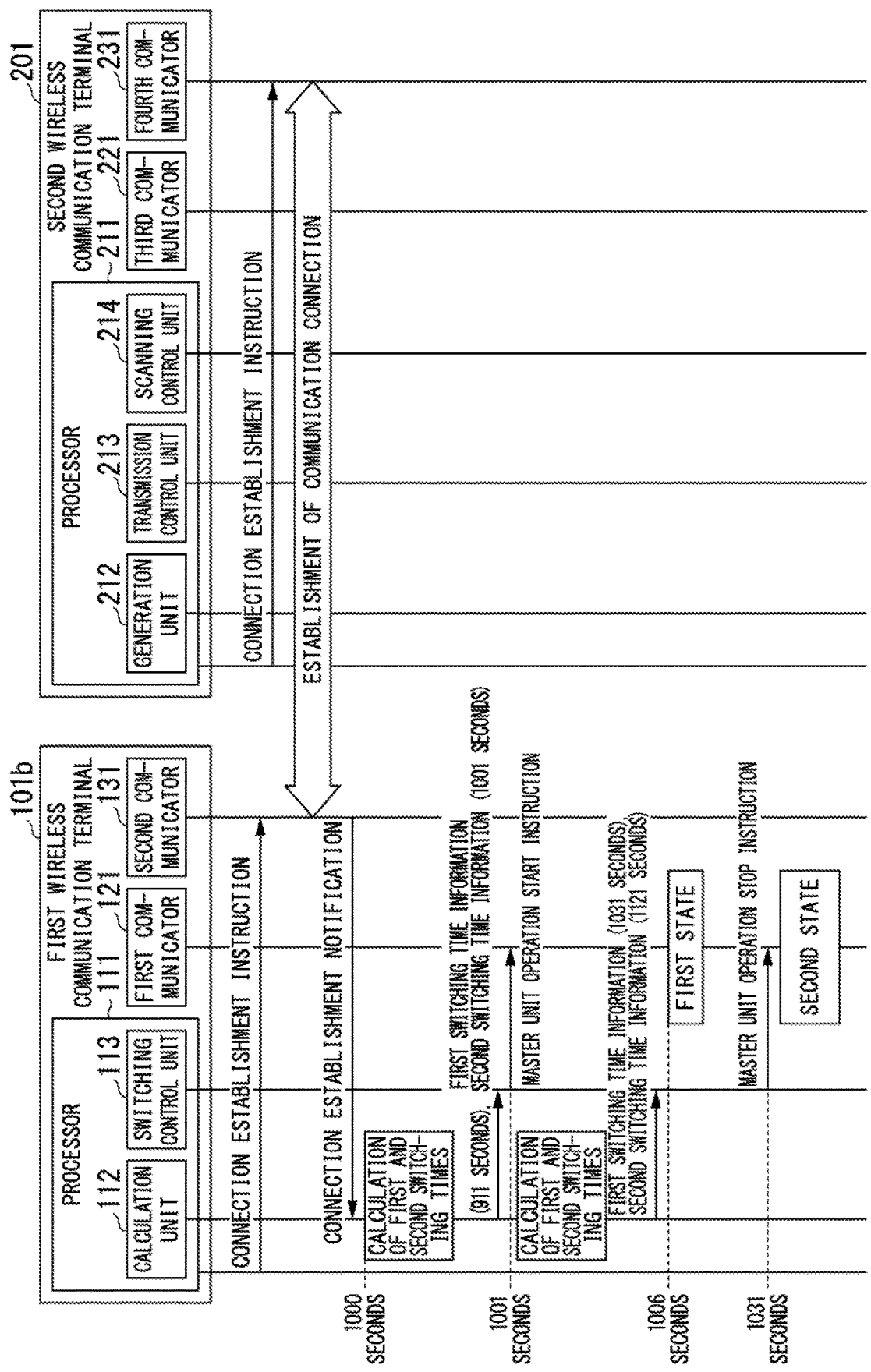
FIG. 16 is a sequence diagram showing a procedure of communication in the second embodiment of the present invention.
Figure 17:
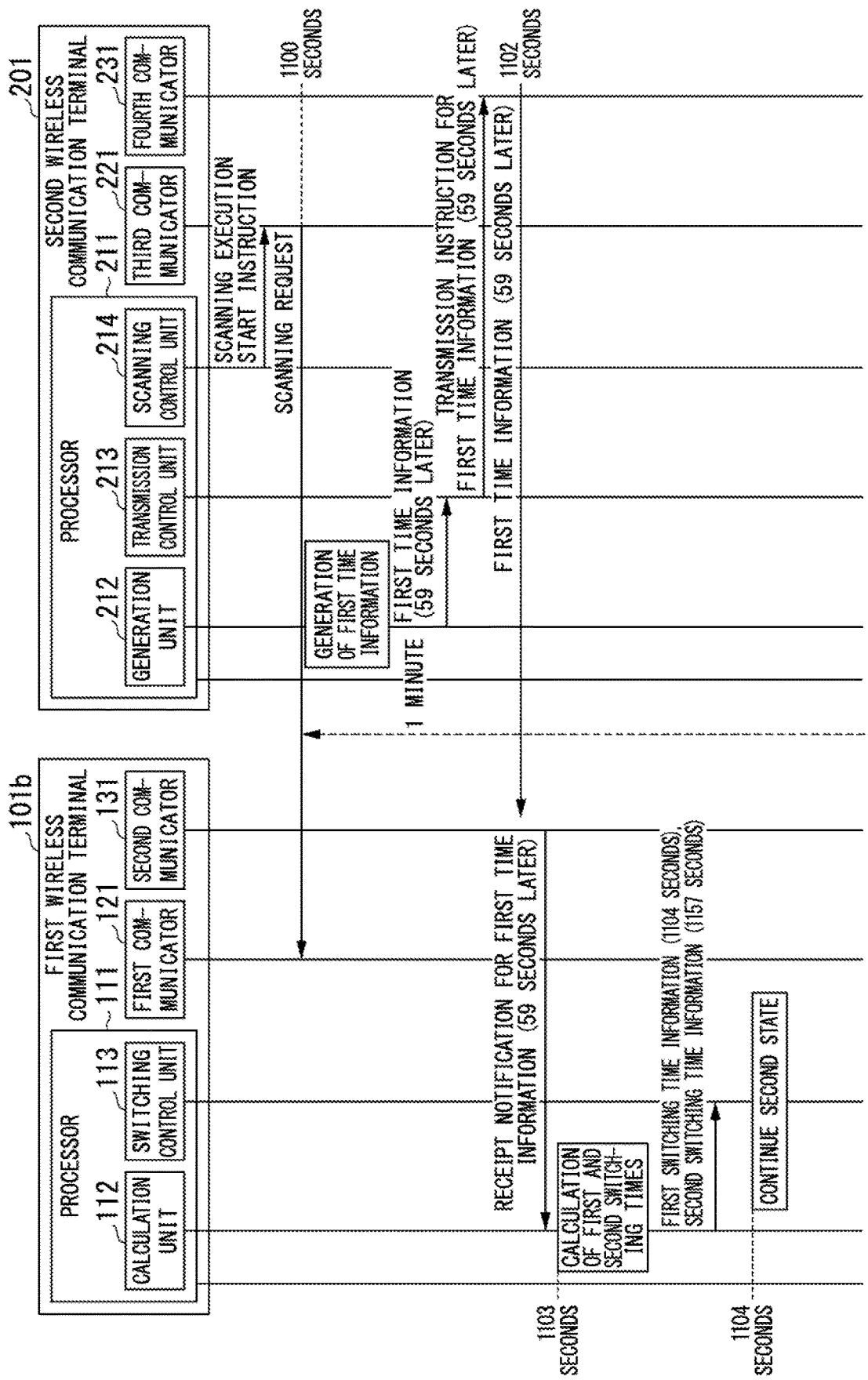
FIG. 17 is a sequence diagram showing a procedure of communication in the second embodiment of the present invention.
Figure 18:
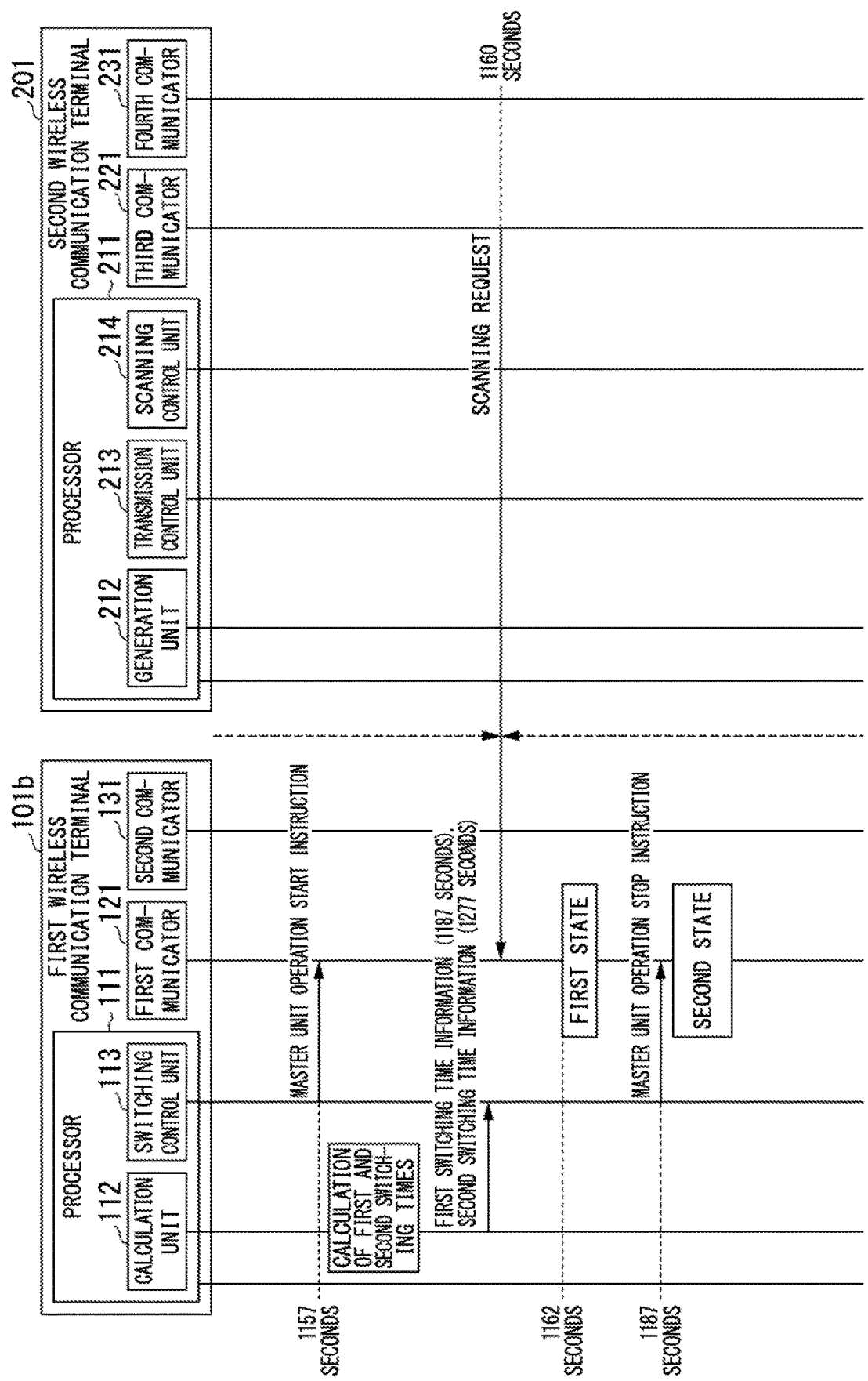
FIG. 18 is a sequence diagram showing a procedure of communication in the second embodiment of the present invention.
Figure 19:
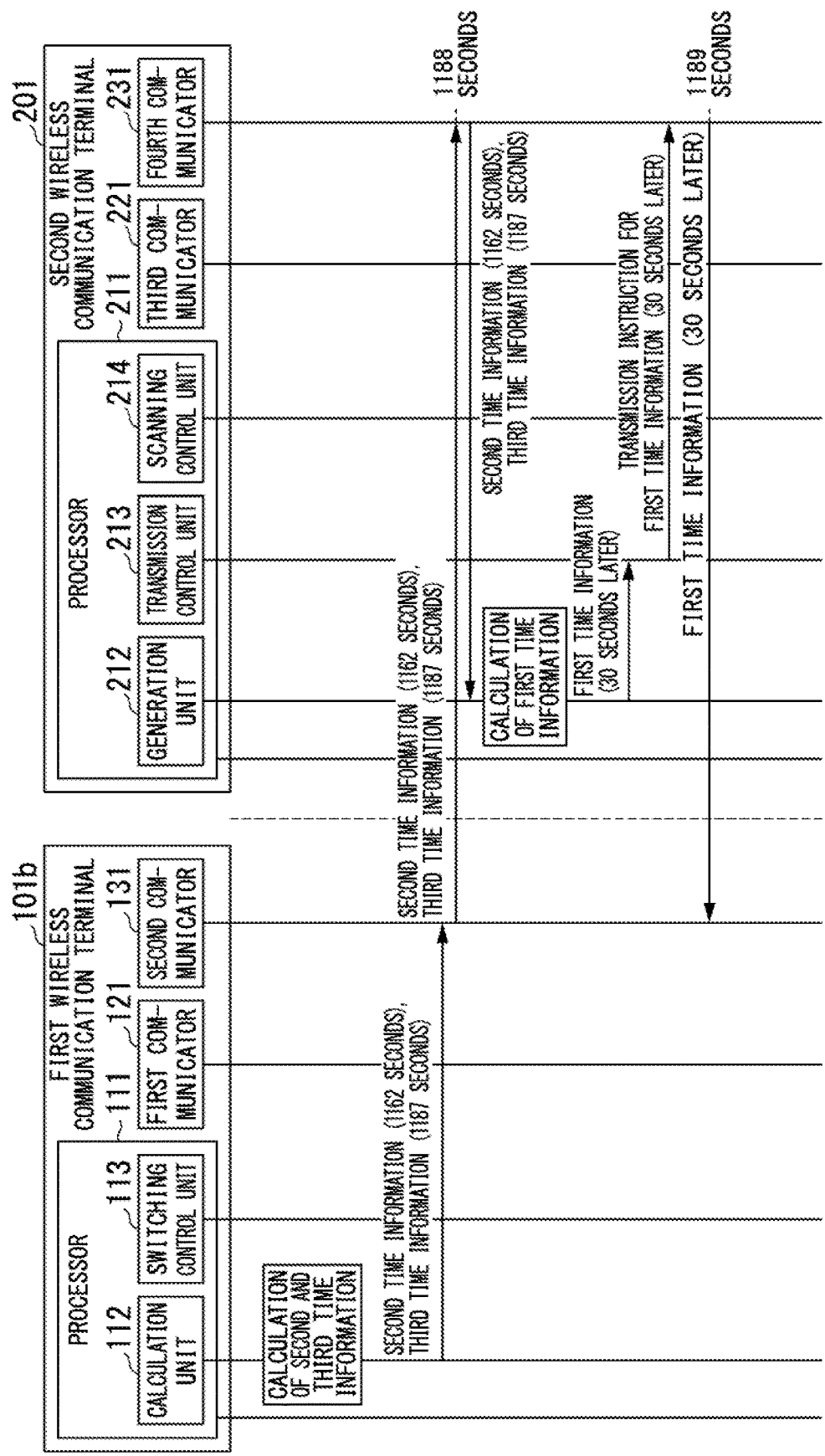
FIG. 19 is a sequence diagram showing a procedure of communication in the second embodiment of the present invention.
Figure 20:
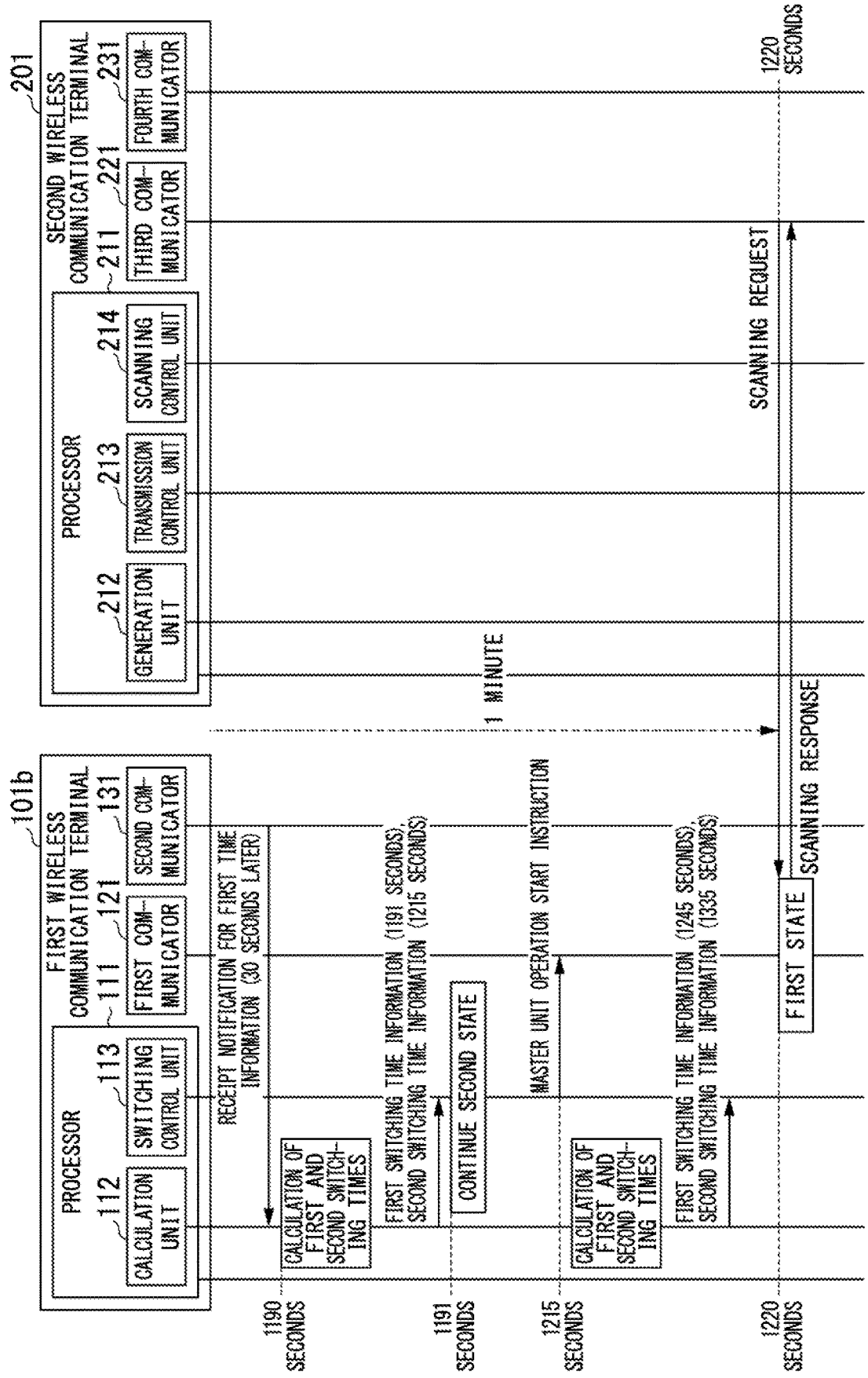
FIG. 20 is a sequence diagram showing a procedure of communication in the second embodiment of the present invention.

FIGS. 16 to 20 show a procedure of communication between the first wireless communication terminal 101b and the second wireless communication terminal 201. After communication shown in FIG. 16 is performed, communication shown in FIG. 17 is performed. After the communication shown in FIG. 17 is performed, communication shown in FIG. 18 is performed. After the communication shown in FIG. 18 is performed, communication shown in FIG. 19 is performed. After the communication shown in FIG. 19 is performed, communication shown in FIG. 20 is performed. In FIGS. 16 to 20, processes which are performed by the transmission control unit 114 are omitted.

Operations until the calculation unit 112 calculates the first switching time and the second switching time on the basis of the zeroth time information and the calculation unit 112 notifies the switching control unit 113 of the first switching time and the second switching time are the same as the operations shown in FIG. 7. In the calculation of the second switching time, an estimated time period from a timing at which the switching control unit 113 gives the instruction for master unit operation start to the first communicator 121 until the first communicator 121 is brought into the first state is considered. In this example, the estimated time period is 2 seconds.

When the current time in the first wireless communication terminal 101b reaches 1001 seconds which is the second switching time, the switching control unit 113 causes the first communicator 121 to start a master unit operation by giving the instruction for master unit operation start to the first communicator 121 (step S110). In this example, the first communicator 121 is brought into the first state at 1006 seconds which is 5 seconds after 1001 seconds. A time period actually required for the first communicator 121 to be brought into the first state and the above estimated time period are different from each other.

Operations after the switching control unit 113 gives the instruction for master unit operation start to the first communicator 121 at 1001 seconds and before the switching control unit 113 gives the instruction for master unit operation start to the first communicator 121 at 1157 seconds are the same as the operations shown in FIGS. 7 and 8. When the current time in the first wireless communication terminal 101b reaches 1157 seconds which is the second switching time, the switching control unit 113 causes the first communicator 121 to start a master unit operation by giving the instruction for master unit operation start to the first communicator 121 (step S110). In this example, the first communicator 121 is brought into the first state at 1162 seconds which is 5 seconds after 1157 seconds.

When the current time in the second wireless communication terminal 201 reaches 1160 seconds, the third communicator 221 transmits a scanning request. In this case, the first communicator 121 of the first wireless communication terminal 101b is in the second state. For this reason, the first communicator 121 cannot transmit a scanning response. Since the scanning response is not received, the scanning control unit 214 cannot find the first wireless communication terminal 101b (step S206). The transmission control unit 213 does not transmit a connection request. For this reason, the first communicator 121 cannot receive the connection request.

After the switching control unit 113 gives the instruction for master unit operation start to the first communicator 121, the calculation unit 112 calculates the first switching time and the second switching time again on the basis of the zeroth time information (step S103). The first switching time is 1187 seconds obtained by adding the duration (30 seconds) of the first state indicated by the zeroth time information to the previous second switching time (1157 seconds). The second switching time is 1277 seconds obtained by adding the duration (90 seconds) of the second state indicated by the zeroth time information to the calculated first switching time (1187 seconds).

When the current time in the first wireless communication terminal 101b reaches 1187 seconds which is the first switching time, the switching control unit 113 causes the first communicator 121 to stop the master unit operation by giving the instruction for master unit operation stop to the first communicator 121 (step S107).

The first communicator 121 is brought into the second state.

When the current time in the first wireless communication terminal 101b reaches the first switching time (1187 seconds) (step S105), the state of the first communicator 121 is the first state (step S106). This first state is based on the elapse of the second switching time (1157 seconds) based on the first time information (step S121). When the state of the first communicator 121 is the first state, the connection request is not received (step S122). For this reason, the switching control unit 113 causes the first communicator 121 to stop the master unit operation by giving the instruction for master unit operation stop to the first communicator 121 (step S123). The first communicator 121 is brought into the second state.

The calculation unit 112 generates the second time information and the third time information (step S124). The second time information indicates a time (1162 seconds) at which the state of the first communicator 121 is switched to the first state. The third time information indicates a time (1187 seconds) at which the state of the first communicator 121 is switched to the second state. The transmission control unit 114 transmits the second time information and the third time information to the fourth communicator 231 using the second communicator 131 (step S125).

In the second wireless communication terminal 201, the first wireless communication terminal 101b is not found through first scanning after the first time information is transmitted (step S206). The fourth communicator 231 receives the second time information and the third time information (step S221). In this case, the current time in the second wireless communication terminal 201 is 1188 seconds. The fourth communicator 231 gives a receipt notification for the second time information and the third time information to the generation unit 212 (step S221).

The generation unit 212 generates the first time information on the basis of the scanning cycle information, the next scanning time, the second time information, and the third time information (step S222). In the examples shown in FIGS. 16 to 20, the first time information is represented by a relative time. The current time in the second wireless communication terminal 201 is 1188 seconds, the previous scanning time is 1160 seconds, and the cycle of scanning is 60 seconds. The next scanning time before being corrected is a sum (1220 seconds) of the previous scanning time and the cycle of scanning. Since the second time information indicates 1162 seconds, the corrected next scanning time is 1218 seconds as shown in Expression (6). Since the current time is 1188 seconds, the first time information is "30 seconds later". The generation unit 212 may further correct the next scanning time on the basis of the third time information.

$$1220\ seconds-(1162\ seconds-1160\ seconds)=1218\ seconds \quad (6)$$

The generation unit 212 notifies the transmission control unit 213 of the first time information (step S222). The transmission control unit 213 gives a transmission instruction for the first time information to the fourth communicator 231, and transmits the first time information to the second communicator 131 using the fourth communicator 231 (step S204).

When the first time information is received, the second communicator 131 gives a receipt notification for the first time information to the calculation unit 112 (step S102). The calculation unit 112 receives the receipt notification for the first time information from the second communicator 131 (step S102). The calculation unit 112 calculates the first switching time and the second switching time on the basis of the first time information (step S104). In this case, the current time in the first wireless communication terminal 101b is 1190 seconds. The calculation unit 112 notifies the switching control unit 113 of the first switching time and the second switching time which are calculated (step S104).

The first switching time and the second switching time are calculated using the same method as the calculation method in the first embodiment. As shown in Expression (7), the first switching time is 1191 seconds obtained by adding the delay time period D (1 second) to a timing (1190 seconds) at which the calculation unit 112 receives the receipt notification for the first time information.

$$1190\ seconds+1\ second=1191\ seconds \quad (7)$$

As shown in Expression (8), the second switching time is 1215 seconds obtained by subtracting the estimated time period (2 seconds), the delay time period B (1 second), the delay time period C (1 second), and the delay time period D (1 second) from a time obtained by adding a time period (30 seconds) indicated by the first time information to a timing (1190 seconds) at which the calculation unit 112 receives the receipt notification for the first time information.

$$1190\ seconds+30\ seconds-2\ seconds-1\ second-1\ second-1\ second=1215\ seconds \quad (8)$$

When the current time in the first wireless communication terminal 101b reaches 1191 seconds which is the first switching time, the switching control unit 113 determines that the first communicator 121 is already in the second state (step S106). Therefore, the switching control unit 113 causes the first communicator 121 to continue to be in the second state.

When the current time in the first wireless communication terminal 101b reaches 1215 seconds which is the second switching time, the switching control unit 113 causes the first communicator 121 to start the master unit operation by giving the instruction for master unit operation start to the first communicator 121 (step S110). The first communicator 121 is brought into the first state at 1220 seconds which is 5 seconds after 1215 seconds.

When the current time in the second wireless communication terminal 201 reaches 1220 seconds, the third communicator 221 transmits a scanning request. In this case, the first communicator 121 of the first wireless communication terminal 101b is in the first state. Therefore, the first communicator 121 transmits a scanning response. The third communicator 221 receives the scanning response. Since the scanning response is received, the scanning control unit 214 finds the first wireless communication terminal 101b (step S206).

After the switching control unit 113 gives the instruction for master unit operation start to the first communicator 121, the calculation unit 112 calculates the first switching time and the second switching time again on the basis of the zeroth time information (step S103). The first switching time is 1245 seconds obtained by adding the duration (30 seconds) of the first state indicated by the zeroth time information to the previous second switching time (1215 seconds). The second switching time is 1335 seconds obtained by adding the duration (90 seconds) of the second state indicated by the zeroth time information to the calculated first switching time (1245 seconds).

As stated above, new first time information is generated by correcting the next scanning time. The calculation unit 112 calculates the first switching time and the second switching time on the basis of the new first time information, and thus the first communicator 121 can be brought into the first state when the next scanning is executed. Therefore, the second wireless communication terminal 201 can find the first wireless communication terminal 101b. According to the above, in the second embodiment, it is possible to suppress the power consumption of the first wireless communication terminal 101b, and to shorten a time period required for finding the first wireless communication terminal 101b.

(Modification Example of Second Embodiment)

Figure 21:
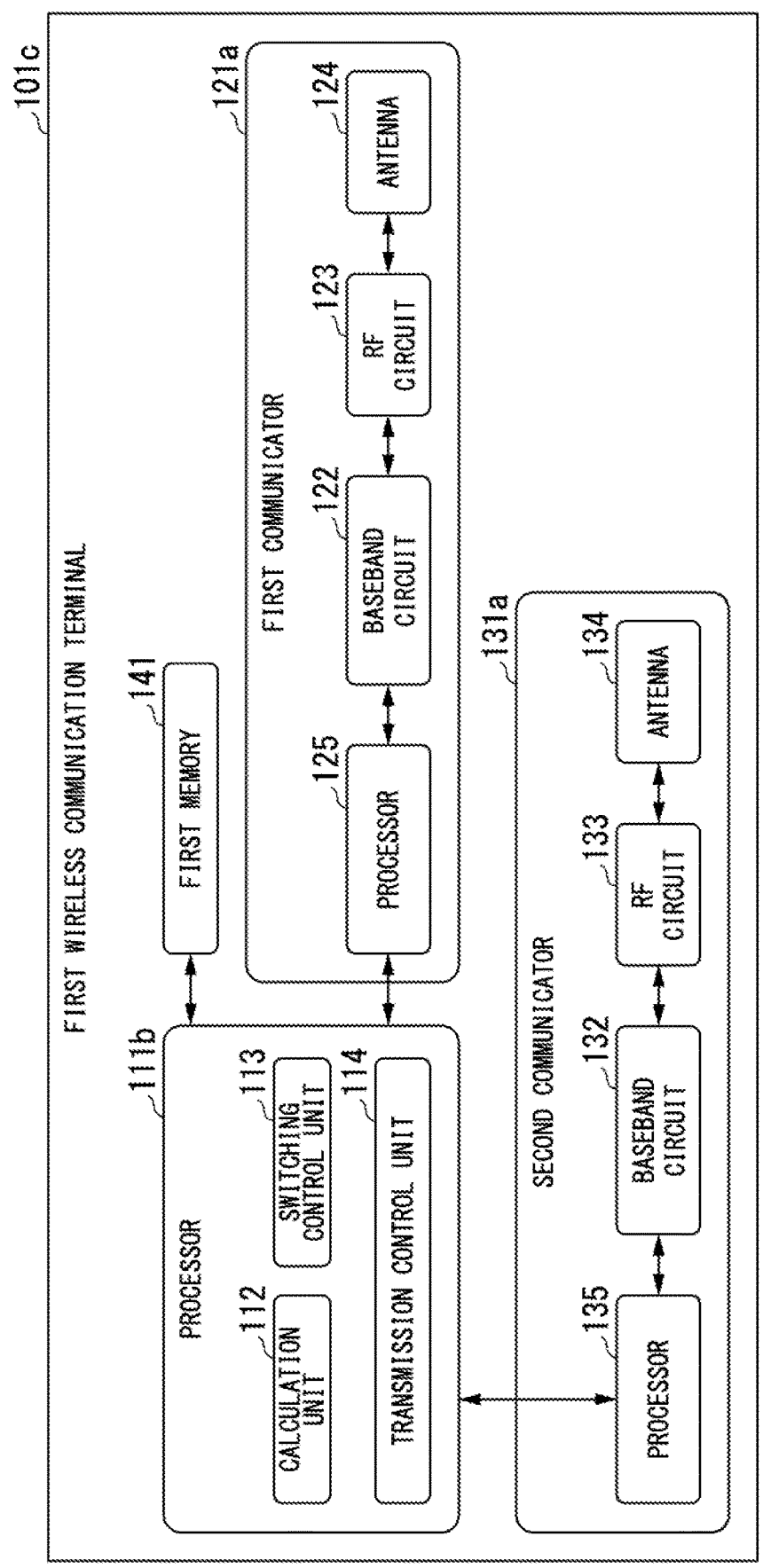
FIG. 21 is a block diagram showing a hardware configuration of a first wireless communication terminal according to a modification example of the second embodiment of the present invention.

FIG. 21 shows a hardware configuration of a first wireless communication terminal 101c according to a modification example of the second embodiment of the present invention. Regarding the configuration shown in FIG. 21, points different from those of the configuration shown in FIG. 13 will be described.

In the first wireless communication terminal 101c, the first communicator 121 in the first wireless communication terminal 101b shown in FIG. 13 is changed to a first communicator 121a, and the second communicator 131 in the first wireless communication terminal 101 shown in FIG. 13 is changed to a second communicator 131a. The first communicator 121a is the same as the first communicator 121a in the first wireless communication terminal 101a shown in FIG. 10. The second communicator 131a is the same as the second communicator 131a in the first wireless communication terminal 101a shown in FIG. 10. Regarding points other than stated, the configuration shown in FIG. 21 is the same as the configuration shown in FIG. 13.

The transmission control unit 114 may operate on the processor 135.

Third Embodiment

A third embodiment of the present invention will be described using the first wireless communication terminal 101 shown in FIG. 2 and the second wireless communication terminal 201 shown in FIG. 3.

The operation of a first wireless communication terminal 101 of the third embodiment is different from the operation of the first wireless communication terminal 101 of the first embodiment in the following points. The calculation unit 112 further calculates the first switching time after next which is the first switching time subsequent to the next first switching time. The next first switching time is the first switching time subsequent to the first switching time calculated on the basis of the first time information. A time period from the next second switching time to the first switching time after next is longer than a time period from the second switching time to the next first switching time. The next second switching time is the second switching time subsequent to the second switching time calculated on the basis of the first time information.

The next first switching time is the first switching time calculated on the basis of the zeroth time information after the first switching time is calculated on the basis of the first time information. After the first switching time after next is calculated, the next first switching time is the first switching time after next. The next second switching time is the second switching time calculated on the basis of the zeroth time information after the second switching time is calculated on the basis of the first time information.

In a case where the second wireless communication terminal 201 cannot find the first wireless communication terminal 101 through scanning executed after the first time information is transmitted, the first communicator 121 of the first wireless communication terminal 101 extends a time period for which the first state is continued. The first communicator 121 can continue to be in the first state until the next scanning is executed. Therefore, the second wireless communication terminal 201 can find the first wireless communication terminal 101.

The operation of the first wireless communication terminal 101 will be described. Among the processes shown in FIGS. 4 and 5 in the first embodiment, the processes shown in FIG. 4 are changed to processes shown in FIGS. 22 and 23. Regarding the processes shown in FIG. 22 and FIG. 23, points different from those of the processes shown in FIG. 4 will be described.

(Step S131)

In a case where the calculation unit 112 determines that the second switching time has not been calculated in step S112, or a case where the calculation unit 112 determines that the current time in the first wireless communication terminal 101 has reached the second switching time in step S111, a process in step S131 is performed. The calculation unit 112 determines whether the first time information has been received. In a case where the first time information has been received at least once, the calculation unit 112 determines that the first time information has been received. In a case where the first time information has never been received, the calculation unit 112 determines that the first time information has not been received. In a case where the calculation unit 112 determines that the first time information has been received, a process in step S132 is performed. In a case where the calculation unit 112 determines that the first time information has not been received, the process in step S103 is performed.

(Step S132)

The calculation unit 112 determines whether the next first switching time and the next second switching time have been set. That is, the calculation unit 112 determines whether values have been set for the next first switching time and the next second switching time. In a case where the calculation unit 112 determines that the next first switching time and the next second switching time have been set, that is, values have been set for the next first switching time and the next second switching time, a process in step S136 is performed. In a case where the calculation unit 112 determines that the next first switching time and the next second switching time have not been set, that is, values have not been set for the next first switching time and the next second switching time, a process in step S133 is performed.

(Step S133)

The calculation unit 112 updates a reference second switching time with the second switching time. Thereby, the reference second switching time becomes equal to the second switching time. The reference second switching time will be described later. After the process in step S133 is performed, a process in step S134 is performed.

(Step S134)

The calculation unit 112 calculates the first switching time and the second switching time on the basis of the zeroth time information. The process in step S134 is the same as the process in step S103. After the process in step S134 is performed, a process in step S135 is performed.

(Step S135)

The calculation unit 112 updates the next first switching time with the first switching time calculated through step S134, and updates the next second switching time with the second switching time calculated through step S134. Thereby, the next first switching time becomes equal to the first switching time, and the next second switching time becomes equal to the second switching time. After the process in step S135 is performed, the process in step S105 is performed.

(Step S136)

The calculation unit 112 calculates the first switching time after next on the basis of the next second switching time, the next first switching time, and the reference second switching time. The calculation unit 112 calculates the first switching time after next so that the time period from the next second switching time to the first switching time after next becomes longer than a time period from the reference second switching time to the next first switching time. Since the reference second switching time is updated with the second switching time through step S133 or step S137, the time period from the next second switching time to the first switching time after next becomes longer than the time period from the second switching time to the next first switching time. As a result, a time period for which the first communicator 121 continues to be in the first state is extended. After the process in step S136 is performed, a process in step S137 is performed.

(Step S137)

The calculation unit 112 updates the reference second switching time with the second switching time. The process in step S137 is the same as the process in step S133. After the process in step S137 is performed, a process in step S138 is performed.

(Step S138)

The calculation unit 112 calculates the second switching time on the basis of the zeroth time information. The second switching time is a time after the first switching time after next. After the process in step S138 is performed, a process in step S139 is performed.

(Step S139)

The calculation unit 112 updates the first switching time and the next first switching time with the first switching time after next calculated through step S136, and updates the next second switching time with the second switching time calculated through step S138. Thereby, the first switching time and the next first switching time become equal to the first switching time after next, and the next second switching time becomes equal to the second switching time. After the process in step S139 is performed, the process in step S105 is performed.

(Step S140)

After the process in step S104 is performed, the calculation unit 112 clears the next first switching time and the next second switching time. After a process in step S140 is performed, the process in step S105 is performed.

Figure 22:
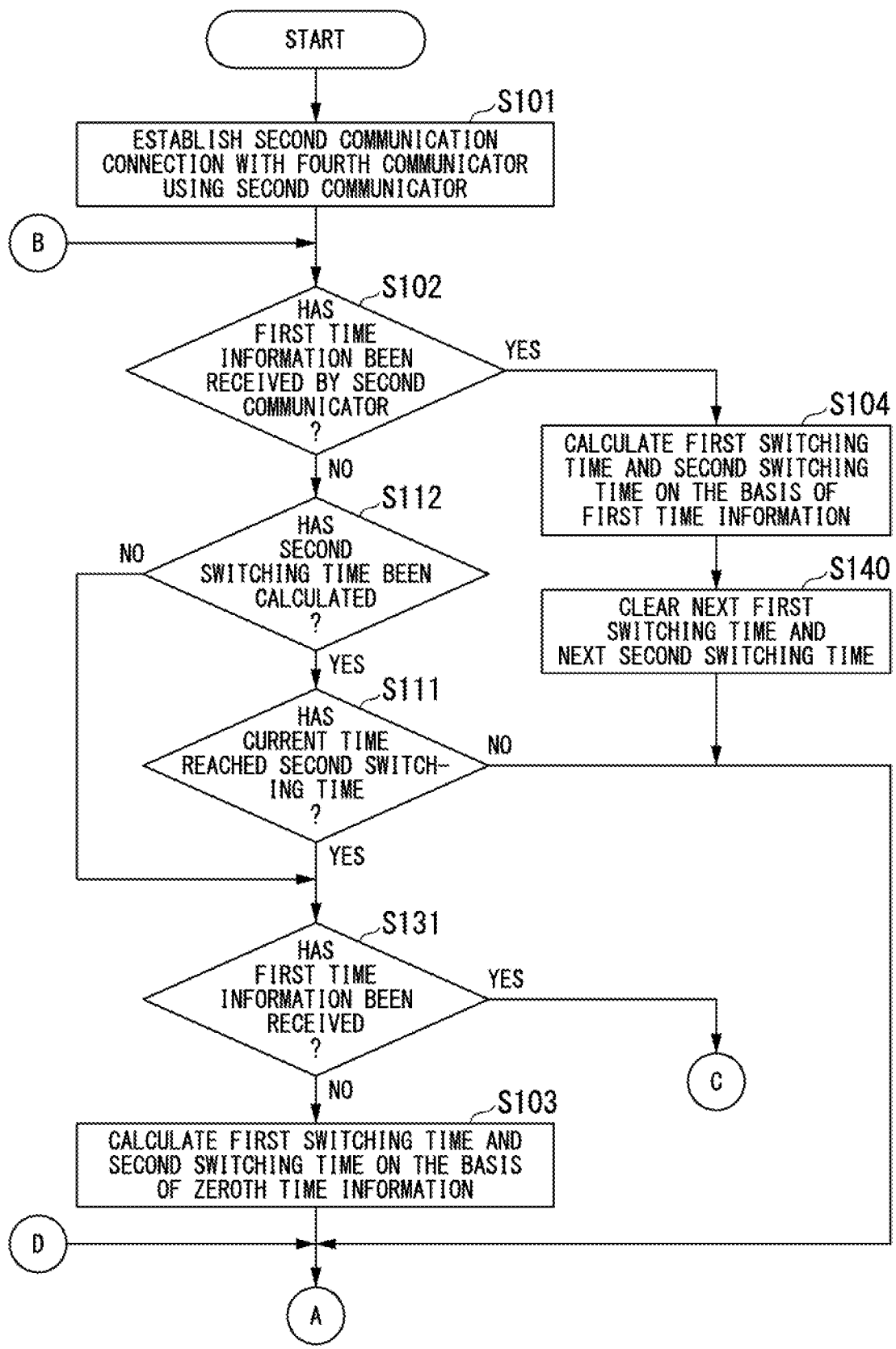
FIG. 22 is a flowchart showing a procedure of operations of a first wireless communication terminal according to a third embodiment of the present invention.
Figure 23:
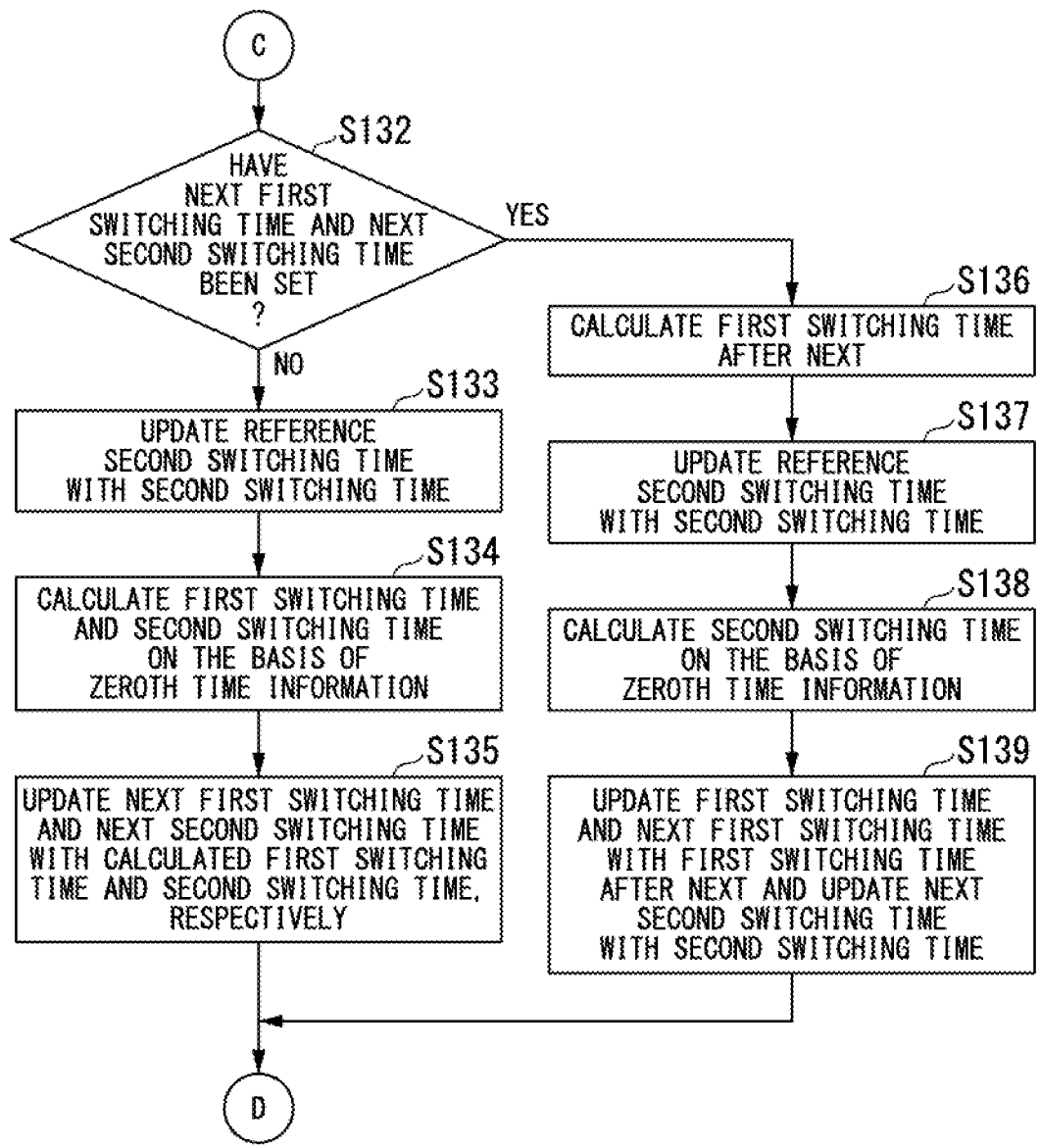
FIG. 23 is a flowchart showing a procedure of operations of the first wireless communication terminal according to the third embodiment of the present invention.

Regarding points other than stated, the processes shown in FIGS. 22 and 23 are the same as the processes shown in FIG. 4.

Each switching time in the third embodiment will be described. The first switching time and the second switching time are held until each switching time is calculated and then each of the next switching times is calculated. Therefore, when each switching time is calculated, for example, in step S134, information of the first switching time and the second switching time until the timing is lost. On the other hand, the past second switching time is required when the first switching time after next is calculated. The reference second switching time is updated with the past second switching time, and thus when a new second switching time is calculated, the past second switching time can be held as the reference second switching time.

The determinations in step S105 and step S108 are performed using the current first switching time and the current second switching time as references. The next first switching time, the next second switching time, and the first switching time after next are independent of these determinations.

The next second switching time, the next first switching time, and the reference second switching time are required for the calculation of the first switching time after next. However, at a timing at which the first switching time after next is calculated in step S136, that is, a timing at which the current time reaches the next second switching time, times including the reference second switching time, the next first switching time, and the next second switching time are the past times. In order to store these times, for example, the processes in step S133 and step S135 are performed. When the first communicator 121 is next brought into the first state, the times stored as stated above are used in step S136.

The reason of each time being stored in step S137 and step S139 is the same as the aforementioned reason. After the first switching time after next is calculated in step S136, the reference second switching time, the next first switching time, and the next second switching time are stored in step S137 and step S139. A case may occur in which the first communicator 121 extends the first state to the first switching time after next, and the first communicator 121 cannot respond to a scanning request. In this case, the calculation unit 112 can calculate a new first switching time after next in step S136 when the first communicator 121 is next brought into the first state.

Figure 24:
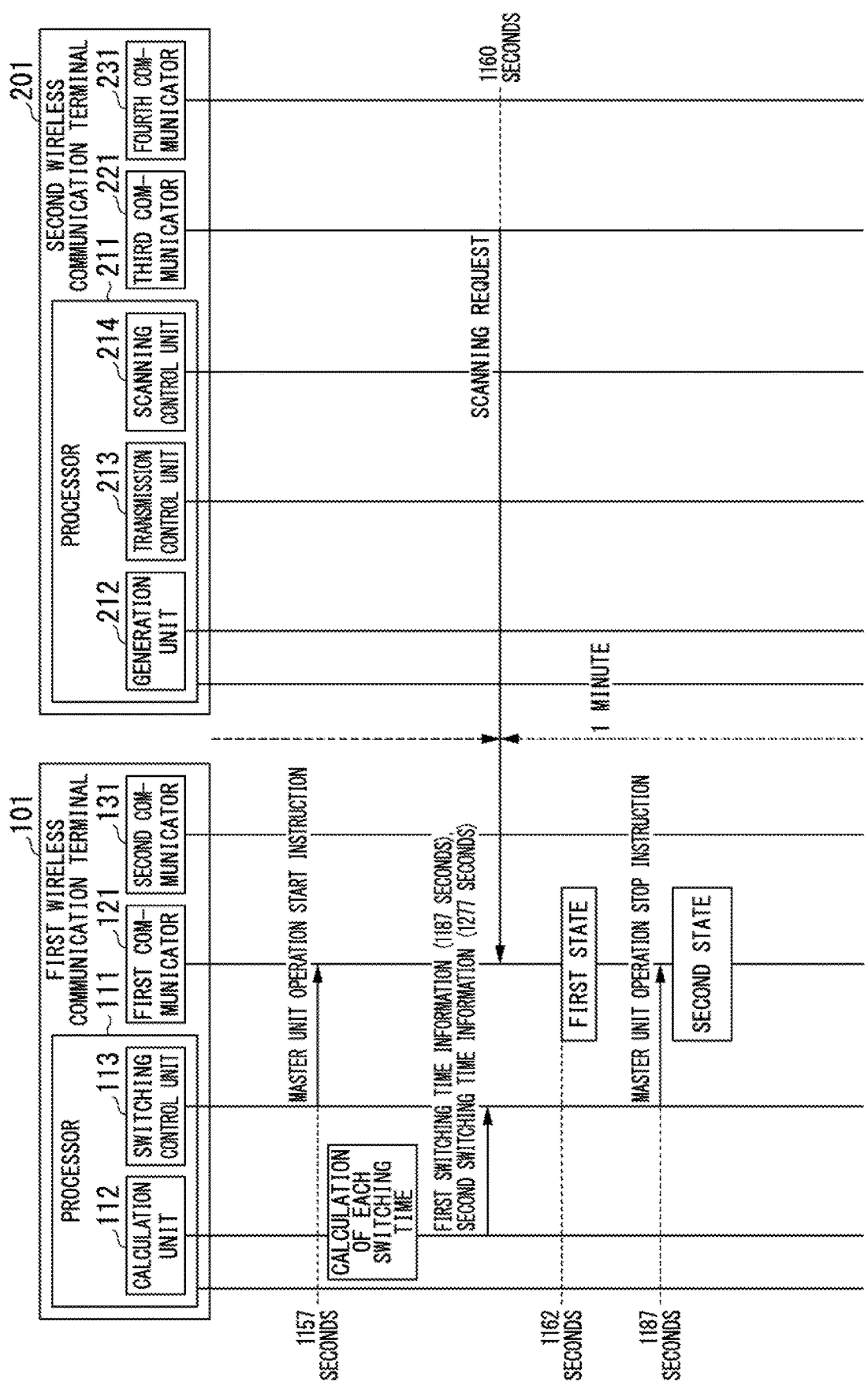
FIG. 24 is a sequence diagram showing a procedure of communication in the third embodiment of the present invention.
Figure 25:
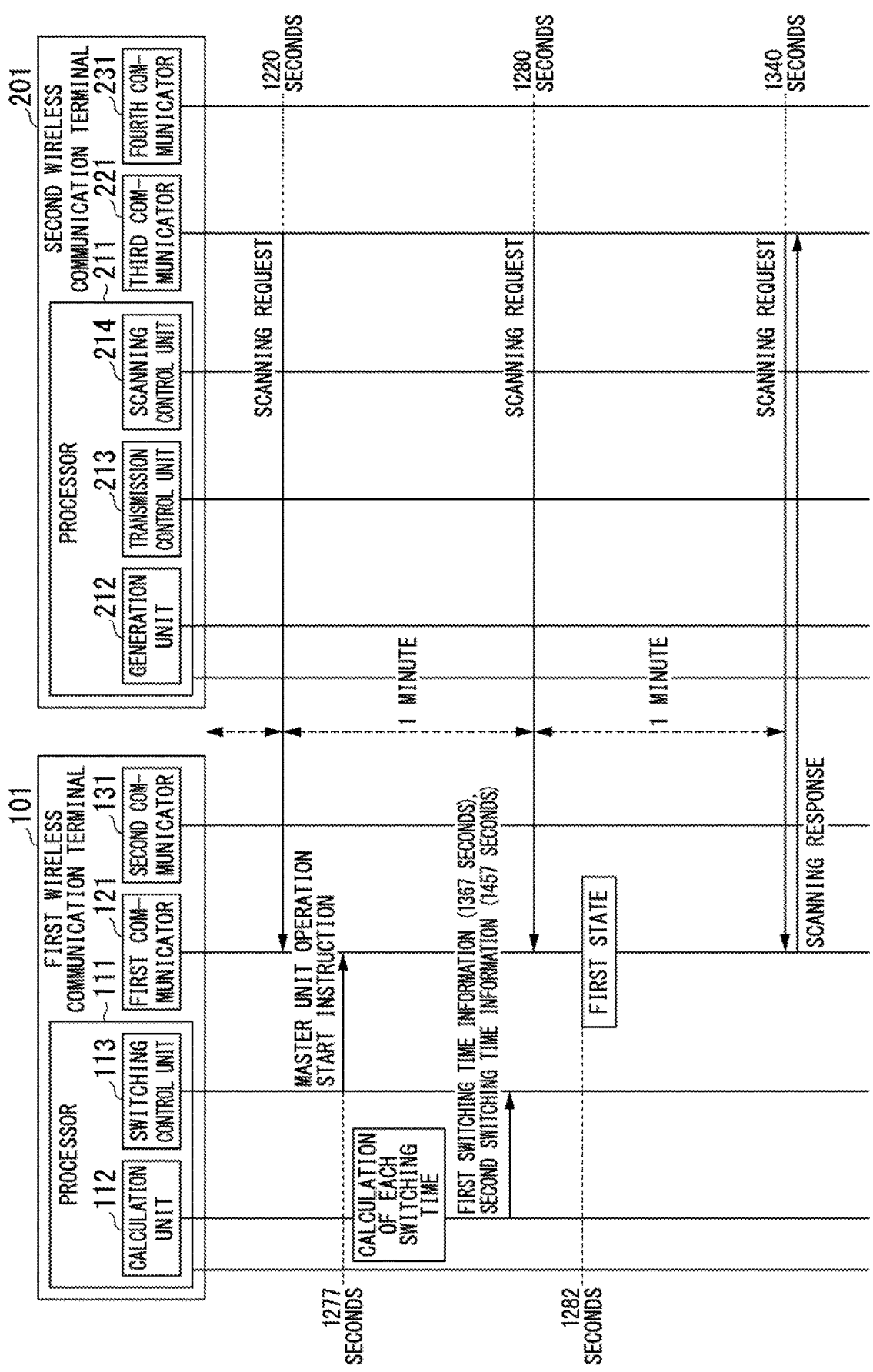
FIG. 25 is a sequence diagram showing a procedure of communication in the third embodiment of the present invention.

FIGS. 24 and 25 show a procedure of communication between the first wireless communication terminal 101 and the second wireless communication terminal 201. The communications shown in FIGS. 7 and 8 are performed in advance of communications shown in FIGS. 24 and 25. The communications shown in FIGS. 7 and 8 have been described in the first embodiment, and thus the description of the communications shown in FIGS. 7 and 8 is not given. After the communication shown in FIG. 24 is performed, the communication shown in FIG. 25 is performed. The operation of each terminal will be described with reference to FIGS. 24 and 25.

When the current time in the first wireless communication terminal 101 reaches 1157 seconds which is the second switching time, the switching control unit 113 causes the first communicator 121 to start a master unit operation by giving the instruction for master unit operation start to the first communicator 121 (step S110). In this example, the first communicator 121 is brought into the first state at 1162 seconds which is 5 seconds after 1157 seconds.

When the current time in the second wireless communication terminal 201 reaches 1160 seconds, the third communicator 221 transmits a scanning request. In this case, the first communicator 121 of the first wireless communication terminal 101 is in the second state. For this reason, the first communicator 121 cannot transmit a scanning response. Since the scanning response is not received, the scanning control unit 214 cannot find the first wireless communication terminal 101 (step S206). The transmission control unit 213 does not transmit a connection request. For this reason, the first communicator 121 cannot receive the connection request.

After the current time in the first wireless communication terminal 101 reaches the second switching time (1157 seconds), the first time information has been received (step S131). In this case, the next first switching time and the next second switching time are not set (step S132). For this reason, the reference second switching time is set to 1157 seconds which is the second switching time (step S133). The calculation unit 112 calculates the first switching time and the second switching time again on the basis of the zeroth time information (step S134). The first switching time is 1187 seconds obtained by adding the duration (30 seconds) of the first state indicated by the zeroth time information to the previous second switching time (1157 seconds). The second switching time is 1277 seconds obtained by adding the duration (90 seconds) of the second state indicated by the zeroth time information to the calculated first switching time (1187 seconds). The next first switching time is set to 1187 seconds which is the first switching time (step S135). In this case, the next first switching time is the first switching time calculated on the basis of the zeroth time information. The next second switching time is set to 1277 seconds which is the second switching time (step S135). In this case, the next second switching time is the second switching time calculated on the basis of the zeroth time information.

When the current time in the first wireless communication terminal 101 reaches 1187 seconds which is the first switching time, the switching control unit 113 causes the first communicator 121 to stop the master unit operation by giving the instruction for master unit operation stop to the first communicator 121 (step S107). The first communicator 121 is brought into the second state.

When the current time in the second wireless communication terminal 201 reaches 1220 seconds, the third communicator 221 transmits a scanning request. In this case, the first communicator 121 of the first wireless communication terminal 101 is in the second state. For this reason, the first communicator 121 cannot transmit a scanning response. Since the scanning response is not received, the scanning control unit 214 cannot find the first wireless communication terminal 101 (step S206). The transmission control unit 213 does not transmit a connection request. For this reason, the first communicator 121 cannot receive the connection request.

When the current time in the first wireless communication terminal 101 reaches 1277 seconds which is the second switching time, the switching control unit 113 causes the first communicator 121 to start a master unit operation by giving the instruction for master unit operation start to the first communicator 121 (step S110). In this example, the first communicator 121 is brought into the first state at 1282 seconds which is 5 seconds after 1277 seconds.

When the current time in the second wireless communication terminal 201 reaches 1280 seconds, the third communicator 221 transmits a scanning request. In this case, the first communicator 121 of the first wireless communication terminal 101 is in the second state. For this reason, the first communicator 121 cannot transmit a scanning response. Since the scanning response is not received, the scanning control unit 214 cannot find the first wireless communication terminal 101 (step S206). The transmission control unit 213 does not transmit a connection request. For this reason, the first communicator 121 cannot receive the connection request.

After the current time in the first wireless communication terminal 101 reaches the second switching time (1277 seconds), the first time information has been received (step S131). In this case, the next first switching time and the next second switching time have been set (step S132). Therefore, the calculation unit 112 calculates the first switching time after next (step S136). In this case, since a time period from the reference second switching time (1157 seconds) to the next first switching time (1187 seconds) is 30 seconds, the first switching time after next is larger than a value obtained by adding 30 seconds to the next second switching time (1277 seconds). In this example, the first switching time after next is 1367 seconds obtained by adding 90 seconds to the next second switching time (1277 seconds). As a result, a time period (90 seconds) from the next second switching time (1277 seconds) to the first switching time after next (1367 seconds) is longer than a time period (30 seconds) from the reference second switching time, that is, the second switching time (1157 seconds) to the next first switching time (1187 seconds).

The calculation unit 112 updates the reference second switching time with the second switching time (1277 seconds) (step S137). The calculation unit 112 calculates the second switching time on the basis of the zeroth time information (step S138). The second switching time is 1457 seconds obtained by adding the time (90 seconds) indicated by the zeroth time information to the first switching time after next (1367 seconds). The calculation unit 112 updates the first switching time and the next first switching time with the first switching time after next (1367 seconds), and updates the next second switching time with the second switching time (1457 seconds) (step S139). In this case, the next first switching time is the first switching time after next, and the next second switching time is the second switching time calculated on the basis of the zeroth time information.

When the current time in the second wireless communication terminal 201 reaches 1340 seconds, the third communicator 221 transmits a scanning request. In this case, the first communicator 121 of the first wireless communication terminal 101 is in the first state. Therefore, the first communicator 121 transmits a scanning response. The third communicator 221 receives the scanning response. Since the scanning response is received, the scanning control unit 214 finds the first wireless communication terminal 101 (step S206).

In a case where the duration of the first state is not extended, the first switching time is set to 1307 seconds. When the current time in the first wireless communication terminal 101 reaches 1307 seconds which is the first switching time, the first communicator 121 is brought into the second state. Therefore, when the scanning request is transmitted at 1340 seconds by the second wireless communication terminal 201, the first communicator 121 cannot transmit the scanning response. Since the scanning response is not received, the scanning control unit 214 cannot find the first wireless communication terminal 101.

As stated above, in a case where the second wireless communication terminal 201 cannot find the first wireless communication terminal 101 through scanning executed after the first time information is transmitted, the first communicator 121 of the first wireless communication terminal 101 extends a time period for which the first state is continued. Therefore, the second wireless communication terminal 201 can find the first wireless communication terminal 101. According to the above, in the third embodiment, it is possible to suppress the power consumption of the first wireless communication terminal 101, and to shorten a time period required for finding the first wireless communication terminal 101.

Fourth Embodiment

A fourth embodiment of the present invention will be described using the first wireless communication terminal 101 shown in FIG. 2 and the second wireless communication terminal 201 shown in FIG. 3.

The operation of a first wireless communication terminal 101 of the fourth embodiment is different from the operation of the first wireless communication terminal 101 of the third embodiment in the following points. In a case where extension information transmitted by the fourth communicator 231 is received by the second communicator 131, the calculation unit 112 calculates the first switching time after next which is the first switching time subsequent to the next first switching time, on the basis of the extension information. The extension information indicates causing the first communicator 121 to extend the duration of the first state. The next first switching time is the first switching time subsequent to the first switching time calculated on the basis of the first time information.

In a case where the extension information is received by the second communicator 131, the calculation unit 112 calculates the first switching time on the basis of the extension information.

The first switching time after next which is calculated on the basis of the extension information is a time after the first switching time after next which is calculated on the basis of the zeroth time information without using the extension information. The first switching time which is calculated on the basis of the extension information is a time after the first switching time which is calculated on the basis of the zeroth time information without using the extension information.

In a case where the extension information is not received, the next first switching time is the first switching time calculated on the basis of the zeroth time information after the first switching time is calculated on the basis of the first time information. In a case where the extension information is received, the next first switching time is the first switching time calculated on the basis of the zeroth time information and the extension information after the first switching time is calculated on the basis of the first time information. After the first switching time after next is calculated, the next first switching time is the first switching time after next.

The operation of a second wireless communication terminal 201 of the fourth embodiment is different from the operation of the second wireless communication terminal 201 of the third embodiment in the following points. In a case where the scanning control unit 214 confirms that a wireless communication terminal having the first communicator 121 in an operation in the first state is not present in the scanning executed by using the third communicator 221 after the first time information is transmitted, the transmission control unit 213 transmits the extension information to the second communicator 131 using the fourth communicator 231.

For example, the second memory 241 further stores the extension information. The generation unit 212 may further generate the extension information.

In a case where the second wireless communication terminal 201 cannot find the first wireless communication terminal 101 through the scanning executed after the first time information is transmitted, the first communicator 121 of the first wireless communication terminal 101 extends a time period for which the first state is continued on the basis of the extension information from the second wireless communication terminal 201. The first communicator 121 can continue to be in the first state until the next scanning is executed. Therefore, the second wireless communication terminal 201 can find the first wireless communication terminal 101.

The operation of the first wireless communication terminal 101 will be described. Among the processes shown in FIGS. 22 and 23 in the third embodiment, the processes shown in FIG. 23 are changed to processes shown in FIGS. 26 and 27. Regarding the processes shown in FIGS. 26 and 27, points different from those of the processes shown in FIG. 23 will be described.

(Step S151)

After the process in step S133 is performed, the calculation unit 112 determines whether the extension information has been received. In a case where the extension information is transmitted by the fourth communicator 231, the second communicator 131 receives the extension information. For example, the extension information indicates an extended time period. In this case, the duration of the first state is extended by a time designated by the extension information. The extension information may be an end time of the first state. In this case, the duration of the first state is extended to the time designated by the extension information. The extension information may be a multiple. In this case, the duration of the first state is set to a value by which a designated multiple is multiplied. In a case where the extension information has been received at least once, the calculation unit 112 determines that the extension information has been received. In a case where the extension information has never been received, the calculation unit 112 determines that the extension information has not been received. In a case where the calculation unit 112 determines that the extension information has been received, a process in step S152 is performed. In a case where the calculation unit 112 determines that the extension information has not been received, the process in step S134 is performed.

(Step S152)

The calculation unit 112 calculates the first switching time on the basis of the zeroth time information and the received extension information. For example, in a case where the current time in the first wireless communication terminal 101 is 1000 seconds, the zeroth time information is "a repeat of the first state of 60 seconds and the second state of 90 seconds", and the extension information is an extended time period of 30 seconds, the first switching time is set to 1090 seconds. That is, the first switching time is 1090 seconds obtained by adding the duration (60 seconds) of the first state indicated by the zeroth time information and the extended time period (30 seconds) to the current time (1000 seconds). After the process in step S152 is performed, a process in step S153 is performed.

(Step S153)

The calculation unit 112 calculates the second switching time on the basis of the zeroth time information. The second switching time is a time after the first switching time. For example, in a case where the first switching time calculated through step S152 is 1090 seconds, and the zeroth time information is the above example, the second switching time is 1180 seconds obtained by adding the duration (90 seconds) of the second state indicated by the zeroth time information to the first switching time (1090 seconds). After the process in step S153 is performed, a process in step S154 is performed.

(Step S154)

The calculation unit 112 updates the next first switching time with the first switching time calculated through step S152, and updates the next second switching time with the second switching time calculated through the step S153. Thereby, the next first switching time becomes equal to the first switching time, and the next second switching time becomes equal to the second switching time. After the process in step S154 is performed, a process in step S105 is performed.

(Step S155)

After the process in step S137 is performed, the calculation unit 112 determines whether the extension information has been received. A process in step S155 is the same as a process in step S151. In a case where the calculation unit 112 determines that the extension information has been received, a process in step S156 is performed. In a case where the calculation unit 112 determines that the extension information has not been received, the process in step S136 is performed.

(Step S156)

The calculation unit 112 calculates the first switching time after next on the basis of the zeroth time information and the received extension information. The calculation of the first switching time after next in step S156 is performed similarly to the calculation of the first switching time in step S152. As a result, a time period for which the first communicator 121 continues to be in the first state is extended. After the process in step S156 is performed, a process in step S138 is performed.

Figure 26:
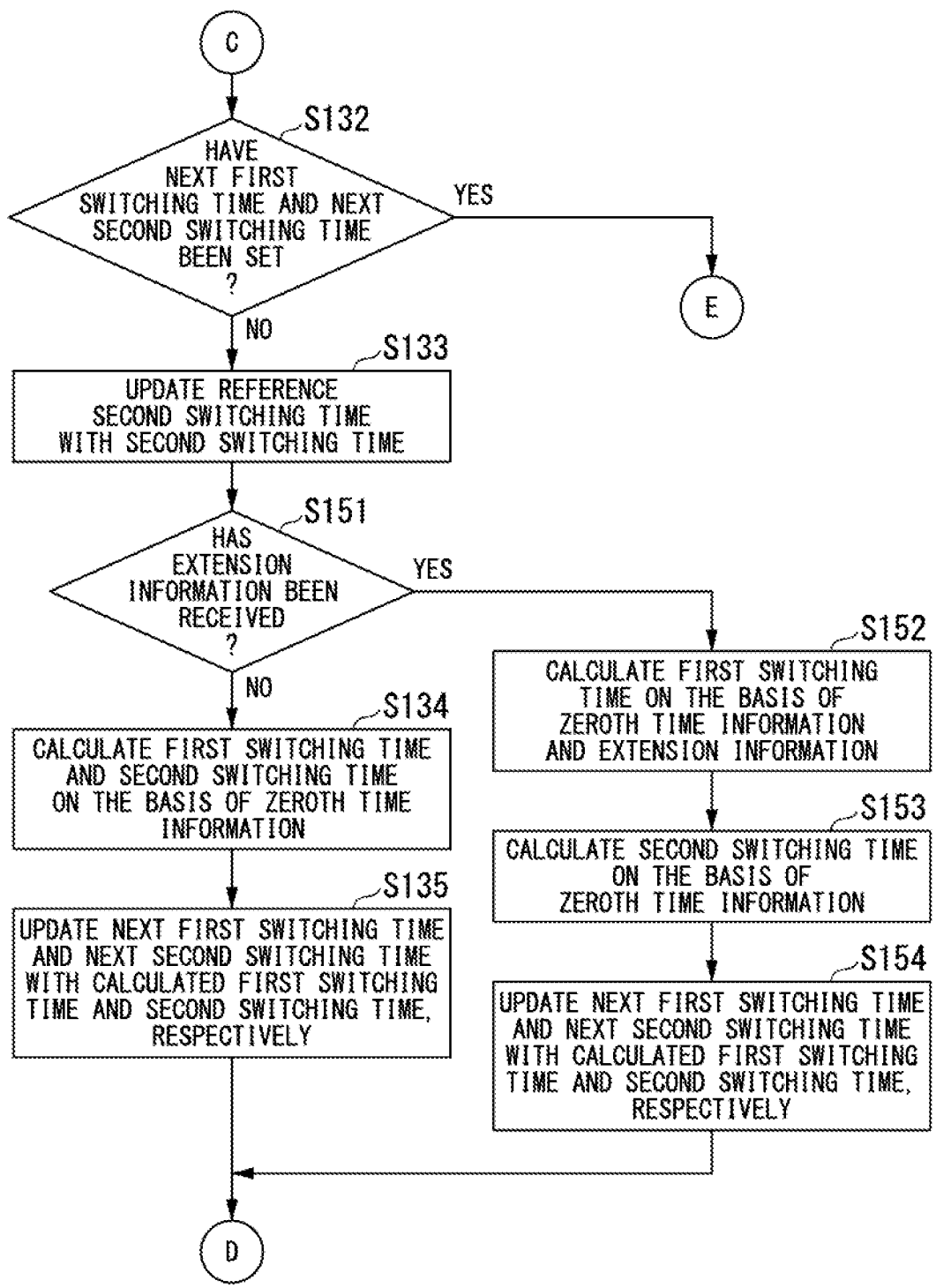
FIG. 26 is a flowchart showing a procedure of operations of a first wireless communication terminal according to a fourth embodiment of the present invention.
Figure 27:
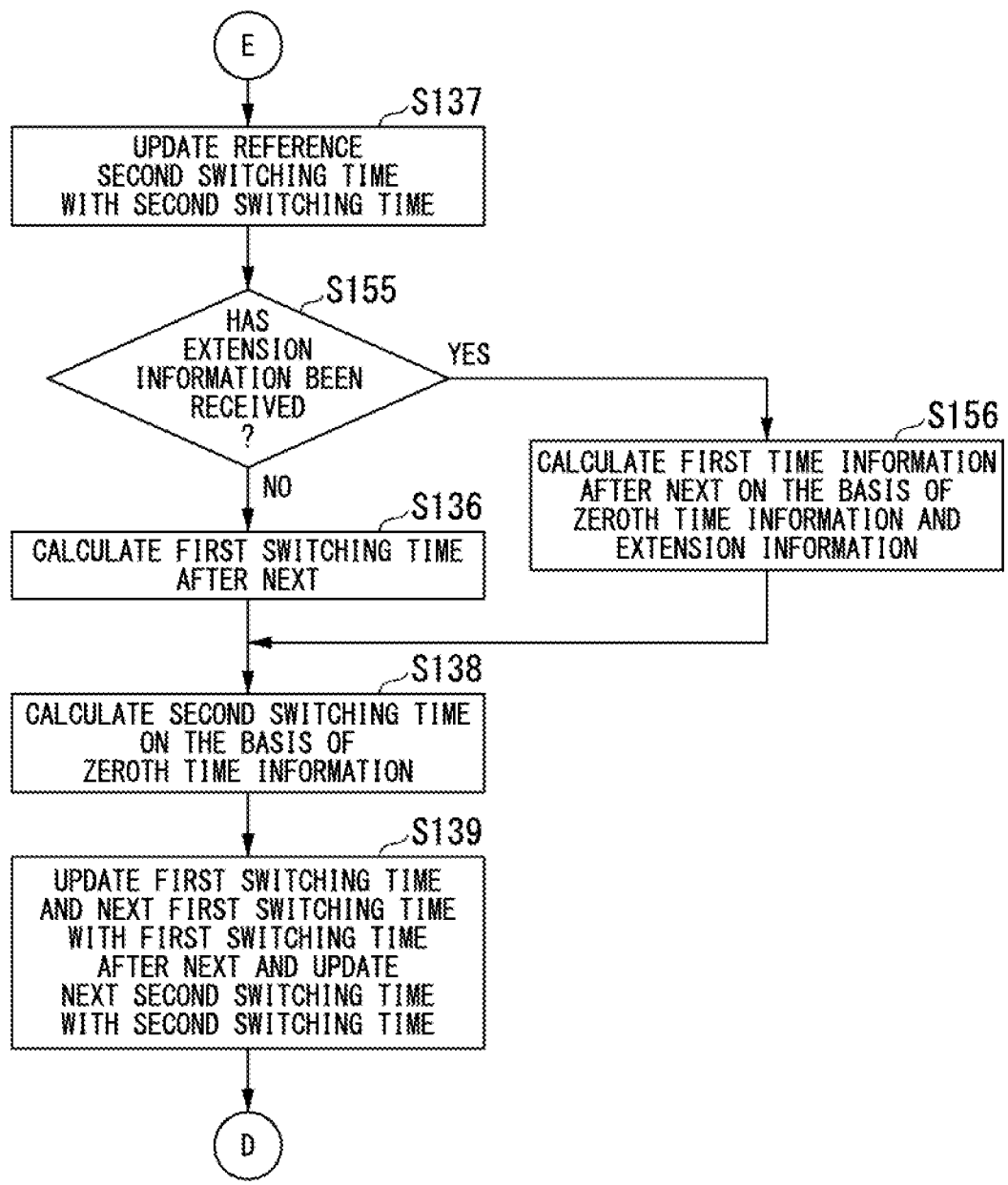
FIG. 27 is a flowchart showing a procedure of operations of the first wireless communication terminal according to the fourth embodiment of the present invention.

Regarding points other than stated, the processes shown in FIGS. 26 and 27 are the same as the processes shown in FIG. 23.

In the processes shown in FIGS. 26 and 27, in a case where the extension information transmitted by the fourth communicator 231 is received by the second communicator 131, the calculation unit 112 calculates the first switching time after next on the basis of the extension information (step S156). The calculation unit 112 calculates the first switching time on the basis of the extension information (step S152).

In a case where the extension information has been received at a timing when the process in step S151 is performed, the processes in step S152 and step S156 are performed. On the other hand, a case may occur in which the extension information has not been received at the timing when the process in step S151 is performed, and the extension information have been received at a timing when the process in step S155 is performed. In this case, the process in step S152 is not performed, and the process in step S156 is performed. For this reason, the process in step S152 is not essential.

Processes which are not shown in FIGS. 26 and 27 may be performed. For example, the zeroth time information need not be used in the calculation of the first switching time. That is, in a case where, after the extension information is received and the duration of the first state of the first communicator 121 is extended, a connection request from another terminal is not received and new extension information is not received, the first switching time may be calculated by applying the received extension information to the duration of the previous first state. For example, in a case where the duration of the first state indicated by the zeroth time information is 30 seconds, and the received extension information indicates two times, the duration of an initial first state after the extension information is received is set to 60 seconds which is twice 30 seconds. In a case where a connection request from another terminal is not received during the duration of this first state, and new extension information is not received, the duration of the next first state is set to 120 seconds which is twice the previous duration (60 seconds). Further, the duration of the next first state is set to 240 seconds which is twice the previous duration (120 seconds).

The operation of the second wireless communication terminal 201 will be described. The processes shown in FIG. 6 in the first embodiment are changed to processes shown in FIG. 28. Regarding the processes shown in FIG. 28, points different from those of the processes shown in FIG. 6 will be described.

(Step S251)

After the process in step S203 is performed, the scanning control unit 214 determines whether scanning has been executed after the first time information is transmitted. In a case where the scanning control unit 214 determines that the scanning has been executed after the first time information is transmitted, a process in step S252 is performed. In a case where the scanning control unit 214 determines that the scanning has not been executed after the first time information is transmitted, the process in step S204 is performed.

(Step S252)

The transmission control unit 213 transmits the first time information and extension information to the second communicator 131 using the fourth communicator 231. That is, the extension information is transmitted in a case where a wireless communication terminal having the first communicator 121 in an operation in the first state is not present in the scanning executed after the first time information is transmitted. For example, the first time information and the extension information are simultaneously transmitted. The first time information and the extension information may be sequentially transmitted. After the process in step S252 is performed, a process in step S205 is performed.

Figure 28:
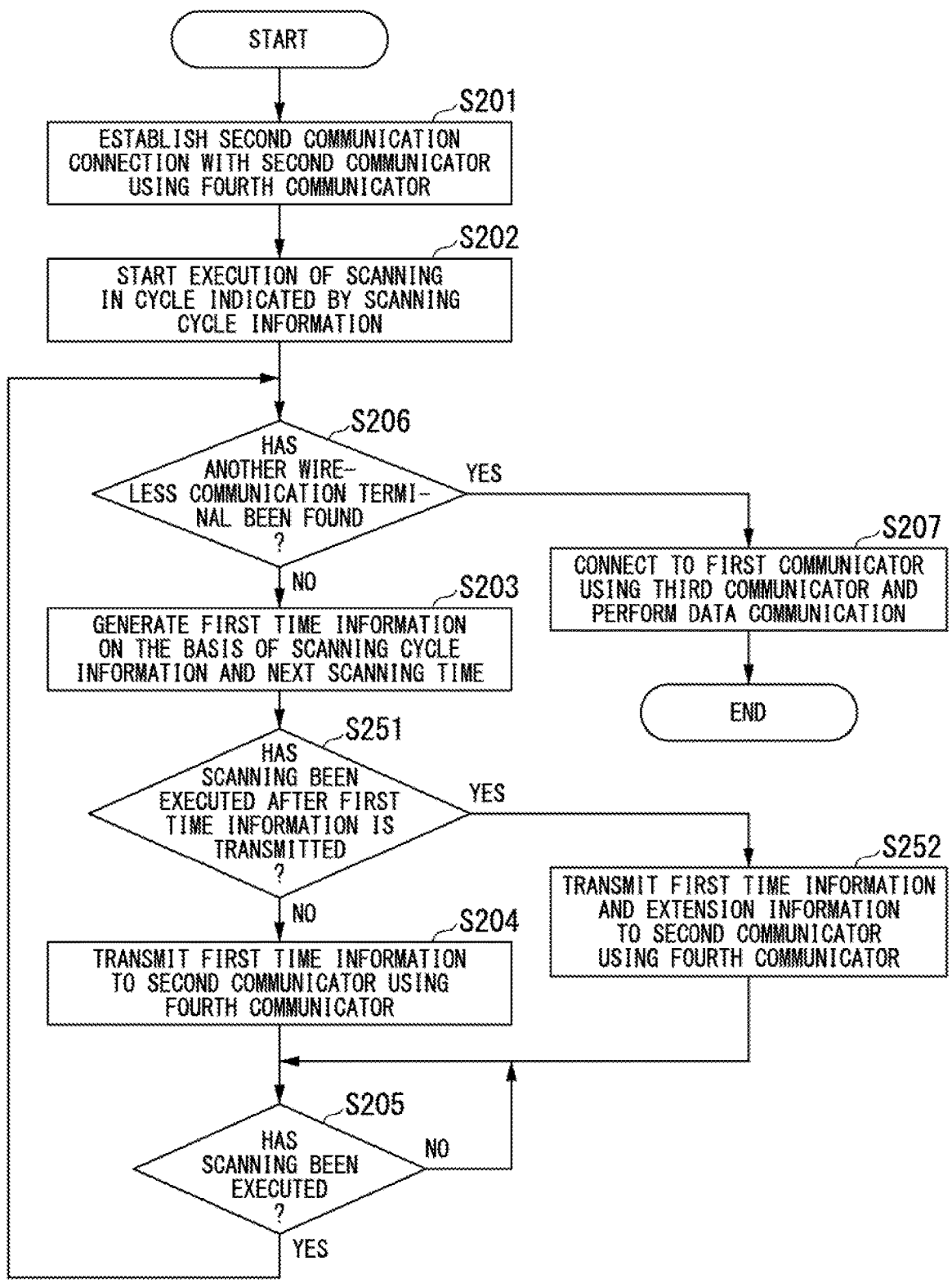
FIG. 28 is a flowchart showing a procedure of operations of a second wireless communication terminal according to the fourth embodiment of the present invention.

Regarding points other than stated, the processes shown in FIG. 28 are the same as the processes shown in FIG. 6.

In the processes shown in FIG. 28, scanning is executed by using the third communicator 221 after the first time information is transmitted through step S204. In a case where the scanning control unit 214 confirms that a wireless communication terminal having the first communicator 121 in an operation in the first state is not present in the scanning, the transmission control unit 213 transmits the extension information to the second communicator 131 using the fourth communicator 231 (step S252).

Figure 29:
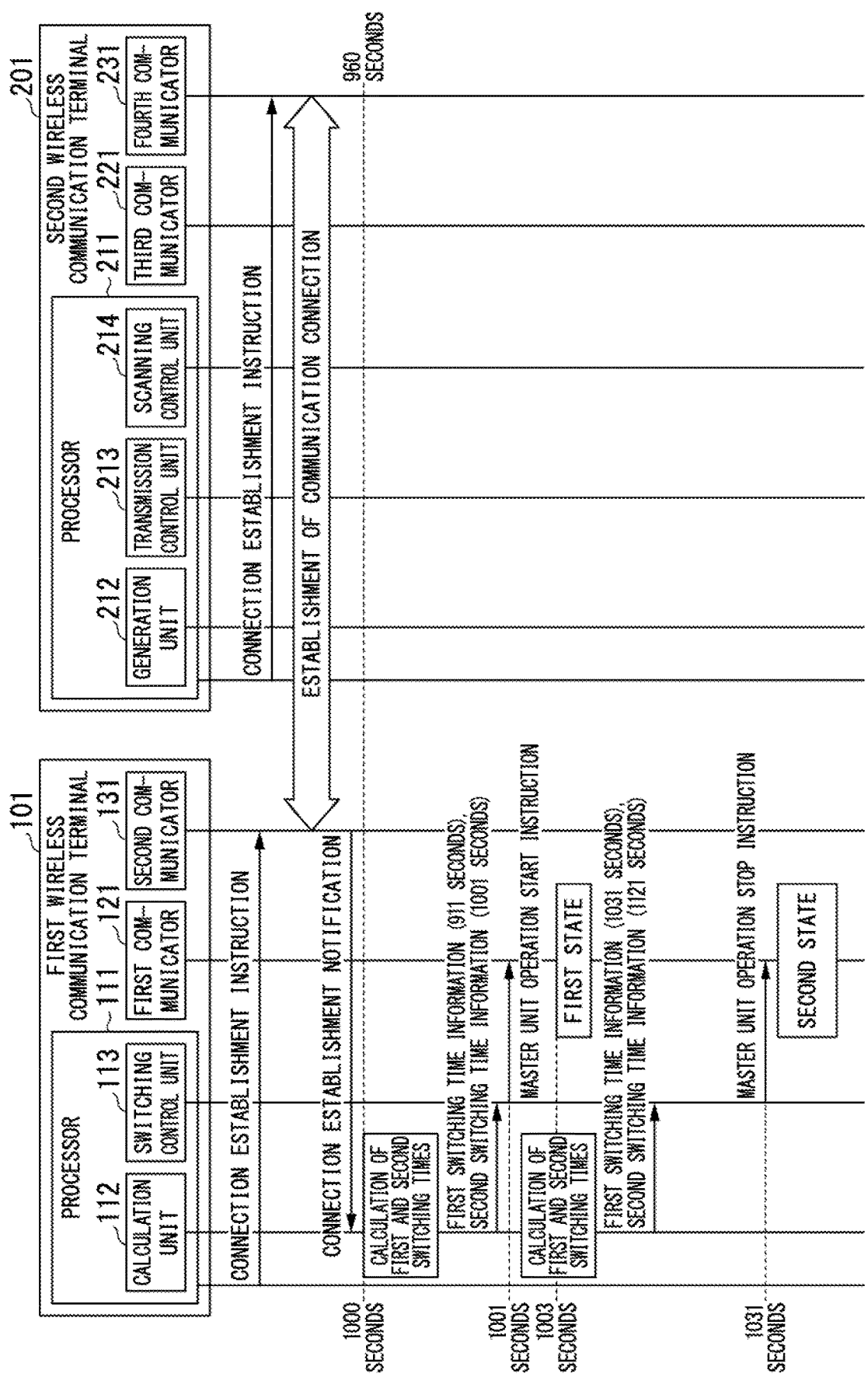
FIG. 29 is a sequence diagram showing a procedure of communication in the fourth embodiment of the present invention.
Figure 30:
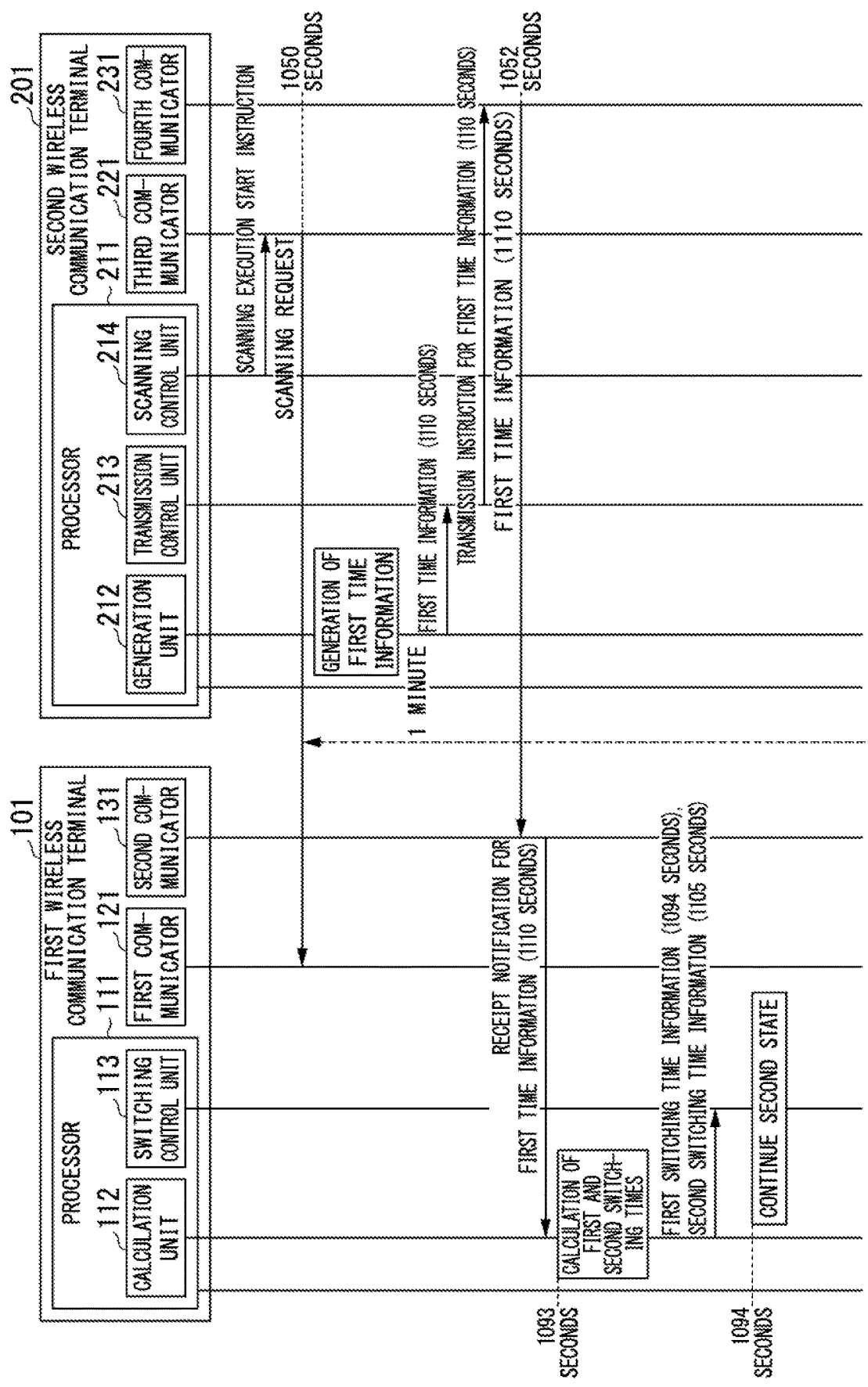
FIG. 30 is a sequence diagram showing a procedure of communication in the fourth embodiment of the present invention.
Figure 31:
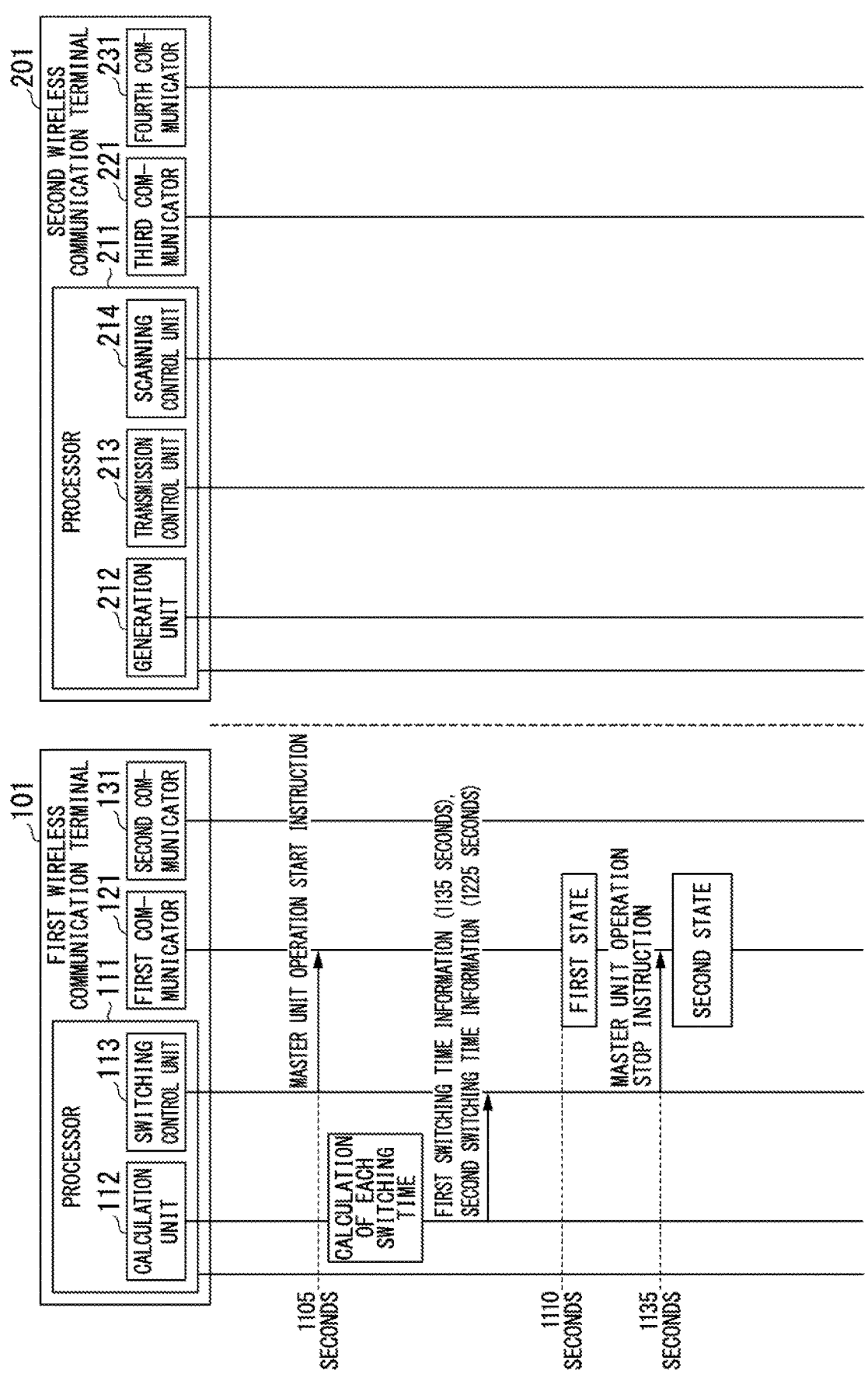
FIG. 31 is a sequence diagram showing a procedure of communication in the fourth embodiment of the present invention.
Figure 33:
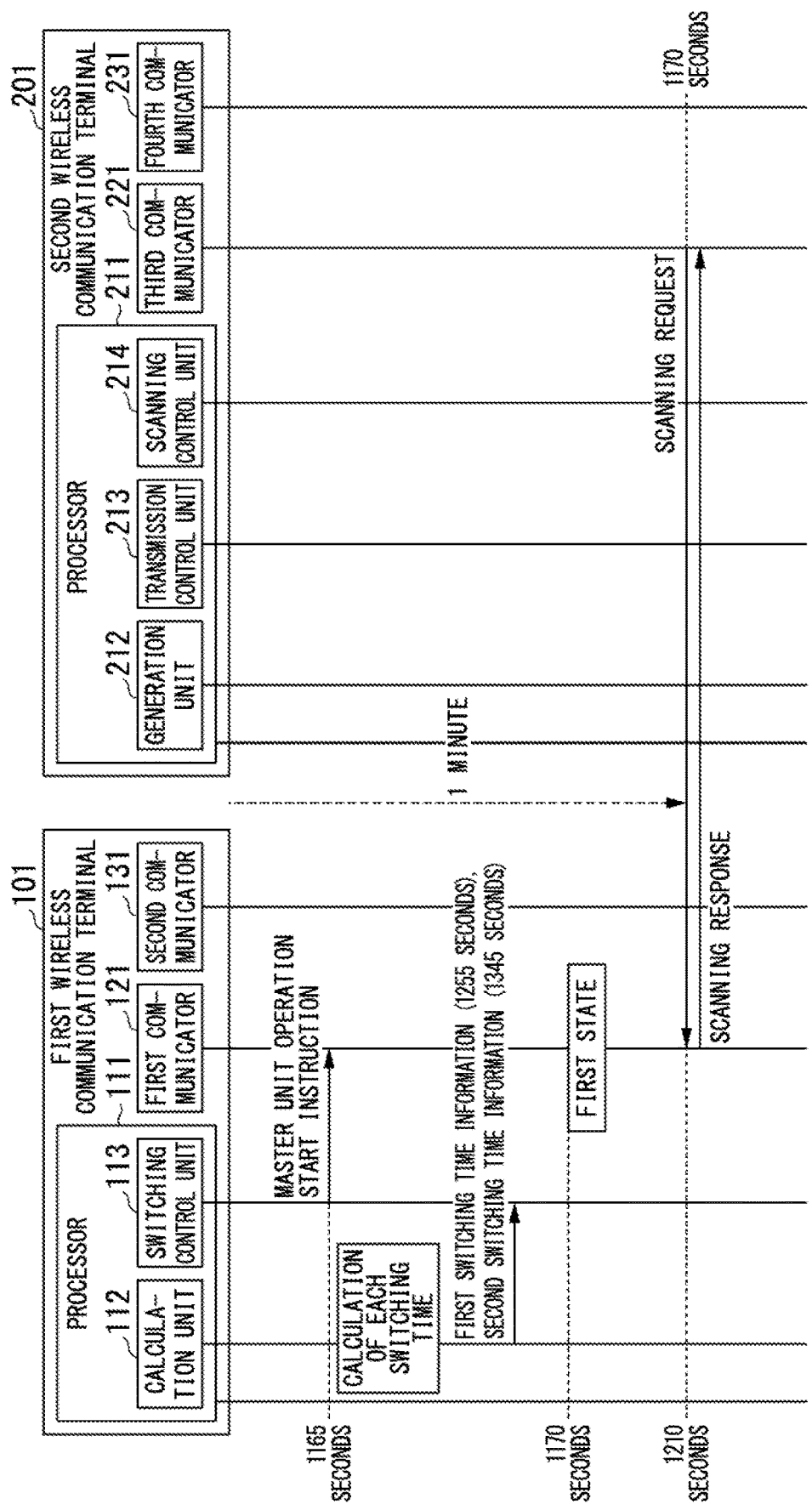
FIG. 33 is a sequence diagram showing a procedure of communication in the fourth embodiment of the present invention.
Figure 34:
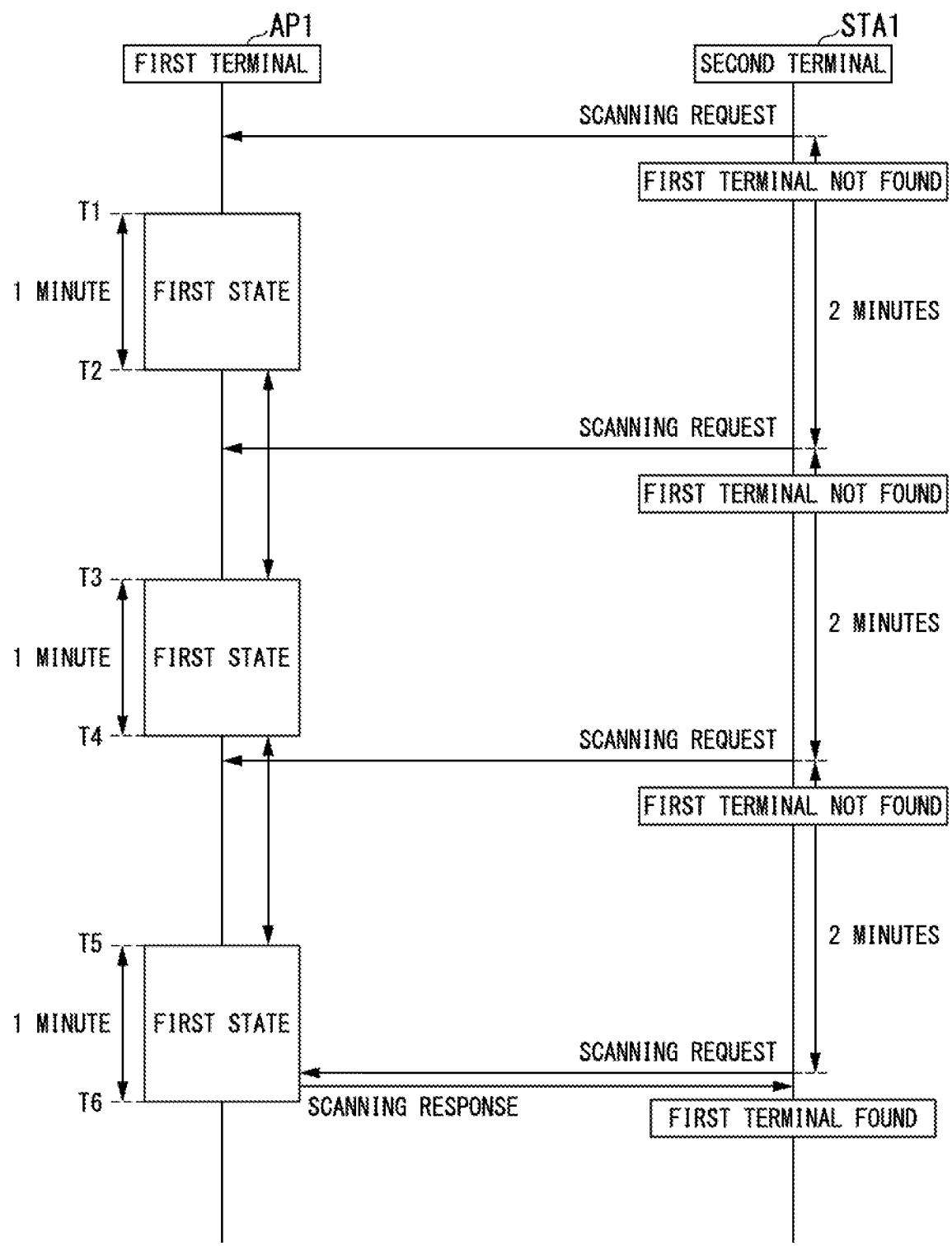
FIG. 34 is a sequence diagram showing operations of an AP and an STA in the related art.

FIGS. 29 to 33 show a procedure of communication performed by the first wireless communication terminal 101 and the second wireless communication terminal 201. After communication shown in FIG. 29 is performed, communication shown in FIG. 30 is performed. After the communication shown in FIG. 30 is performed, communication shown in FIG. 31 is performed. After the communication shown in FIG. 31 is performed, communication shown in FIG. 32 is performed. After the communication shown in FIG. 32 is performed, communication shown in FIG. 33 is performed. The operation of each terminal will be described with reference to FIGS. 29 to 33.

In the examples shown in FIGS. 29 to 33, respective timers of the first wireless communication terminal 101 and the second wireless communication terminal 201 deviate from each other. The time in the first wireless communication terminal 101 is 40 seconds ahead of the time in the second wireless communication terminal 201.

When the current time in the first wireless communication terminal 101 reaches 1031 seconds which is the first switching time, the switching control unit 113 gives the instruction for master unit operation stop to the first communicator 121, and thus the first communicator 121 is brought into the second state. The operations so far are the same as the operations shown in FIG. 7.

In the second wireless communication terminal 201, the scanning control unit 214 gives the instruction for scanning execution start to the third communicator 221 (step S202). The third communicator 221 transmits a scanning request. In this case, the current time in the second wireless communication terminal 201 is 1050 seconds. In this case, the first communicator 121 of the first wireless communication terminal 101 is in the second state. For this reason, the first communicator 121 cannot respond to the scanning request. Since the scanning response is not obtained for a predetermined time period, the generation unit 212 generates the first time information (step S203). For example, the predetermined time period is 1 second.

In the examples shown in FIGS. 29 to 33, the first time information is represented by an absolute time. Since a cycle indicated by the scanning cycle information is 60 seconds and the previous scanning time is 1050 seconds, the next scanning time is 1110 seconds. Therefore, the first time information is "1110 seconds".

The generation unit 212 notifies the transmission control unit 213 of the first time information (step S203). The first time information is not transmitted before the previous scanning is executed (step S251). The transmission control unit 213 gives a transmission instruction for the first time information to the fourth communicator 231, and transmits the first time information to the second communicator 131 using the fourth communicator 231 (step S204).

When the first time information is received, the second communicator 131 gives a receipt notification for the first time information to the calculation unit 112 (step S102). The calculation unit 112 receives the receipt notification for the first time information from the second communicator 131 (step S102). The calculation unit 112 calculates the first switching time and the second switching time on the basis of the first time information (step S104). In this case, the current time in the first wireless communication terminal 101 is 1093 seconds. The calculation unit 112 notifies the switching control unit 113 of the first switching time and the second switching time which are calculated (step S104).

The first switching time and the second switching time are calculated using the same method as the calculation method in the first embodiment. As shown in Expression (9), the first switching time is 1094 seconds obtained by adding the delay time period D (1 second) to a timing (1093 seconds) at which the calculation unit 112 receives the receipt notification for the first time information.

$$1093 \text{ seconds} + 1 \text{ second} = 1094 \text{ seconds} \quad (9)$$

As shown in Expression (10), the second switching time is 1105 seconds obtained by subtracting the estimated time period (2 seconds), the delay time period B (1 second), the delay time period C (1 second), and the delay time period D (1 second) from the time (1110 seconds) indicated by the first time information.

$$1110 \text{ seconds} - 2 \text{ seconds} - 1 \text{ second} - 1 \text{ second} - 1 \text{ second} = 1105 \text{ seconds} \quad (10)$$

When the current time in the first wireless communication terminal 101 reaches 1094 seconds which is the first switching time, the switching control unit 113 determines that the first communicator 121 is already in the second state (step S106). Therefore, the switching control unit 113 causes the first communicator 121 to continue to be in the second state.

When the current time in the first wireless communication terminal 101 reaches 1105 seconds which is the second switching time, the switching control unit 113 causes the first communicator 121 to start a master unit operation by giving the instruction for master unit operation start to the first communicator 121 (step S110). In this example, the first communicator 121 is brought into the first state at 1110 seconds which is 5 seconds after 1105 seconds.

After the current time in the first wireless communication terminal 101 reaches the second switching time (1105 seconds), the first time information has been received (step S131). In this case, the next first switching time and the next second switching time are not set (step S132). Therefore, the reference second switching time is set to 1105 seconds (step S133). In this case, the extension information has not been received (step S151). Therefore, the calculation unit 112 calculates the first switching time and the second switching time again on the basis of the zeroth time information (step S134).

The first switching time is 1135 seconds obtained by adding the duration (30 seconds) of the first state indicated by the zeroth time information to the previous second switching time (1105 seconds). The second switching time is 1225 seconds obtained by adding the duration (90 seconds) of the second state indicated by the zeroth time information to the calculated first switching time (1135 seconds). The next first switching time is 1135 seconds which is the first switching time (step S135). In this case, the next first switching time is the first switching time calculated on the basis of the zeroth time information. The next second switching time is set to 1225 seconds which is the second switching time (step S135). In this case, the next second switching time is the second switching time calculated on the basis of the zeroth time information.

When the current time in the first wireless communication terminal 101 reaches 1135 seconds which is the first switching time, the switching control unit 113 causes the first communicator 121 to stop the master unit operation by giving the instruction for master unit operation stop to the first communicator 121 (step S107). The first communicator 121 is brought into the second state.

When the current time in the second wireless communication terminal 201 reaches 1110 seconds, the third communicator 221 transmits a scanning request. In this case, the first communicator 121 of the first wireless communication terminal 101 is in the second state. For this reason, the first communicator 121 cannot transmit a scanning response. Since the scanning response is not received, the scanning control unit 214 cannot find the first wireless communication terminal 101 (step S206). The transmission control unit 213 does not transmit a connection request. For this reason, the first communicator 121 cannot receive the connection request. Since the scanning response is not obtained for a predetermined time period, the generation unit 212 generates the first time information (step S203). Since a cycle indicated by the scanning cycle information is 60 seconds, and the previous scanning time is 1110 seconds, the next scanning time is 1170 seconds. Therefore, the first time information is "1170 seconds".

The generation unit 212 notifies the transmission control unit 213 of the first time information (step S203). The first time information has been transmitted before the previous scanning is executed. That is, scanning is executed after the first time information is transmitted (step S251). The transmission control unit 213 gives a transmission instruction for the first time information to the fourth communicator 231, and transmits the first time information and the extension information to the second communicator 131 using the fourth communicator 231 (step S252). An extended time period indicated by the extension information is 60 seconds.

When the first time information and the extension information are received, the second communicator 131 gives a receipt notification for the first time information and the extension information to the calculation unit 112 (step S102). The calculation unit 112 receives the receipt notification for the first time information and the extension information from the second communicator 131 (step S102).

The calculation unit 112 calculates the first switching time and the second switching time on the basis of the first time information (step S104). In this case, the current time in the first wireless communication terminal 101 is 1153 seconds. The calculation unit 112 notifies the switching control unit 113 of the first switching time and the second switching time which are calculated (step S104). The next first switching time (1135 seconds) and the next second switching time (1225 seconds) which are set in association with the calculation of the previous first switching time and the second switching time are cleared (step S140).

The first switching time and the second switching time are calculated using the same method as the calculation method in the first embodiment. As shown in Expression (11), the first switching time is 1154 seconds obtained by adding the delay time period D (1 second) to a timing (1153 seconds) at which the calculation unit 112 receives the receipt notification for the first time information.

$$1153 \text{ seconds} + 1 \text{ second} = 1154 \text{ seconds} \quad (11)$$

As shown in Expression (12), the second switching time is 1165 seconds obtained by subtracting the estimated time period (2 seconds), the delay time period B (1 second), the delay time period C (1 second), and the delay time period D (1 second) from the time (1170 seconds) indicated by the first time information.

$$1170 \text{ seconds} - 2 \text{ seconds} - 1 \text{ second} - 1 \text{ second} - 1 \text{ second} = 1165 \text{ seconds} \quad (12)$$

When the current time in the first wireless communication terminal 101 reaches 1154 seconds which is the first switching time, the switching control unit 113 determines that the first communicator 121 is already in the second state (step S106). Therefore, the switching control unit 113 causes the first communicator 121 to continue to be in the second state.

When the current time in the first wireless communication terminal 101 reaches 1165 seconds which is the second switching time, the switching control unit 113 causes the first communicator 121 to start a master unit operation by giving the instruction for master unit operation start to the first communicator 121 (step S110). In this example, the first communicator 121 is brought into the first state at 1170 seconds which is 5 seconds after 1165 seconds.

After the current time in the first wireless communication terminal 101 reaches the second switching time (1165 seconds), the first time information has been received (step S131). In this case, the next first switching time and the next second switching time are not set (step S132). Therefore the reference second switching time is set to 1165 seconds which is the second switching time (step S133). In this case, the extension information has been received (step S155). The calculation unit 112 calculates the first switching time on the basis of the zeroth time information and the extension information (step S152). The first switching time is 1255 seconds obtained by adding the duration (30 seconds) of the first state indicated by the zeroth time information and the extended time period (60 seconds) indicated by the extension information to the previous second switching time (1165 seconds). The calculation unit 112 calculates the second switching time on the basis of the zeroth time information (step S153). The second switching time is 1345 seconds obtained by adding the duration (90 seconds) of the second state indicated by the zeroth time information to the calculated first switching time (1255 seconds). The next first switching time is set to 1255 seconds which is the first switching time (step S154). In this case, the next first switching time is the first switching time calculated on the basis of the zeroth time information and the extension information. The next second switching time is set to 1345 seconds which is the second switching time (step S154). In this case, the next second switching time is the second switching time calculated on the basis of the zeroth time information.

When the current time in the second wireless communication terminal 201 reaches 1170 seconds, the third communicator 221 transmits a scanning request. In this case, the first communicator 121 of the first wireless communication terminal 101 is in the first state. Therefore, the first communicator 121 transmits a scanning response. The third communicator 221 receives the scanning response. Since the scanning response is received, the scanning control unit 214 finds the first wireless communication terminal 101 (step S206).

In a case where the extension information from the second wireless communication terminal 201 is not received, the first switching time is set to 1195 seconds. When the current time in the first wireless communication terminal 101 reaches 1195 seconds which is the first switching time, the first communicator 121 is brought into the second state. For this reason, when the scanning request is transmitted at 1170 seconds by the second wireless communication terminal 201, the first communicator 121 cannot transmit the scanning response. Since the scanning response is not received, the scanning control unit 214 cannot find the first wireless communication terminal 101.

As stated above, in a case where the second wireless communication terminal 201 cannot find the first wireless communication terminal 101 through scanning executed after the first time information is transmitted, the first communicator 121 of the first wireless communication terminal 101 extends a time period for which the first state is continued on the basis of the extension information from the second wireless communication terminal 201. Therefore, the second wireless communication terminal 201 can find the first wireless communication terminal 101. According to the above, in the fourth embodiment, it is possible to suppress the power consumption of the first wireless communication terminal 101, and to shorten a time period required for finding the first wireless communication terminal 101.

While preferred embodiments of the present invention have been described and shown above, it should be understood that these are exemplars of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A wireless communication device comprising:
   a first communicator configured to perform wireless communication;
   a second communicator configured to perform wireless communication;
   a first memory configured to store zeroth time information; and
   a processor configured to calculate a first switching time and a second switching time, switch a state of the first communicator which is a first state to a second state at the first switching time, and switch a state of the first communicator which is the second state to the first state at the second switching time,
   wherein, the wireless communication device is a first wireless communication terminal in a case where the state of the first communicator is the first state, the first communicator is able to respond to a scanning request of a data link level, in a case where the state of the first communicator is the second state, the first communicator is not able to respond to the scanning request, in a case where a communication utilization rate of the first communicator and a communication utilization rate of the second communicator are the same as each other in a first unit period, and a ratio of a reception period of the first communicator to a transmission period of the first communicator and a ratio of the reception period of the second communicator to the transmission period of the second communicator are the same as each other in the first unit period, the first communicator and the second communicator are configured such that a first power consumption of the first communicator in the first unit period is higher than a second power consumption of the second communicator in the first unit period, a length of a first period in a second unit period is the same as a length of a second period in the second unit period, or is less than the length of the second period, in the first period, the first communicator is able to establish first communication connection for communication of a higher level than the data link level with a third communicator, in the second period, the second communicator is able to establish second communication connection for communication of the data link level with a fourth communicator, a second wireless communication terminal different from the first wireless communication terminal includes
  the third communicator configured to perform wireless communication and
  the fourth communicator configured to perform wireless communication, the second wireless communication terminal is configured to confirm whether the first wireless communication terminal having the first communicator in an operation in the first state is present by executing scanning, and executes the scanning by transmitting the scanning request using the third communicator, in a case where first time information transmitted by the fourth communicator is not received by the second communicator, the processor calculates the first switching time and the second switching time on the basis of the zeroth time information, the zeroth time information is information regarding a timing of switching between the first state and the second state of the first communicator, in a case where the first time information is received by the second communicator, the processor calculates the first switching time and the second switching time on the basis of the first time information, the first time information is information regarding a next scanning time indicating a time at which the scanning is to be next performed by the second wireless communication terminal, the second switching time is a time after the first switching time, in a case where the first time information is not received by the second communicator and the state of the first communicator is the first state, the processor switches the state of the first communicator to the second state at the first switching time calculated on the basis of the zeroth time information, in a case where the first time information is not received by the second communicator and the state of the first communicator is the second state, the processor switches the state of the first communicator to the first state at the second switching time calculated on the basis of the zeroth time information, in a case where the state of the first communicator is the first state when the first time information is received by the second communicator, the processor switches the state of the first communicator to the second state at the first switching time calculated on the basis of the first time information, and in a case where the state of the first communicator is the second state when the first time information is received by the second communicator, the first communicator continues to be in the second state, and the processor switches the state of the first communicator to the first state at the second switching time calculated on the basis of the first time information, wherein each of the first, second, third and fourth communicators includes a circuit.

2. The first wireless communication device according to claim 1,
  wherein, in a case where a connection request is not received by the first communicator until the first switching time calculated on the basis of the first time information comes, the processor transmits second time information to the fourth communicator using the second communicator,
  the connection request indicates a request for communication connection for the communication of a higher level than the data link level,
  the second time information indicates a time at which the state of the first communicator is switched from the second state to the first state in accordance with a first instruction given to the first communicator by the processor at the second switching time calculated on the basis of the first time information, and
  the first instruction is an instruction for switching the state of the first communicator from the second state to the first state.

3. The wireless communication device according to claim 2,
  wherein the processor further transmits third time information to the fourth communicator using the second communicator,
  the third time information indicates a time at which the state of the first communicator is switched from the first state to the second state in accordance with a second instruction given to the first communicator by the processor at the first switching time calculated on the basis of the first time information,
  the second instruction is an instruction for switching the state of the first communicator from the first state to the second state, and
  in a case where the connection request is not received by the first communicator until the first switching time calculated on the basis of the first time information comes, the processor further transmits the third time information to the fourth communicator using the second communicator.

4. The wireless communication device according to claim 1,
  wherein the processor further calculates a first switching time which is the first switching time subsequent to a next first switching time, the next first switching time is the first switching time subsequent to the first switching time calculated on the basis of the first time information, a time period from a next second switching time to the first switching time is longer than a time period from the second switching time to the next first switching time, and the next second switching time is the second switching time subsequent to the second switching time calculated on the basis of the first time information.

5. The first wireless communication device according to claim 1, wherein, in a case where extension information transmitted by the fourth communicator is received by the second communicator, the processor calculates a first switching time which is the first switching time subsequent to a next first switching time on the basis of the extension information, the extension information indicates causing the first communicator to extend a duration of the first state, and the next first switching time is the first switching time subsequent to the first switching time calculated on the basis of the first time information.

6. The wireless communication device according to claim 1, wherein, in a case where extension information transmitted by the fourth communicator is received by the second communicator, the processor calculates the first switching time on the basis of the extension information, and the extension information indicates causing the first communicator to extend a duration of the first state.

7. A wireless communication device comprising:

a third communicator configured to perform wireless communication;

a fourth communicator configured to perform wireless communication;

a second memory; and a processor, wherein, the wireless communication device is a second wireless communication terminal in a case where a communication utilization rate of the third communicator and a communication utilization rate of the fourth communicator are the same as each other in a third unit period, and a ratio of a reception period of the third communicator to a transmission period of the third communicator and a ratio f the reception period of the fourth communicator to the transmission period of the fourth communicator are the same as each other in the third unit period, the third communicator and the fourth communicator are configured such that a third power consumption of the third communicator in the third unit period is higher than a fourth power consumption of the fourth communicator in the third unit period, in a fourth unit period, a length of a third period is the same as a length of a fourth period, or is less than the length of the fourth period, in the third period, the third communicator is able to establish first communication connection for communication of a higher level than a data link level with a first communicator, in the fourth period, the fourth communicator is able to establish second communication connection for communication of the data link level with a second communicator, the second memory is configured to store unchangeable scanning cycle information, the scanning cycle information indicates a cycle of scanning, a first wireless communication terminal different from the second wireless communication terminal includes the first communicator configured to perform wireless communication and the second communicator configured to perform wireless communication, a state of the first communicator is switched from a first state to a second state, or is switched from the second state to the first state, in a case where the state of the first communicator is the first state, the first communicator is able to respond to a scanning request of the data link level, in a case where the state of the first communicator is the second state, the first communicator is not able to respond to the scanning request, the processor is configured to confirm whether a wireless communication terminal having the first communicator in an operation in the first state is present by executing the scanning, and executes the scanning by transmitting the scanning request using the third communicator in a cycle indicated by the scanning cycle information, the processor is configured to generate first time information using a next scanning time calculated on the basis of the scanning cycle information as a reference, the next scanning time is a time at which the scanning using the third communicator is to be next performed, the first time information is information regarding the next scanning time, and the processor is configured to transmit the first time information to the second communicator using the fourth communicator, and wherein each of the first, second, third and fourth communicators include a circuit.

8. The wireless communication device according to claim 7, wherein, in a case where second time information transmitted by the second communicator is received by the fourth communicator, the processor generates the first time information by correcting the next scanning time on the basis of the second time information, and the second time information indicates a time at which the state of the first communicator which is the second state is switched to the first state.

9. The wireless communication device according to claim 8, wherein, in a case where third time information transmitted by the second communicator is received by the fourth communicator, the processor generates the first time information by correcting the next scanning time on the basis of the second time information and the third time information, and the third time information indicates a time at which the state of the first communicator which is the first state is switched to the second state.

10. The wireless communication device according to claim 7, wherein, in a case where the processor confirms that the wireless communication terminal having the first communicator in an operation in the first state is not present in the scanning executed by using the third communicator after the first time information is transmitted, the processor transmits extension information to the second communicator using the fourth communicator, and the extension information indicates causing the first communicator to extend a duration of the first state.

11. A wireless communication system comprising:
a first wireless communication terminal; and
a second wireless communication terminal,
wherein the first wireless communication terminal includes
a first communicator configured to perform wireless communication,
a second communicator configured to perform wireless communication,
a first memory configured to store zeroth time information, and
a first processor configured to calculate a first switching time and a second switching time, switch a state of the first communicator which is a first state to a second state at the first switching time, and switch a state of the first communicator which is the second state to the first state at the second switching time,
in a case where the state of the first communicator is the first state, the first communicator is able to respond to a scanning request of a data link level,
in a case where the state of the first communicator is the second state, the first communicator is not able to respond to the scanning request,
in a case where a communication utilization rate of the first communicator and a communication utilization rate of the second communicator are the same as each other in a first unit period, and a ratio of a reception period of the first communicator to a transmission period of the first communicator and a ratio of the reception period of the second communicator to the transmission period of the second communicator are the same as each other in the first unit period, the first communicator and the second communicator are configured such that a first power consumption of the first communicator in the first unit period is higher than a second power consumption of the second communicator in the first unit period,
a length of a first period in a second unit period is the same as a length of a second period in the second unit period, or is less than the length of the second period,
in the first period, the first communicator is able to establish first communication connection for communication of a higher level than the data link level with a third communicator,
in the second period, the second communicator is able to establish second communication connection for communication of the data link level with a fourth communicator,
the second wireless communication terminal includes
the third communicator configured to perform wireless communication,
the fourth communicator configured to perform wireless communication,
a second memory, and
a second processor,
the second processor is configured to confirm whether the first wireless communication terminal having the first communicator in an operation in the first state is present by executing scanning, and executes the scanning by transmitting the scanning request using the third communicator,
in a case where first time information transmitted by the fourth communicator is not received by the second communicator, the first processor calculates the first switching time and the second switching time on the basis of the zeroth time information, the zeroth time information is information regarding a timing of switching between the first state and the second state of the first communicator,
in a case where the first time information is received by the second communicator, the first processor calculates the first switching time and the second switching time on the basis of the first time information,
the first time information is information regarding a next scanning time indicating a time at which the scanning is to be next performed by the second wireless communication terminal,
the second switching time is a time after the first switching time,
in a case where the first time information is not received by the second communicator and the state of the first communicator is the first state, the first processor switches the state of the first communicator to the second state at the first switching time calculated on the basis of the zeroth time information,
in a case where the first time information is not received by the second communicator and the state of the first communicator is the second state, the first processor switches the state of the first communicator to the first state at the second switching time calculated on the basis of the zeroth time information,
in a case where the state of the first communicator is the first state when the first time information is received by the second communicator, the first processor switches the state of the first communicator to the second state at the first switching time calculated on the basis of the first time information,
in a case where the state of the first communicator is the second state when the first time information is received by the second communicator, the first communicator continues to be in the second state, and the first processor switches the state of the first communicator to the first state at the second switching time calculated on the basis of the first time information,
in a case where a communication utilization rate of the third communicator and a communication utilization rate of the fourth communicator are the same as each other in a third unit period, and a ratio of the reception period of the third communicator to a transmission period of the third communicator and a ratio of the reception period of the fourth communicator to the transmission period of the fourth communicator are the same as each other in the third unit period, the third communicator and the fourth communicator are configured such that a third power consumption of the third communicator in the third unit period is higher than a fourth power consumption of the fourth communicator in the third unit period,
in a fourth unit period, a length of a third period is the same as a length of a fourth period, or is less than the length of the fourth period,
in the third period, the third communicator is able to establish the first communication connection with the first communicator,
in the fourth period, the fourth communicator is able to establish the second communication connection with the second communicator,
the second memory is configured to store unchangeable scanning cycle information,
the scanning cycle information indicates a cycle of the scanning, the second processor is configured to execute the scanning using the third communicator in a cycle indicated by the scanning cycle information, the second processor is configured to generate first time information using a next scanning time calculated on the basis of the scanning cycle information as a reference, the next scanning time is a time at which the scanning using the third communicator is to be next performed, and the second processor is configured to transmit the first time information to the second communicator using the fourth communicator, wherein each of the first, second, third and fourth communicators include a circuit.

12. A wireless communication method executed by a first wireless communication terminal, wherein the first wireless communication terminal includes
a first communicator configured to perform wireless communication,
a second communicator configured to perform wireless communication, and
a first memory configured to store zeroth time information, a state of the first communicator which is a first state is switched to a second state at a first switching time, and a state of the first communicator which is the second state is switched to the first state at a second switching time, in a case where the state of the first communicator is the first state, the first communicator is able to respond to a scanning request of a data link level, in a case where the state of the first communicator is the second state, the first communicator is not able to respond to the scanning request, in a case where a communication utilization rate of the first communicator and a communication utilization rate of the second communicator are the same as each other in a first unit period, and a ratio of a reception period of the first communicator to a transmission period of the first communicator and a ratio of the reception period of the second communicator to the transmission period of the second communicator are the same as each other in the first unit period, the first communicator and the second communicator are configured such that a first power consumption of the first communicator in the first unit period is higher than a second power consumption of the second communicator in the first unit period, a length of a first period in a second unit period is the same as a length of a second period in the second unit period, or is less than the length of the second period, in the first period, the first communicator is able to establish first communication connection for communication of a higher level than the data link level with a third communicator, in the second period, the second communicator is able to establish second communication connection for communication of the data link level with a fourth communicator, a second wireless communication terminal includes
the third communicator configured to perform wireless communication and
the fourth communicator configured to perform wireless communication, the second wireless communication terminal is configured to confirm whether the first wireless communication terminal having the first communicator in an operation in the first state is present by executing scanning, the second wireless communication terminal executing the scanning by transmitting the scanning request using the third communicator, wherein each of the first, second, third and fourth communicators include a circuit, the wireless communication method executed by the first wireless communication terminal comprises the following steps:

calculating the first switching time and the second switching time on the basis of the zeroth time information in a case where first time information transmitted by the fourth communicator is not received by the second communicator, wherein the zeroth time information is information regarding a timing of switching between the first state and the second state of the first communicator;

calculating the first switching time and the second switching time on the basis of the first time information in a case where the first time information is received by the second communicator, wherein the first time information is information regarding a next scanning time indicating a time at which the scanning is to be next performed by the second wireless communication terminal, and the second switching time is a time after the first switching time;

switching the state of the first communicator to the second state at the first switching time calculated on the basis of the zeroth time information in a case where the first time information is not received by the second communicator and the state of the first communicator is the first state;

switching the state of the first communicator to the first state at the second switching time calculated on the basis of the zeroth time information in a case where the first time information is not received by the second communicator and the state of the first communicator is the second state;

switching the state of the first communicator to the second state at the first switching time calculated on the basis of the first time information in a case where the state of the first communicator is the first state when the first time information is received by the second communicator; and switching the state of the first communicator to the first state at the second switching time calculated on the basis of the first time information in a case where the state of the first communicator is the second state when the first time information is received by the second communicator and the first communicator continues to be in the second state.

13. A wireless communication method executed by a second wireless communication terminal, wherein the second wireless communication terminal includes
a third communicator configured to perform wireless communication,
a fourth communicator configured to perform wireless communication, and
a second memory, in a case where a communication utilization rate of the third communicator and a communication utilization rate of the fourth communicator are the same as each other in a third unit period, and a ratio of a reception period of the third communicator to a transmission period of the third communicator and a ratio of the reception period of the fourth communicator to the transmission period of the fourth communicator are the same as each other in the third unit period, the third communicator and the fourth communicator are configured such that a first power consumption of the third communicator in the third unit period is higher than a second power consumption of the fourth communicator in the third unit period, in a fourth unit period, a length of a third period is the same as a length of a fourth period, or is less than the length of the fourth period, in the third period, the third communicator is able to establish first communication connection for communication of a higher level than a data link level with a first communicator, in the fourth period, the fourth communicator is able to establish second communication connection for communication of the data link level with a second communicator, the second memory is configured to store unchangeable scanning cycle information, the scanning cycle information indicates a cycle of scanning, a first wireless communication terminal includes
  the first communicator configured to perform wireless communication and
  the second communicator configured to perform wireless communication, a state of the first communicator is switched from a first state to a second state, or is switched from the second state to the first state, in a case where the state of the first communicator is the first state, the first communicator is able to respond to a scanning request of the data link level, in a case where the state of the first communicator is the second state, the first communicator is not able to respond to the scanning request, wherein each of the first, second, third and fourth communicators include a circuit, the wireless communication method executed by the second wireless communication terminal comprises the following steps:

confirming whether a wireless communication terminal having the first communicator in an operation in the first state is present by executing scanning, the second wireless communication terminal executing the scanning by transmitting the scanning request using the third communicator in a cycle indicated by the scanning cycle information;

generating first time information using a next scanning time calculated on the basis of the scanning cycle information as a reference, wherein the next scanning time is a time at which the scanning using the third communicator is to be next performed and the first time information is information regarding the next scanning time; and transmitting the first time information to the second communicator using the fourth communicator.

14. A non-transitory computer-readable recording medium having a program recorded therein, the program causing a computer of a first wireless communication terminal to execute steps,
  wherein the first wireless communication terminal includes
    a first communicator configured to perform wireless communication,
    a second communicator configured to perform wireless communication, and
    a first memory configured to store zeroth time information, a state of the first communicator which is a first state is switched to a second state at a first switching time, and a state of the first communicator which is the second state is switched to the first state at a second switching time, in a case where the state of the first communicator is the first state, the first communicator is able to respond to a scanning request of a data link level, in a case where the state of the first communicator is the second state, the first communicator is not able to respond to the scanning request, in a case where a communication utilization rate of the first communicator and a communication utilization rate of the second communicator are the same as each other in a first unit period, and a ratio of a reception period of the first communicator to a transmission period of the first communicator and a ratio of the reception period of the second communicator to the transmission period of the second communicator are the same as each other in the first unit period, the first communicator and the second communicator are configured such that a first power consumption of the first communicator in the first unit period is higher than a second power consumption of the second communicator in the first unit period, a length of a first period in a second unit period is the same as a length of a second period in the second unit period, or is less than the length of the second period, in the first period, the first communicator is able to establish first communication connection for communication of a higher level than the data link level with a third communicator, in the second period, the second communicator is able to establish second communication connection for communication of the data link level with a fourth communicator, a second wireless communication terminal includes
  the third communicator configured to perform wireless communication and
  the fourth communicator configured to perform wireless communication, the second wireless communication terminal is configured to confirm whether the first wireless communication terminal having the first communicator in an operation in the first state is present by executing scanning, the second wireless communication terminal executing the scanning by transmitting the scanning request using the third communicator, wherein each of the first, second, third and fourth communicators include a circuit, the program causing the computer of the first wireless communication terminal to execute the following steps:

calculating the first switching time and the second switching time on the basis of the zeroth time information, in a case where first time information transmitted by the fourth communicator is not received by the second communicator, wherein the zeroth time information is information regarding a timing of switching between the first state and the second state of the first communicator calculating the first switching time and the second switching time on the basis of the first time information, in a case where the first time information is received by the second communicator, wherein the first time information is information regarding a next scanning time indicating a time at which the scanning is to be next performed by the second wireless communication terminal, and the second switching time is a time after the first switching time;

switching the state of the first communicator to the second state at the first switching time calculated on the basis of the zeroth time information, in a case where the first time information is not received by the second communicator and the state of the first communicator is the first state;

switching the state of the first communicator to the first state at the second switching time calculated on the basis of the zeroth time information, in a case where the first time information is not received by the second communicator and the state of the first communicator is the second state;

switching the state of the first communicator to the second state at the first switching time calculated on the basis of the first time information, in a case where the state of the first communicator is the first state when the first time information is received by the second communicator; and switching the state of the first communicator to the first state at the second switching time calculated on the basis of the first time information, in a case where the state of the first communicator is the second state when the first time information is received by the second communicator, and the first communicator continues to be in the second state.

15. A non-transitory computer-readable recording medium having a program recorded therein, the program causing a computer of a second wireless communication terminal to execute steps,
   wherein the second wireless communication terminal includes
      a third communicator configured to perform wireless communication,
      a fourth communicator configured to perform wireless communication, and
      a second memory,
   in a case where a communication utilization rate of the third communicator and a communication utilization rate of the fourth communicator are the same as each other in a third unit period, and a ratio of a reception period of the third communicator to a transmission period of the third communicator and a ratio of the reception period of the fourth communicator to the transmission period of the fourth communicator are the same as each other in the third unit period, the third communicator and the fourth communicator are configured such that a first power consumption of the third communicator in the third unit period is higher than a second power consumption of the fourth communicator in the third unit period, in a fourth unit period, a length of a third period is the same as a length of a fourth period, or is less than the length of the fourth period, in the third period, the third communicator is able to establish first communication connection for communication of a higher level than the data link level with a first communicator, in the fourth period, the fourth communicator is able to establish second communication connection for communication of the data link level with a second communicator, the second memory is configured to store unchangeable scanning cycle information, the scanning cycle information indicates a cycle of scanning, a first wireless communication terminal includes
   the first communicator configured to perform wireless communication and
   the second communicator configured to perform wireless communication, a state of the first communicator is switched from a first state to a second state, or is switched from the second state to the first state, in a case where the state of the first communicator is the first state, the first communicator is able to respond to a scanning request of a data link level, in a case where the state of the first communicator is the second state, the first communicator is not able to respond to the scanning request, wherein each of the first, second, third and fourth communicators include a circuit, the program causing the computer of the second wireless communication terminal to execute the following steps:

confirming whether a wireless communication terminal having the first communicator in an operation in the first state is present by executing the scanning, the computer executing the scanning by transmitting the scanning request using the third communicator in a cycle indicated by the scanning cycle information;

generating first time information using a next scanning time calculated on the basis of the scanning cycle information as a reference, the next scanning time is a time at which the scanning using the third communicator is to be next performed, the first time information is information regarding the next scanning time; and transmitting the first time information to the second communicator using the fourth communicator.

* * * * *